(12) United States Patent
Lewis

(10) Patent No.: US 10,624,275 B1
(45) Date of Patent: *Apr. 21, 2020

(54) SEMI-AUTOMATED CROP PRODUCTION SYSTEM

(71) Applicant: Myles D. Lewis, Tucson, AZ (US)

(72) Inventor: Myles D. Lewis, Tucson, AZ (US)

(*) Notice: Subject to any disclaimer, the term of this patent is extended or adjusted under 35 U.S.C. 154(b) by 331 days.

This patent is subject to a terminal disclaimer.

(21) Appl. No.: 15/336,616

(22) Filed: Oct. 27, 2016

Related U.S. Application Data

(63) Continuation-in-part of application No. 14/810,042, filed on Jul. 27, 2015, now abandoned, which is a continuation of application No. 13/902,902, filed on May 27, 2013, now Pat. No. 9,101,096, which is a continuation-in-part of application No. 13/070,407, filed on Mar. 23, 2011, now Pat. No. 8,468,741.

(60) Provisional application No. 61/316,777, filed on Mar. 23, 2010.

(51) Int. Cl.
*A01G 9/24* (2006.01)
*A01G 7/04* (2006.01)

(52) U.S. Cl.
CPC ............ *A01G 9/249* (2019.05); *A01G 7/045* (2013.01)

(58) Field of Classification Search
CPC . A01G 9/14; A01G 9/24; A01G 9/243; A01G 9/247; A01G 9/249; A01G 9/26
USPC ...................... 47/17, 21.1, 58.1 LS
See application file for complete search history.

(56) References Cited

U.S. PATENT DOCUMENTS

| | | | |
|---|---|---|---|
| 2,372,077 A | 3/1945 | Glinecki | |
| 3,888,652 A * | 6/1975 | Yie | A01C 21/00 71/54 |
| 3,930,335 A | 1/1976 | Widmayer | |
| 4,091,566 A | 5/1978 | Horvath et al. | |
| 4,163,342 A | 8/1979 | Foggs et al. | |
| 4,754,571 A | 7/1988 | Riechmann | |
| 4,799,858 A | 1/1989 | Shin-Chin | |
| 4,914,858 A * | 4/1990 | Nijssen | A01G 7/045 47/1.01 R |
| 4,979,350 A * | 12/1990 | Arnemann | B65B 7/2828 53/317 |
| 5,012,609 A | 5/1991 | Ignatius et al. | |
| 5,101,593 A | 4/1992 | Bhatt | |
| 5,111,612 A | 5/1992 | Takishima et al. | |
| 5,299,383 A | 4/1994 | Takakura | |
| 5,833,293 A | 11/1998 | Ludwig | |

(Continued)

FOREIGN PATENT DOCUMENTS

JP WO2009119778 10/2009

*Primary Examiner* — Magdalena Topolski

(57) ABSTRACT

A semi-automated crop production system featuring a growing module with grids of cells for growing plants and a lighting and airflow fixture positioned above each cell. The lighting and airflow fixtures feature a fan disposed in a housing, a light emitting diode (LED) assembly board comprising LEDs disposed below the fan; a light diffuser disposed below the LED assembly board, and an adjustable airflow nozzle extending downwardly from the fan and protruding through the LED assembly board and the light diffuser. The adjustable airflow nozzle provides directed airflow downwardly toward a bottom area of the housing. The growing module and lighting and airflow fixtures are housed in a shell. The growing module may be slidably attached to the interior wall of the shell via mounting components.

20 Claims, 49 Drawing Sheets

(56) References Cited

U.S. PATENT DOCUMENTS

| | | | |
|---|---|---|---|
| 6,282,834 B1 * | 9/2001 | Mossey | A01G 9/1438 47/17 |
| 6,382,418 B1 | 5/2002 | Weder | |
| 6,508,033 B2 | 1/2003 | Hessel et al. | |
| 6,554,450 B2 | 4/2003 | Fang et al. | |
| 6,679,771 B2 * | 1/2004 | Lee | H05K 7/20209 237/46 |
| 7,160,717 B2 | 1/2007 | Everett | |
| 7,975,429 B2 | 7/2011 | Okabe et al. | |
| 8,234,812 B1 | 8/2012 | Colless et al. | |
| 8,468,741 B2 | 6/2013 | Lewis | |
| 9,101,096 B1 | 8/2015 | Lewis | |
| 2005/0178058 A1 | 8/2005 | Rudolph | |
| 2007/0251145 A1 | 11/2007 | Brusatore | |
| 2008/0008812 A1 | 1/2008 | Ochial et al. | |
| 2008/0216398 A1 | 9/2008 | Townsley | |
| 2008/0295400 A1 | 12/2008 | Harwood et al. | |
| 2009/0031621 A1 * | 2/2009 | Kitagawa | A01G 9/16 47/17 |
| 2009/0077876 A1 * | 3/2009 | Eghbal | A01G 9/023 47/18 |
| 2009/0227454 A1 | 9/2009 | Jaiswal | |
| 2010/0018131 A1 | 1/2010 | Green | |
| 2010/0039829 A1 * | 2/2010 | Tsai | F21S 8/026 362/373 |
| 2010/0088954 A1 | 4/2010 | Oosterling | |
| 2010/0091500 A1 * | 4/2010 | Herbst | B01D 46/0036 362/294 |
| 2011/0041415 A1 | 2/2011 | Esposito | |
| 2012/0120658 A1 | 5/2012 | Wilk | |
| 2012/0170263 A1 | 7/2012 | Rodriguez | |
| 2012/0210640 A1 | 8/2012 | Ivanovic | |
| 2013/0263503 A1 | 10/2013 | Bostdorff | |
| 2016/0316646 A1 * | 11/2016 | Lepp | A01G 7/045 |

\* cited by examiner

SEMI-AUTOMATED CROP PRODUCTION SYSTEM

CROSS REFERENCE

This application is a continuation-in-part and claims benefit of U.S. patent application Ser. No. 14/810,042 filed Jul. 27, 2015, which is a continuation and claims benefit of U.S. patent application Ser. No. 13/902,902 filed May 27, 2013, now U.S. Pat. No. 9,101,096, is a continuation-in-part and claims benefit of U.S. patent application Ser. No. 13/070,407 filed Mar. 23, 2011, now U.S. Pat. No. 8,468,741, which is a non-provisional of U.S. Provisional Patent Application No. 61/316,777, filed Mar. 23, 2010, the specifications of which are incorporated in their entirety herein by reference.

FIELD OF THE INVENTION

The present invention is directed to agriculture systems, more particularly to a self-contained semi automated production facility capable of culturing plants and other organisms in a controlled environment. The present invention is in no way limited to the examples disclosed herein.

BACKGROUND OF THE INVENTION

As population continues to grow, more land is required for habitation and more food is required for consumption. To accommodate growing urbanization and the decrease of arable land area, agricultural systems are centralizing to hotspots within the U.S. and other countries. However, these large-scale production systems may use inefficient methods, and some systems may select fruits and vegetables for their ability to be harvested early and transport for extended periods of time as opposed to being selected for good nutritional content. The increase use of transplants is needed to support the increase in farming for the rising population. Some consumers may wish to engage in supporting or growing locally produced foods for increased quality, nutrition and lower price. However, many cities lack the zoning laws to address small-scale agricultural operations. The present invention features a self-contained semi-automated production facility capable of culturing plants and other organisms in a controlled environment. The system of the present invention provides optimal environmental conditions, regardless of the external conditions, to allow for production of such plants and organisms. The system provides treatments for manipulation of the physiology, morphology, or other phenotypical responses. The system provides environments for grafted plant production including germination, healing, and cultivation. The system of the present invention helps to use better technologies to produce food (and other plant products such as biopharmaceuticals, industrials compounds, etc. in a controlled and scalable manner), rather than the traditional methods. The present invention is in no way limited to the examples disclosed herein.

For example, in some embodiments, the system is used for the enhancement of nutritional content of food products produced. Adding nutritional content and placement may help to alleviate localized food-related health issues by contributing to availability of high quality, high nutrition, foods that are normally inaccessible in such areas.

Sometimes the readiness of the accepting planting location may not be suitable due to unfavorable weather conditions, poor field conditions (e.g., a wet field), operator readiness (business, or lack of adequate plant stock), or other issue and planting must be delayed. During such time, transplants will experience unfavorable conditions in their non-climate controlled, non-irrigated, passive transportation container as they wait for transplant. As a result of waiting in poor conditions, loss of units and/or plant quality occurs. Loss of quality will be expressed in the field by lower yield and quality. The present invention creates an intermittent storage facility to help avoid potential risks and losses.

Similarly, sometimes transplants are traveling from ideal or different conditions as compared to those of their final destination. This difference in climatic condition can shock the plants if not properly acclimated beforehand. This can cause loss of units, yield, and quality. In some embodiments, the system of the present invention can provide optimal growth conditions and low temperature storage of plants without needing internment or specialized facilities such as refrigerated storage, which is not commonly used for vegetable plant stock storage. The system of the present invention can be left at the transplanting location desired while maintaining plant stock in a preserved condition until the plant stock is needed for use or the conditions are appropriate. Preserved and ready-to-use, in-production, or in-transit plant stocks may be acclimated to current or anticipated field conditions when desired using the present system, offering greater initial survival rates, higher quality and yield as a result of a healthier organism entering the field.

The system of the present invention may also be suitable for disaster relief. For example, the system of the present invention may be primed with starting materials (or be already in production) and then transported to the needed location. During transport, products may be growing, allowing for readiness upon arrival or reduced time to readiness, with the capacity for continued production immediately upon arrival. In some embodiments, the system of the present invention allows for food production in non-traditional locations such as disaster relief areas or similar where infrastructure to support food production would be useful. The system of the present invention may also be utilized passively or actively for water treatment. Through the application of brackish or otherwise untreated water to organisms growing in the system, transpiration of the water into a gaseous form will occur during photosynthesis and respiration retaining harmful components within the plant, growing substrate, or recirculated solution. The condensate recovery system and the water treatment and filtration systems may be used to collect, sterilize and create potable water from otherwise unusable sources after being collected from recirculated moist air within the unit.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description.

SUMMARY

The present invention features a semi-automated crop production system (100). In some embodiments, the system (100) comprises a growing module (200) featuring a growing module container (210) and a grid (220) disposed inside the growing module container (210). The system (100) may alternatively feature an insulated container without the growing module insert or the growing module insert without containment (e.g., the growing module container (210) without the shell (120)).

The grid (220) comprises a plurality of cells (230) adapted to hold a plant or other organisms. For example, the grid (220)/cells (230) can hold a series of plants (e.g., a series of tomato plants) in buckets on a single plane independent of each other.

In some embodiments, the system (100) comprises a plurality of lighting and airflow fixtures (300). The lighting and airflow fixtures (300) may be disposed inside the growing module container (210) and positioned above the grid (220). For example, the lighting and airflow fixtures (300) may be mounted to the growing module container (210), or in some embodiments, the lighting and airflow fixtures (300) may be mounted to the shell (110/120). In some embodiments, the lighting and airflow fixtures (300) may be disposed on one or more vertical sides of the growing module container (210) or the shell (110/120) or above the grid (220). The lighting and airflow fixtures (300) are not limited to the configurations described herein and may include other contained light sources, e.g., a high intensity discharge (HID) lamp.

Each lighting and airflow fixture (300) features a housing (310); a fan (320) disposed in the housing (310) and positioned to blow air downwardly; a light emitting diode (LED) assembly board (330) comprising LEDs (332) (or other light system such as OLED, etc.) disposed below the fan (320) in the housing (310); a light diffuser (340) disposed below the LED assembly board (330); and an adjustable airflow nozzle (350) extending downwardly from the fan (320) and protruding through the LED assembly board (330) and the light diffuser (340). The light diffuser (340) comprises airflow orifices (342). The adjustable airflow nozzle (350) provides directed airflow downwardly toward a bottom area of the housing (310). The plurality of lighting and airflow fixtures (300) are arranged such that each lighting and airflow fixture (300) is positioned above a cell (230) and air flow from the fan (320) and light from the LEDs (332) of the lighting and airflow fixture (300) is directed downwardly towards its respective cell (230).

The lighting and airflow fixtures (300) of the present invention are not limited to merely providing light and airflow. In some embodiments, the lighting and airflow fixtures (300) of the present invention provide direct injection of temperature-controlled air, $CO_2$, other gases, or other features.

In some embodiments, the growing module slidably engages a mounting component (140) disposed in a wall of an interior shell (110). In some embodiments, the mounting component (140) is disposed in a side wall (112) of the interior shell (110). In some embodiments, a mounting component flange (142) is disposed on the growing module container (210); the mounting component flange (142) slidably engages the mounting component (140) of the shell (110). In some embodiments, the interior shell (110) is slidably disposed in an exterior shell (120). This can include the incorporation of free-standing plants or series of tables of plants.

In some embodiments, the system (100) features an air filtration system. For example, in some embodiments, the system (100) features an air scrubber with a HEPA-type filter or other filter for particulates, microbes, certain viruses, etc. In some embodiments, the air filtration system also incorporates a UV sterilization system. In some embodiments, the air filtration system also incorporates UV sterilization of the air followed by scrubbing to remove any number of contaminants or components of the air, e.g., ethylene produced by organisms, $CO_2$, $O_2$, CO, hydrocarbons, NOX and VOC, Cl- and other chemicals that may outgas or be released.

In some embodiments, the semi-automated crop production system (100) further comprises an internal irrigation system (400) for controlled or continuous recirculation of water through the growing module (200). In some embodiments, the irrigation system (400) features irrigation with load cells (or tensiometers or other devices) under the growing modules to determine water and/or fertilizer consumption by plants, sap flow, temperature, etc. The internal irrigation system (400) connects to an inlet connection (410) and an outlet connection (420) disposed in the growing module container (210).

In some embodiments, the semi-automated crop production system (100) further comprises a sterilizing system (450) for sterilizing water of the internal irrigation system (400). The sterilizing system (450) may filter water with mesh/screen filters, sand/other stone filters, activated carbon, ion-exchange resin, ion selective membranes, distillation, or other filters or systems. The filters or other systems may remove particulate matter, chemicals, microbes, and organic acids and other growth-inhibiting substances produced by organisms or otherwise introduced into the system. In some embodiments, the sterilizing system (450) comprises a sterilizing lamp, an anti-microbial light, a UV-sterilizing system, a chemical sterilizing system, a system utilizing nano-sized gas bubbles such as oxygen in solution, or an ozone system.

In some embodiments, the semi-automated crop production system (100) further comprises boom system (500), wherein the boom system (500) comprises an X/Y track (502) along an X/Y direction and a Z track (501) along a Z direction, and a moveable boom (503) that can move along the X/Y direction (502) and the Z direction (501). The boom system (500) provides a horticultural function (e.g., irrigation, fertilization, air ducting, vacuum creation, lighting, pollinating, or contacting). In some embodiments, the boom system (500) further comprises a data acquisition system (504) comprising sensors and cameras, wherein the sensors and cameras are mounted on the moveable boom (503) or on the X/Y track (502) or Z track (501).

The present invention also features a semi-automated crop production system (100) comprising (a) a growing module (200) comprising a growing module container (210), a grid (220) disposed inside the growing module container (210), the grid (220) comprises a plurality of cells (230) adapted to hold a plant; (b) an internal irrigation system (400) for continuous recirculation of water through the growing module (200), the internal irrigation system (400) connects to an inlet connection (410) and an outlet connection (420) disposed in the growing module container (210); and (c) a boom system (500), the boom system (500) comprises an X/Y track (502) along an X/Y direction and a Z track (501) along a Z direction, and a moveable boom (503) that can move along the X/Y direction (502) and the Z direction (501), the boom system (500) provides a horticultural function. The growing module (200), irrigation system (400), and boom system (500) may be housed in a shell (110).

In some embodiments, the horticultural function comprises irrigation, fertilization, air ducting, vacuum creation, lighting, or contacting. In some embodiments, the boom system (500) further comprises a data acquisition system (504) comprising sensors and cameras, the sensors and cameras are mounted on the moveable boom (503) or on the X/Y track (502) or Z track (501). In some embodiments, the semi-automated crop production system (100) further comprises a coating disposed on the shell (110/120), the coating is chemically resistant and waterproof. In some embodiments, the coating is impregnated with anti-microbial, anti-viral or anti-bacterial elements. In some embodiments, the shell is coated with an insulating paint on the exterior.

In some embodiments, the present invention comprises a semi-automated crop production system. In some embodiments, the semi-automated crop production system of the present invention comprises at least one cultivation module, at least one lighting module, and at least one utility module.

In some embodiments, the semi-automated crop production system of the present invention comprises at least one modular growing unit. In some embodiments, the modular growing unit comprises a cultivation module, a lighting module, and a utility module.

In some embodiments, the cultivation module comprises a cultivation module top, a cultivation module base, a cultivation module first side, a cultivation module second side, a cultivation module front side, and a cultivation module back side.

In some embodiments, the cultivation module comprises a grid disposed inside the cultivation module proximal to the base of the cultivation module. In some embodiments, the grid comprises a plurality of cells each adapted to hold a crop.

In some embodiments, the lighting module is disposed at the top of the cultivation module. In some embodiments, the lighting module comprises a lighting unit disposed above the grid, supplying light to the crops disposed in the cells of the grid below.

In some embodiments, the utility module is slidably and removably disposed on the cultivation module base, beneath the grid. In some embodiments, the utility module comprises an irrigation system. In some embodiments, the irrigation system comprises an inlet connection and an outlet connection disposed on the utility module.

In some embodiments, the present invention comprises a shell, the shell housing at least one modular growing unit. In some embodiments, the shell comprises an interior shell, and exterior shell. In some embodiments, the shell comprises an interior shell located in an exterior shell. In some embodiments, a mounting component is disposed on a sidewall of the shell. In some embodiments, a modular growing unit slidably engages the mounting component of the interior shell such that the modular growing unit may be slidably removed from the semi-automated crop production system.

In some embodiments, the present invention comprises a lighting and airflow fixture. In some embodiments, the lighting and airflow fixture comprises a lighting and airflow fixture housing. In some embodiments, the lighting and airflow fixture comprises a light bulb base adapter for connection to a lightbulb socket. The lightbulb socket providing power to the lighting and air flow fixture. In some embodiments, the present invention comprises a fan disposed in the lighting and airflow fixture housing. In some embodiments, the fan is positioned to blow air downwardly. In some embodiments, a filter is places above the fan. In some embodiments, the lighting and airflow fixture comprises a light emitting diode (LED) assembly. In some embodiments, the LED assembly is disposed below the fan in the lighting and airflow fixture housing.

In some embodiments, the LED assembly comprises one or more LEDs. In some embodiments, the LED assembly comprises a perforated lighting plane to allow airflow. In some embodiment, the lighting and airflow fixture comprises an inner porous diffusing panel. In some embodiment, air is drawn upward between the lighting and airflow fixture housing and the porous diffusing panel and then downwardly through the center of the fixture.

In some embodiments, the lighting and airflow fixture comprises a changeable light diffuser. In some embodiments, the changeable light diffuser is disposed below the LED assembly. In some embodiment, the changeable light diffuser is configured to change the lighting spectrum. In some embodiments, the changeable light diffuser comprises one or more airflow orifices. In some embodiments, airflow from the fan and light from the one or more LEDs is directed downwardly through the light diffuser.

BRIEF DESCRIPTION OF THE DRAWINGS

In FIG. 28A the cooling and supplemental airflow and/or gas supply enter via the lighting unit airflow device (864), cooling the lighting and directing airflow downwards to the growing plane. FIG. 28B shows an embodiment where the gas inlet/outlet is directed into the orifice channel between the lighting panel (858) and the lighting unit (820). FIG. 28C illustrates an embodiment including a supplemental airflow device (870) below the lighting and airflow panel (858), and above the growing plane in the cultivation module (831). In alternative embodiment, the airflow/gas flow directions may be reversed, e.g. to draw air up though growing plane.

FIG. 37A single layer, FIG. 37B bilayer and FIG. 37C multilayer.

FIG. 45 is a perspective and internal view of an equipment module of a system of the present invention. The equipment module may support and contain the hardware needed to operate the system. The equipment module may house lighting components, environmental control components, irrigation components, and the like.

DESCRIPTION OF PREFERRED EMBODIMENTS

Figure 1:
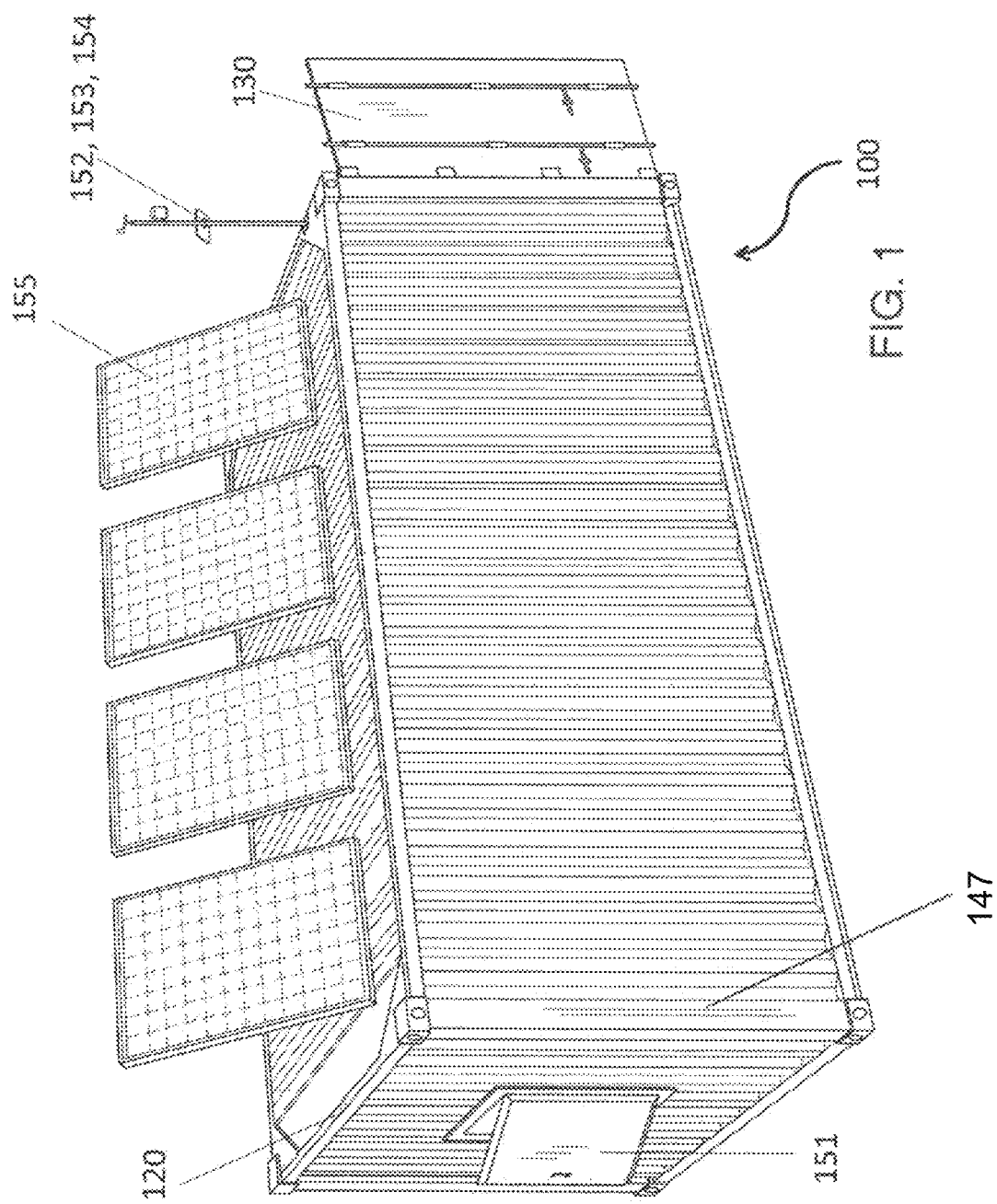
FIG. 1 is a perspective view of the semi-automated crop production system of the present invention.
Figure 2:
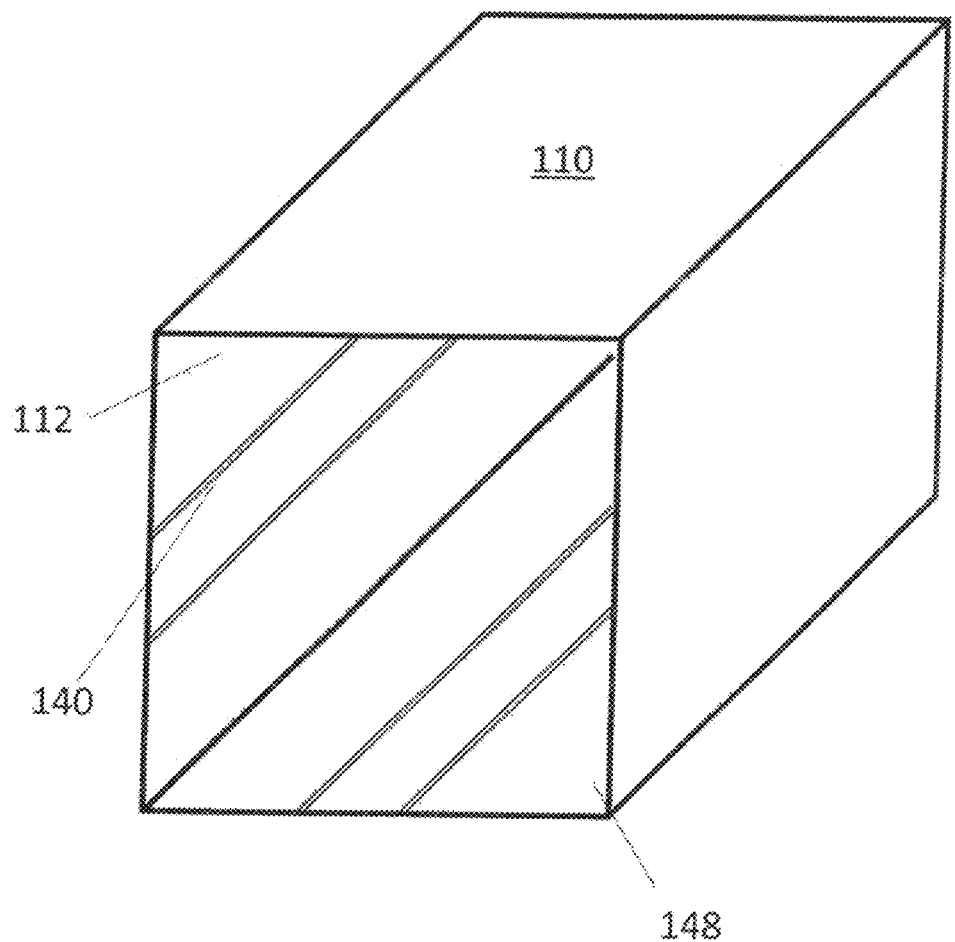
FIG. 2 is an internal view of the system of the present invention showing the inner shell and mounting components.
Figure 3A:
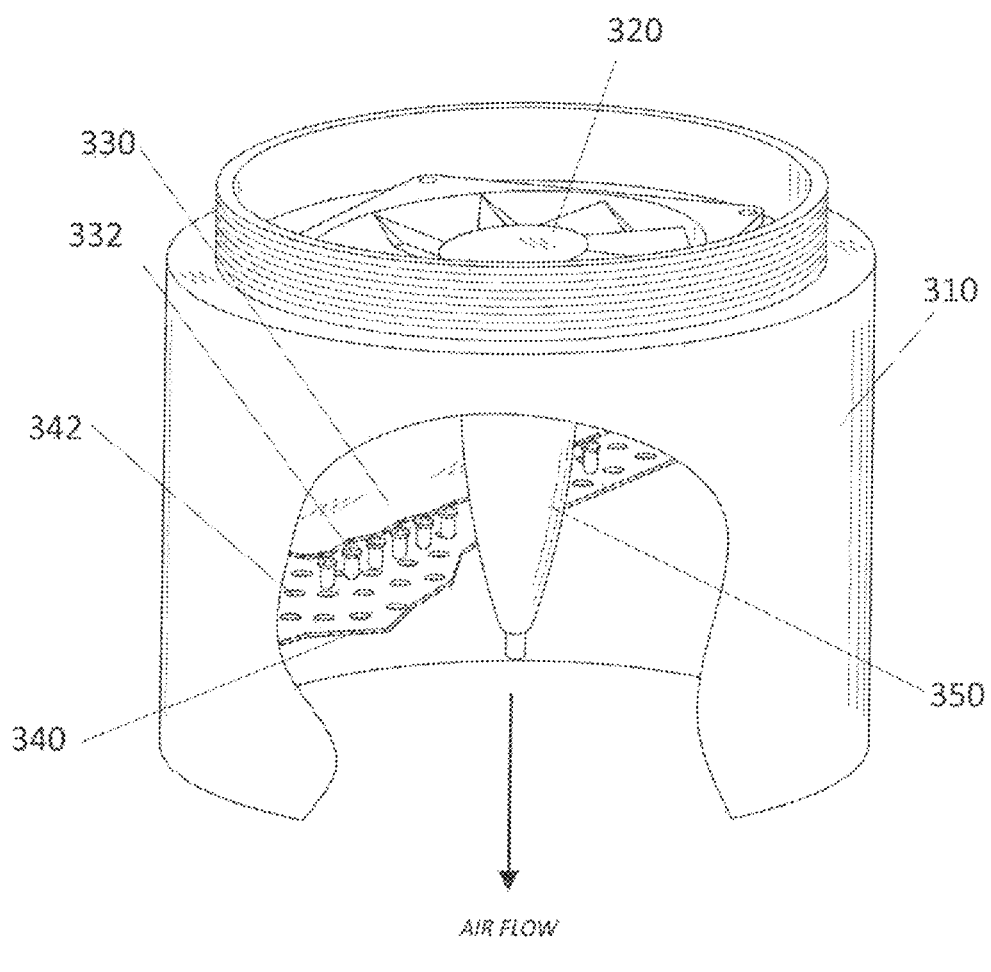
FIG. 3A is a perspective and internal view of a light and airflow fixture (300) of the present invention.
Figure 3B:
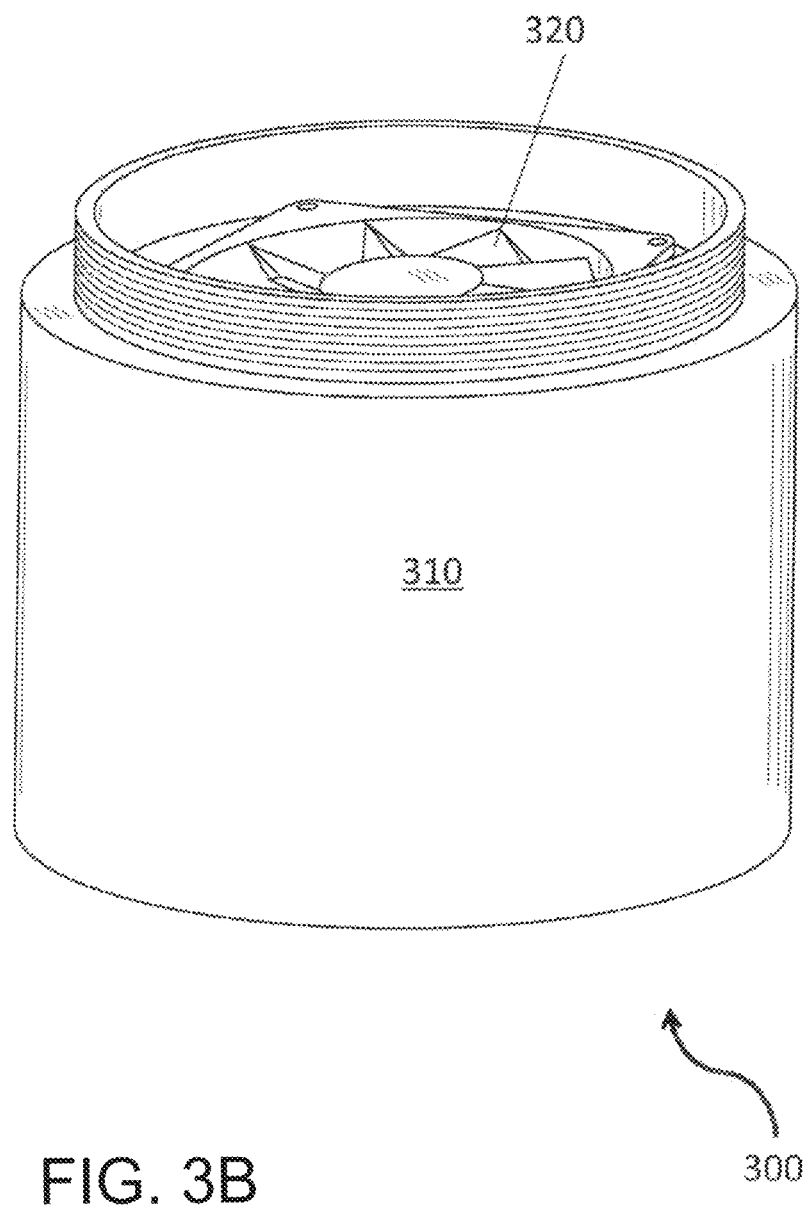
FIG. 3B is another perspective view of a lighting and airflow fixture (300) of the present invention.
Figure 4A:
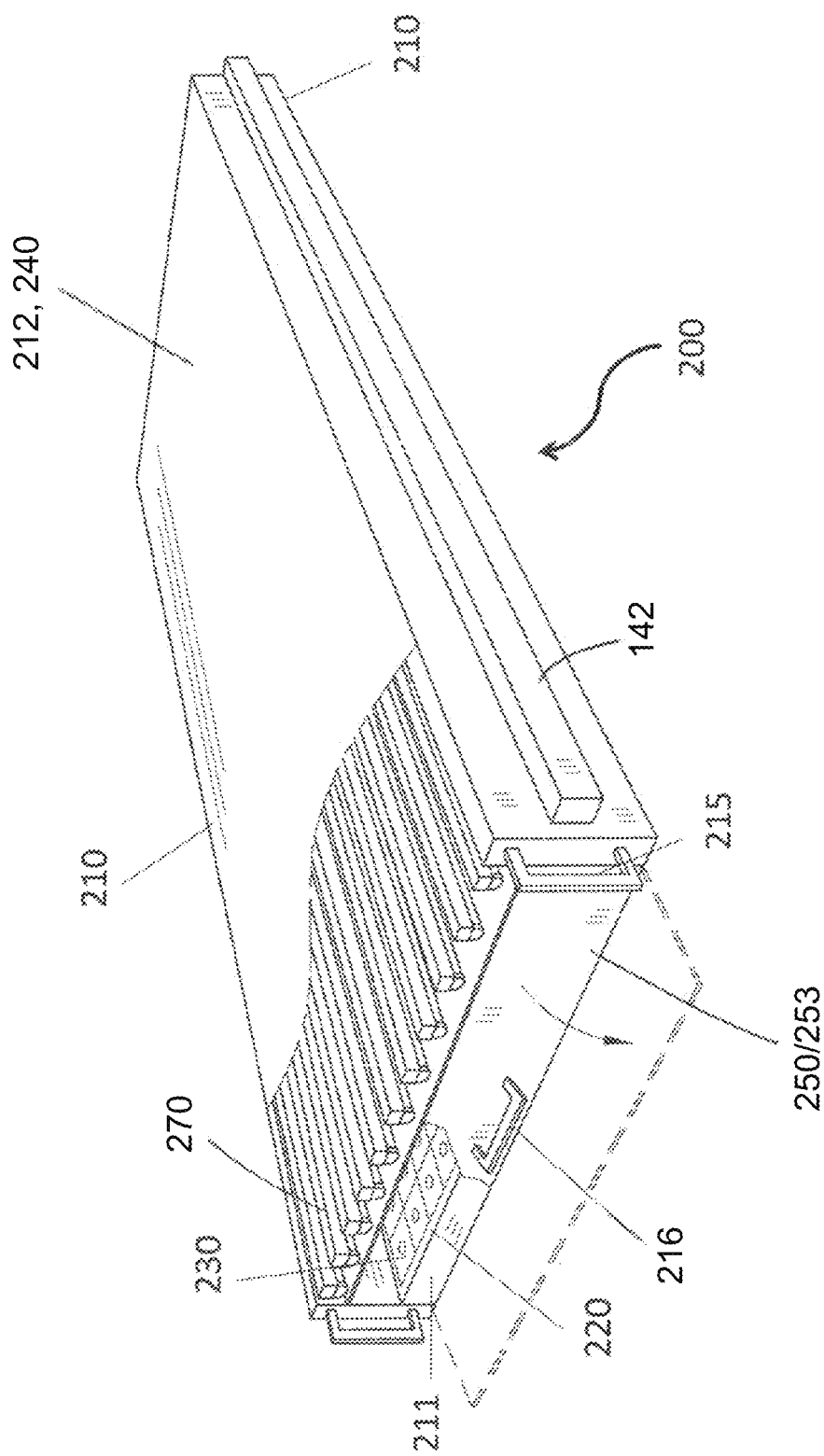
FIG. 4A is a first perspective view of a growing module of the present invention.
Figure 4B:
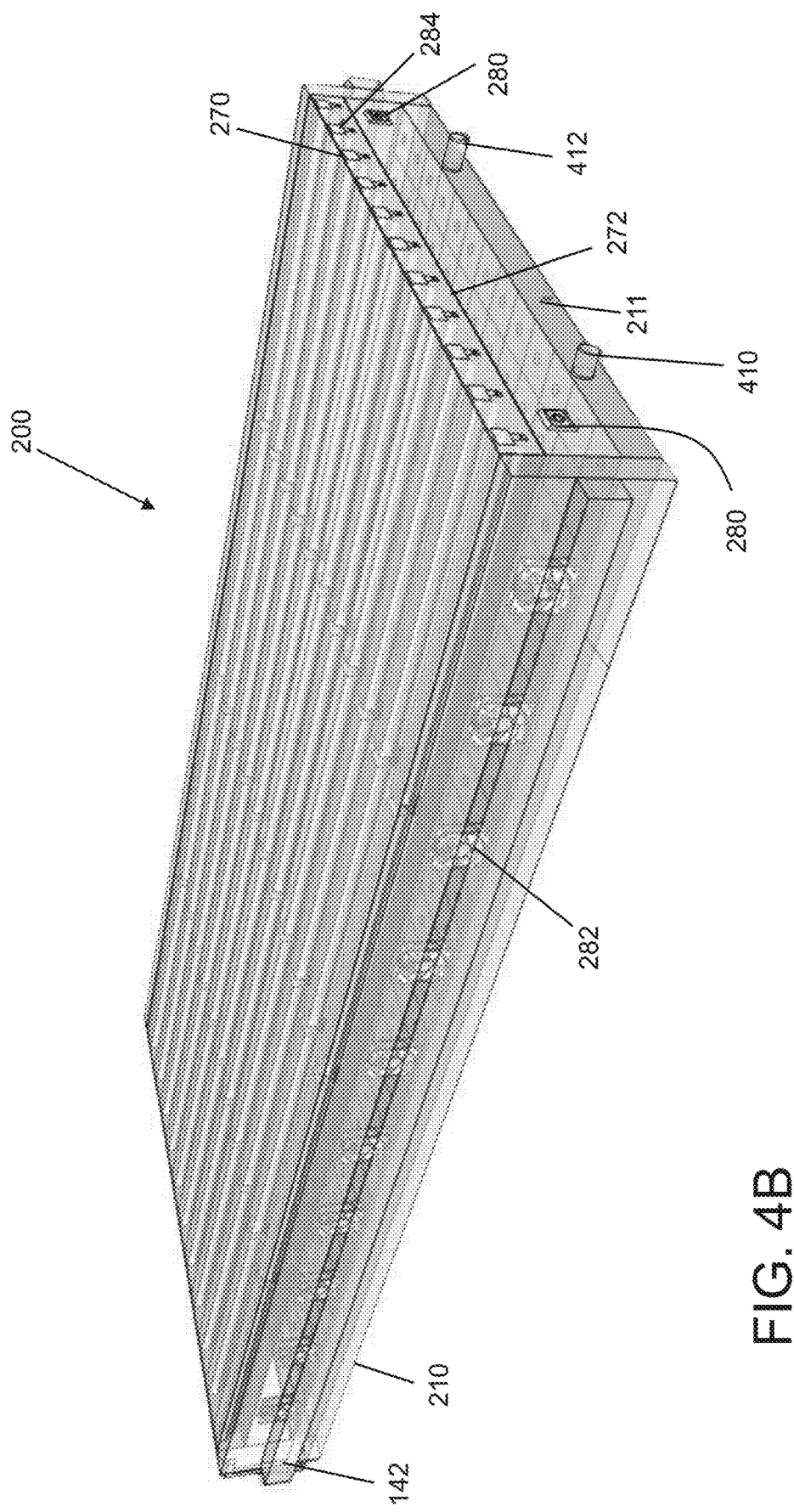
FIG. 4B is a second perspective view of the growing module of the present invention showing inlet and outlet connections to the irrigation system on the backside of the module, lighting component (270) and growing area fans (282).
Figure 4C:
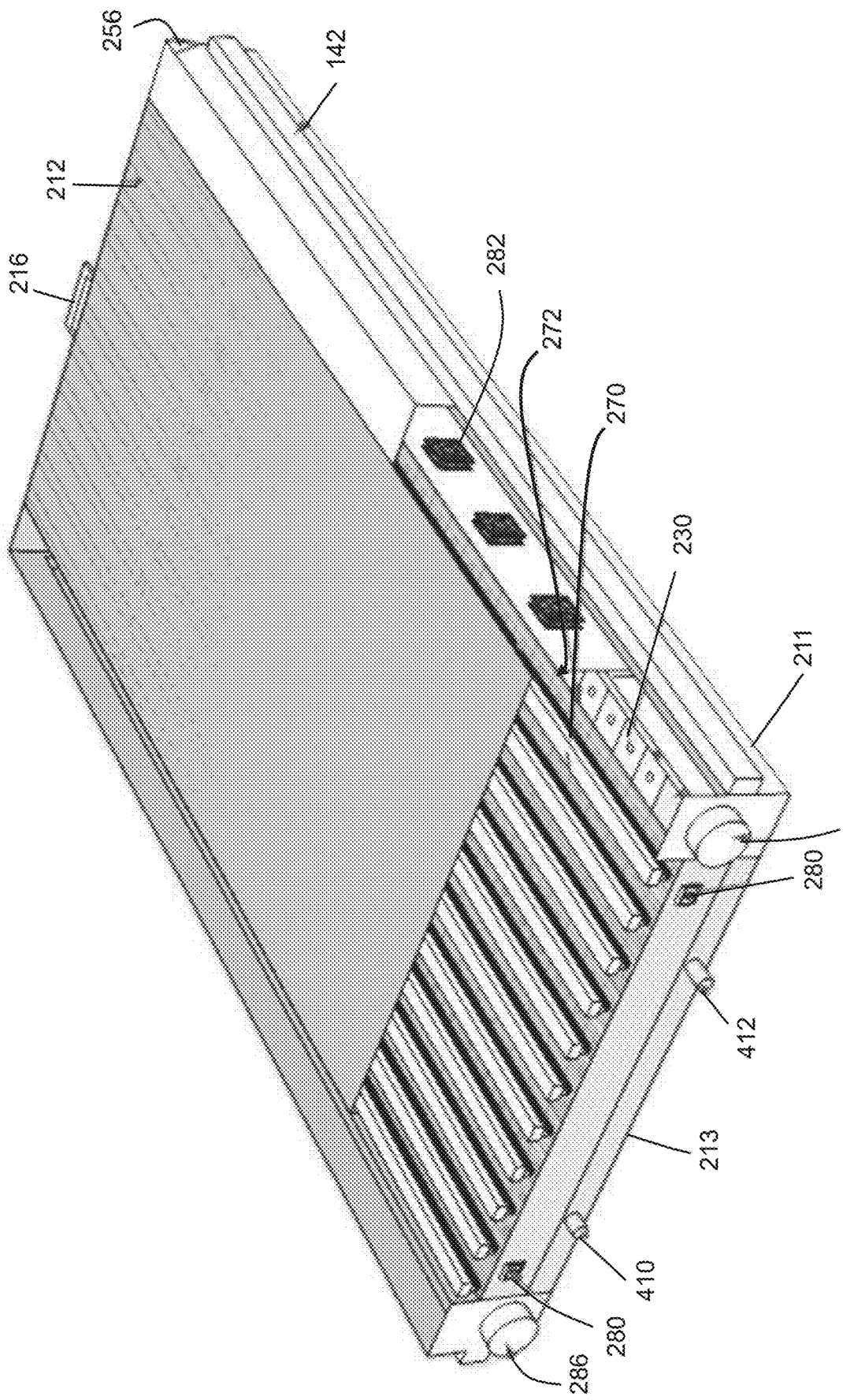
FIG. 4C is another perspective view of a growing of the present invention.
Figure 4D:
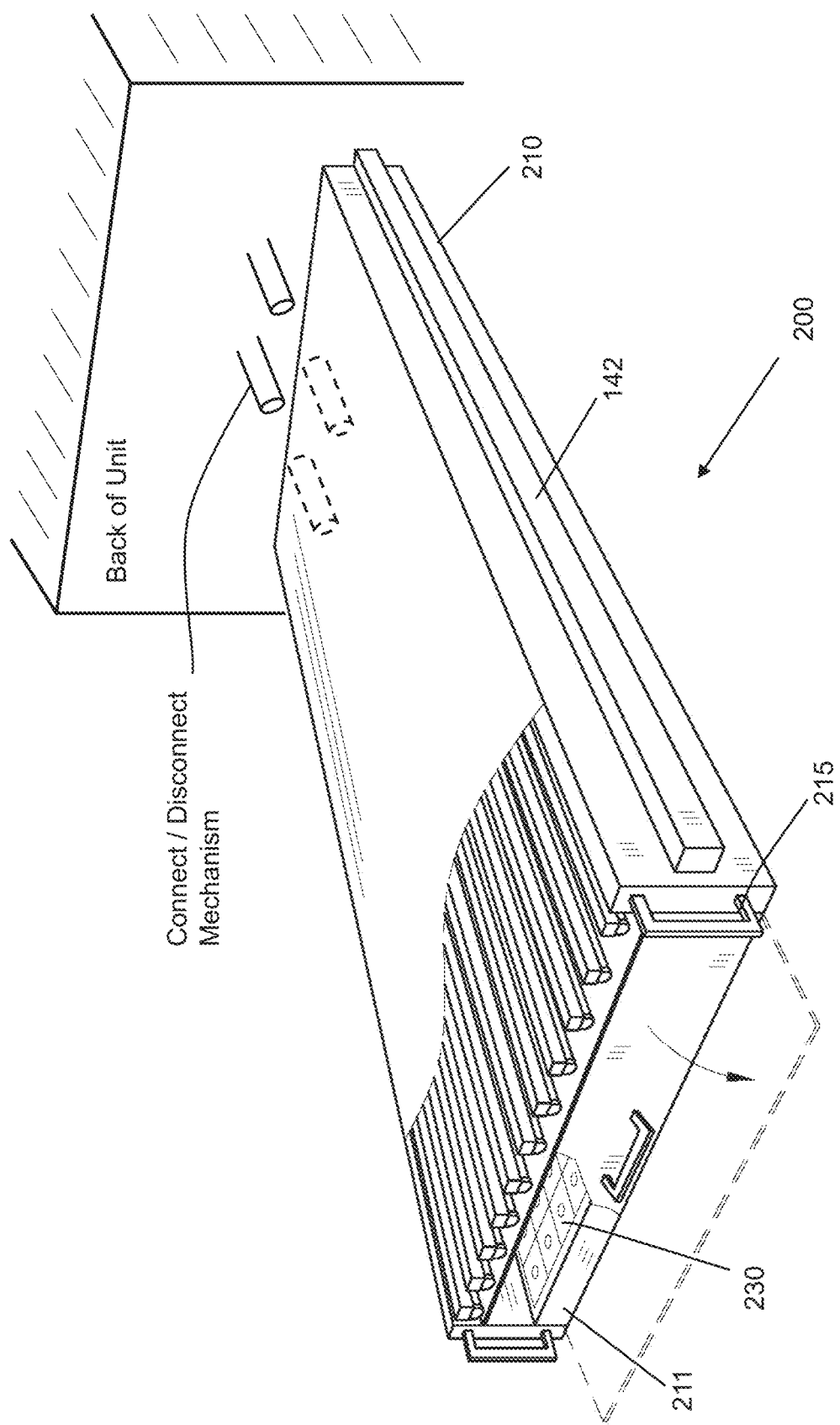
FIG. 4D is an alternative perspective view of a growing module of the present invention showing inlet connection and outlet connections to the irrigation system located on the front side of the module.
Figure 5:
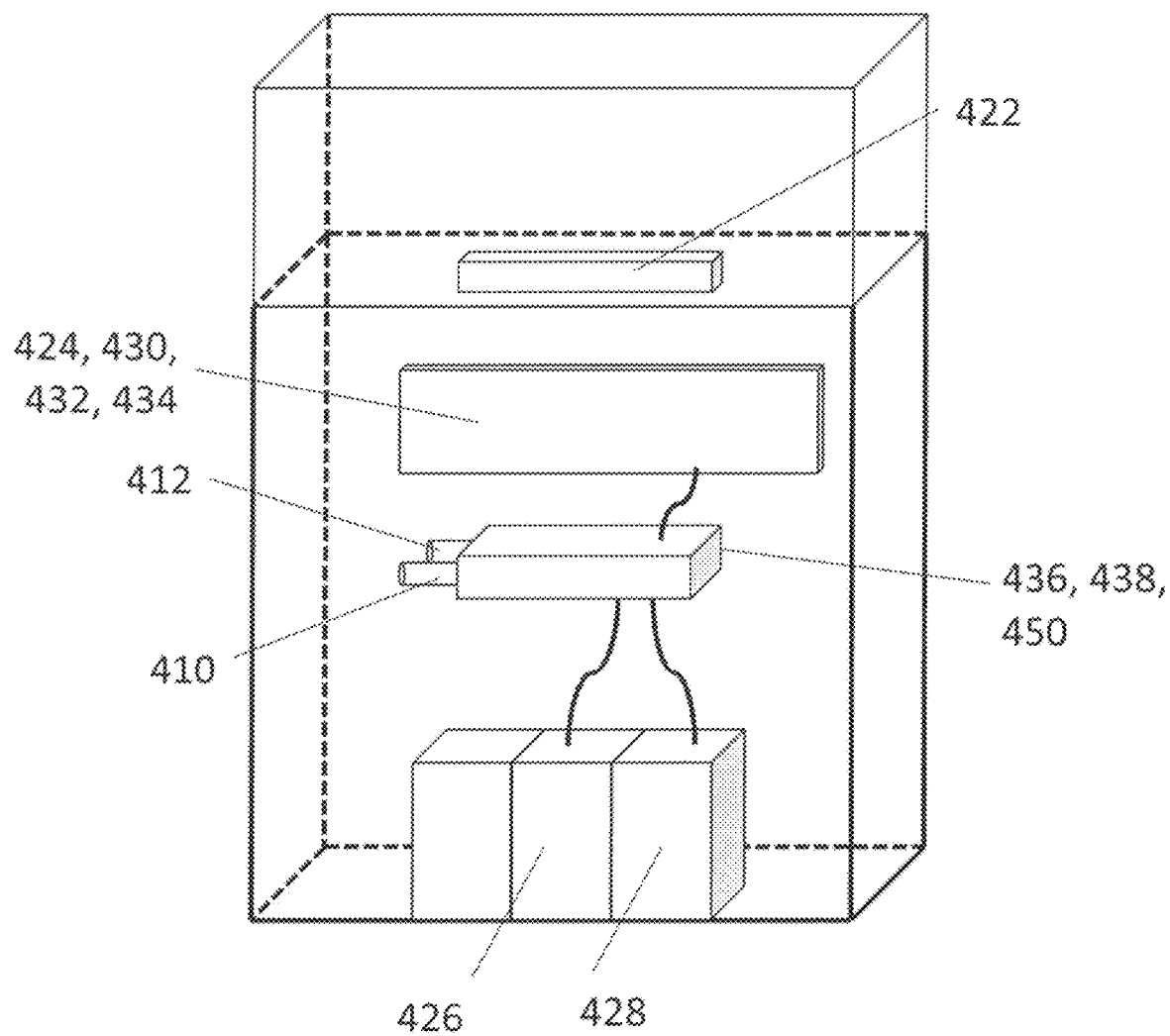
FIG. 5 shows components of an irrigation system of the present invention.
Figure 6:
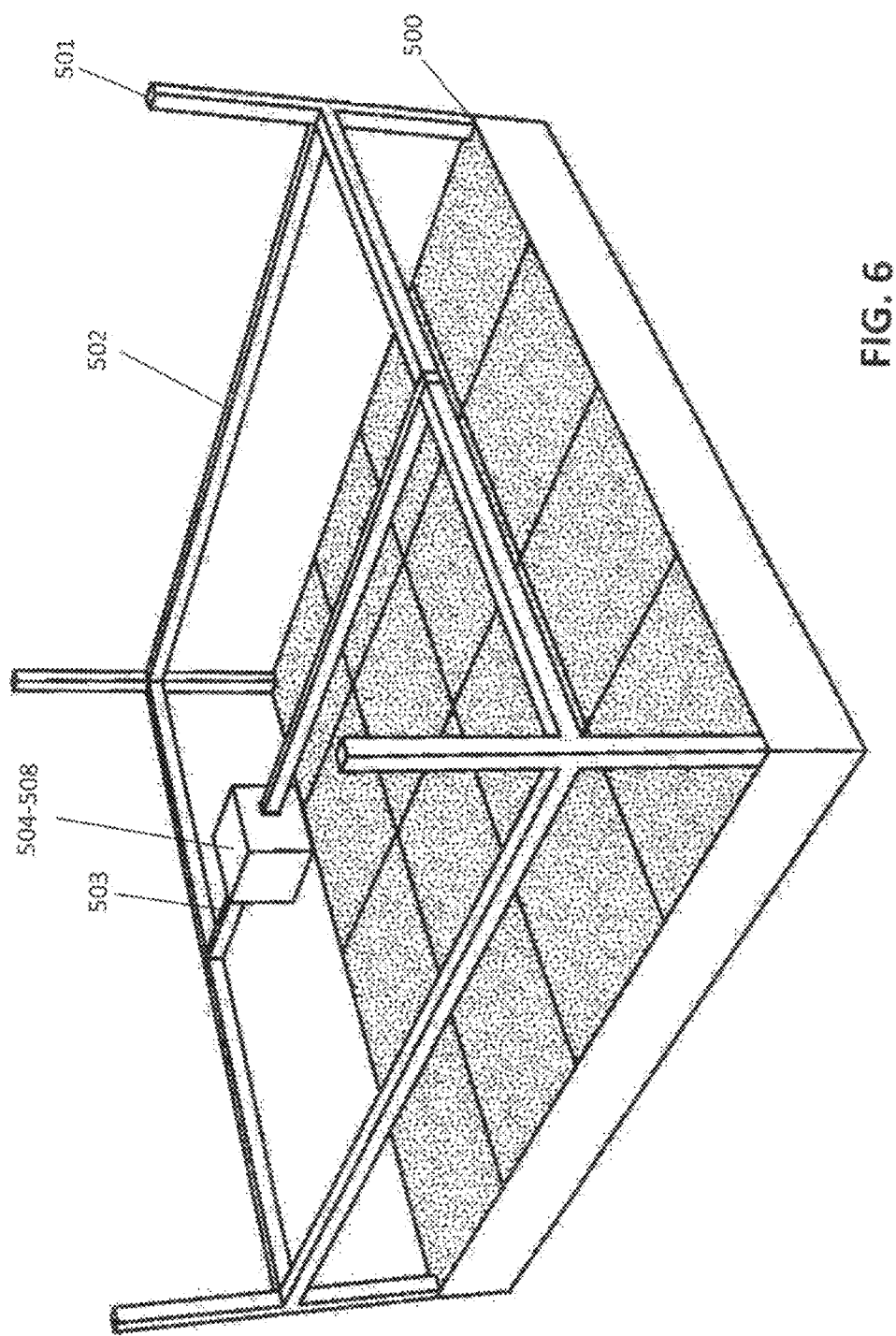
FIG. 6 shows the boom system of the present invention.
Figure 7:
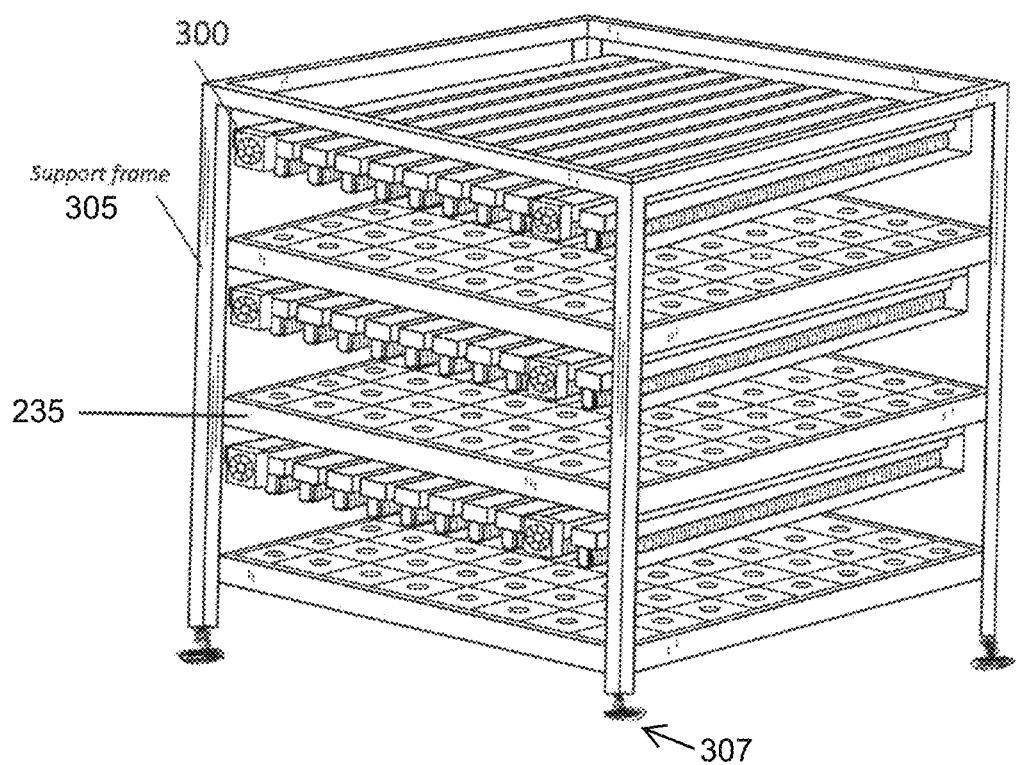
FIG. 7 is a perspective view of a set of growing modules stacked in a support frame. Optional leveling feet are shown on the bottom of the frame.
Figure 8A:
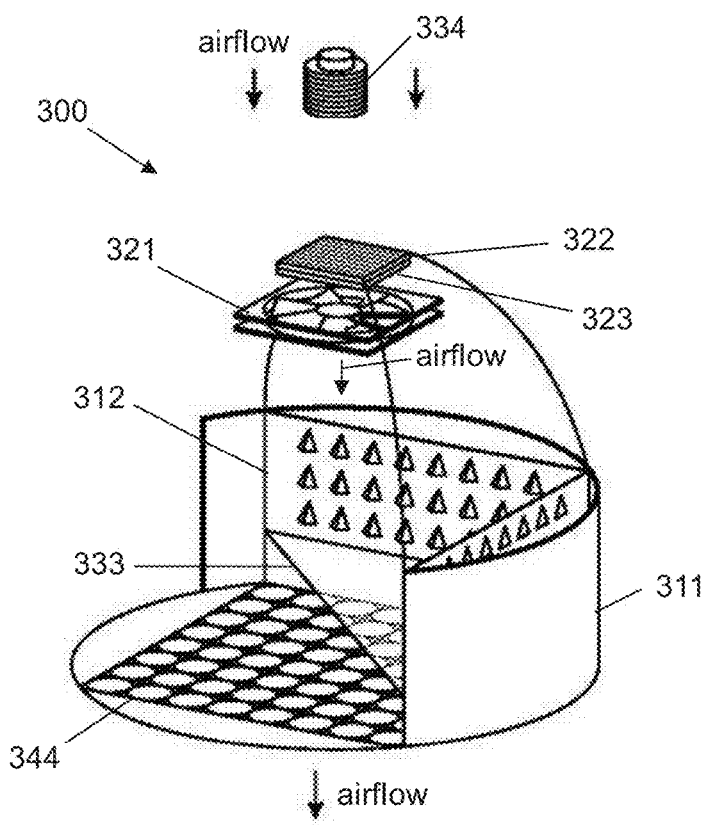
FIG. 8A shows a perspective and internal view of an alternative light and airflow module (300) of the present invention.
Figure 8C:
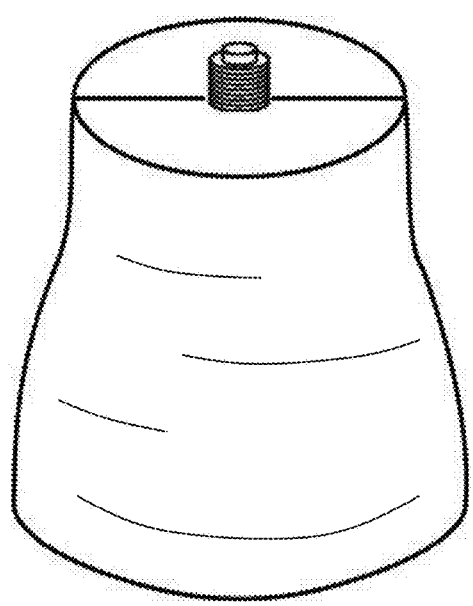
FIG. 8C shows the exterior of the light and airflow module of FIG. 8A.
Figure 8B:
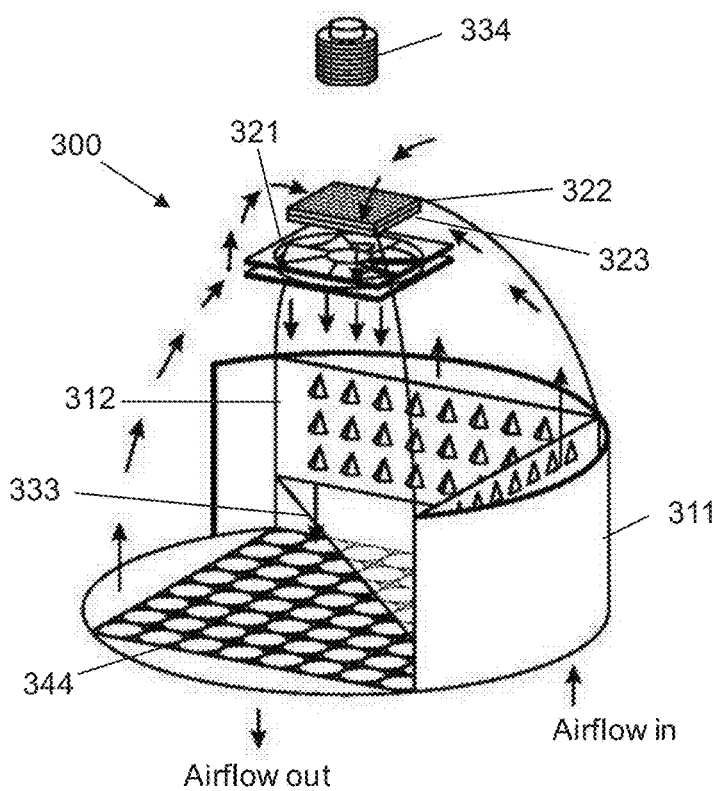
FIG. 8B shows an alternative airflow pattern for the light and airflow module of FIG. 8A.
Figure 9:
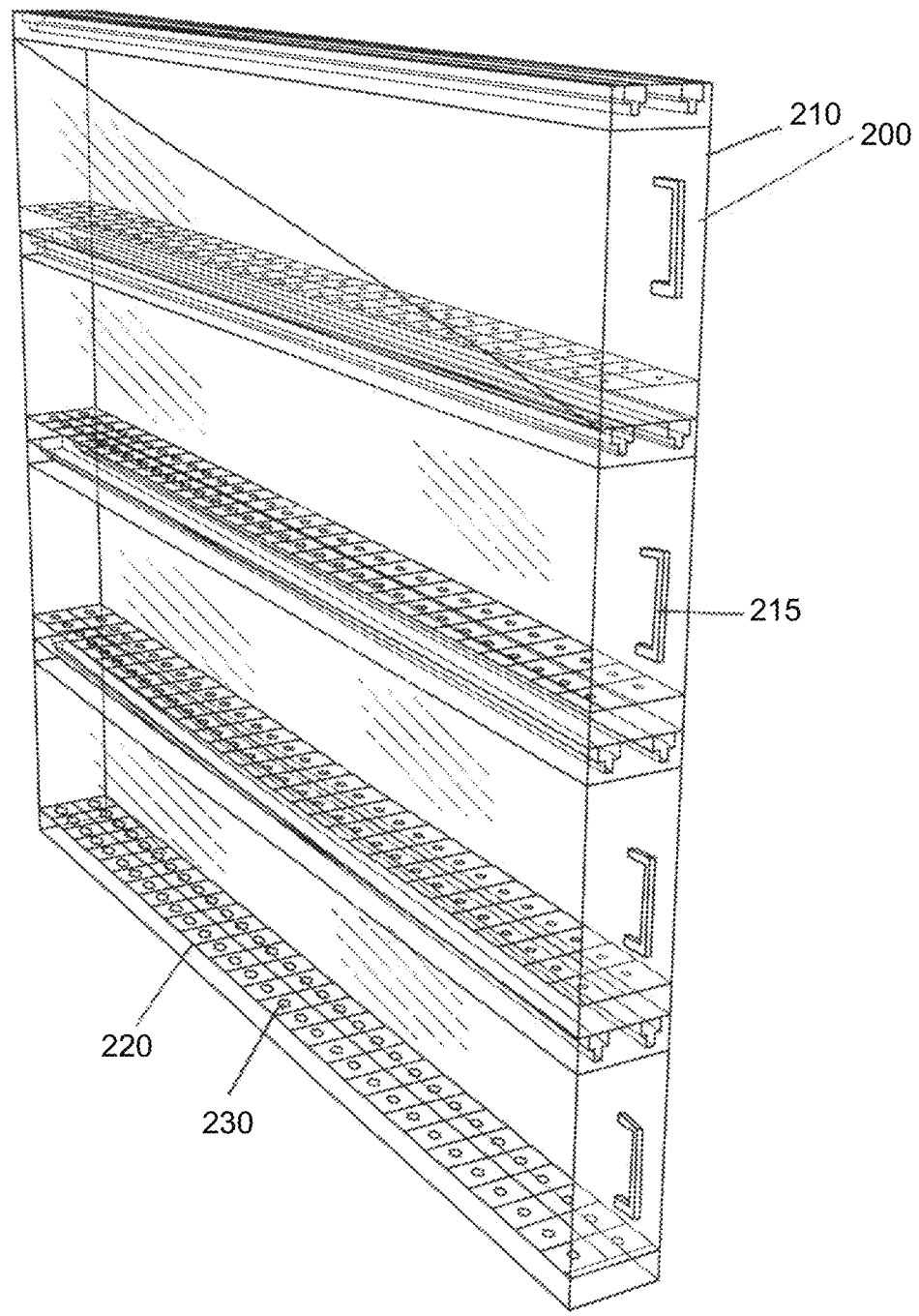
FIG. 9 is a perspective and internal view of one embodiment of vertically stacked growing modules (200) of the present invention.
Figure 10A:
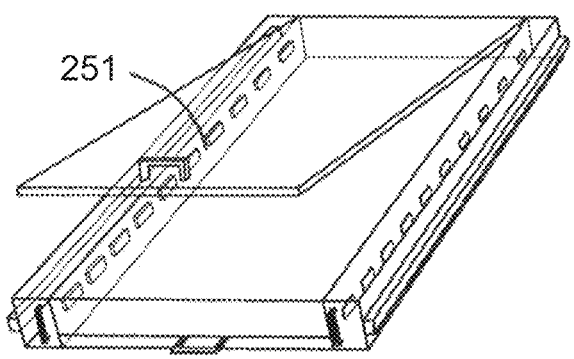
FIGS. 10A-10E show perspective views of growing modules (200) with alternative access doors/openings to the module. For example, the opening access (250) is shown in the top surface (251) in FIG. 10A and FIG. 10D in two alternative embodiments. In other alternative embodiments, the opening access (250) is shown in the front surface (253) only in embodiment FIG. 10B, in front surface (253) and back surface (254) in embodiment FIG. 10C, and in a side surface (252) in embodiment FIG. 10E. The top covers are not shown in FIGS. 10B, 10C and 10E.
Figure 10B:
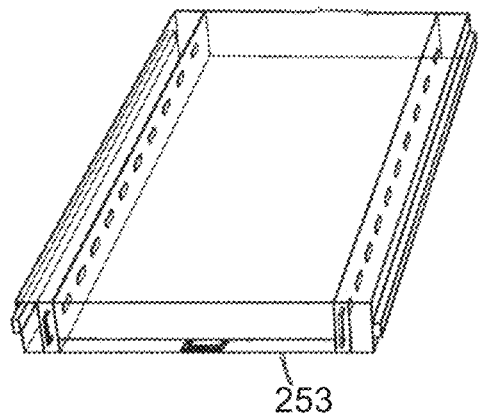
Figure 10C:
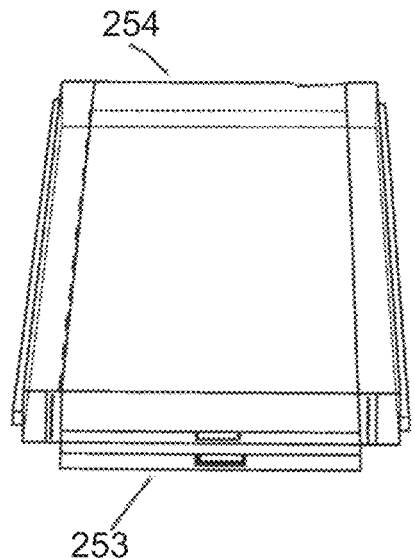
Figure 10D:
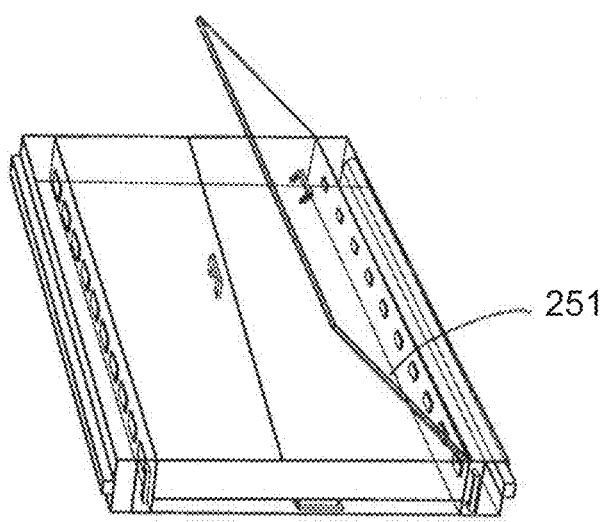
Figure 10E:
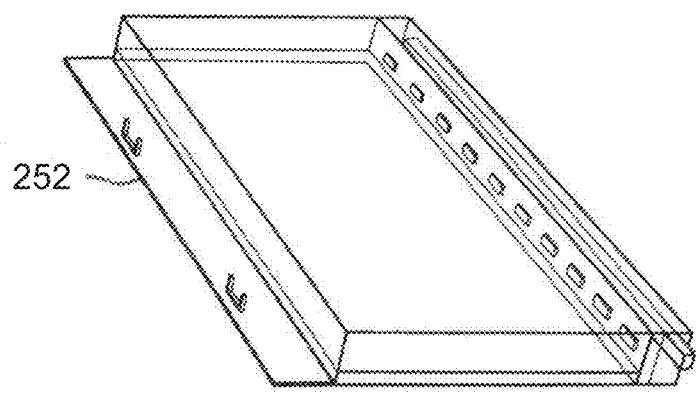
Figure 12:
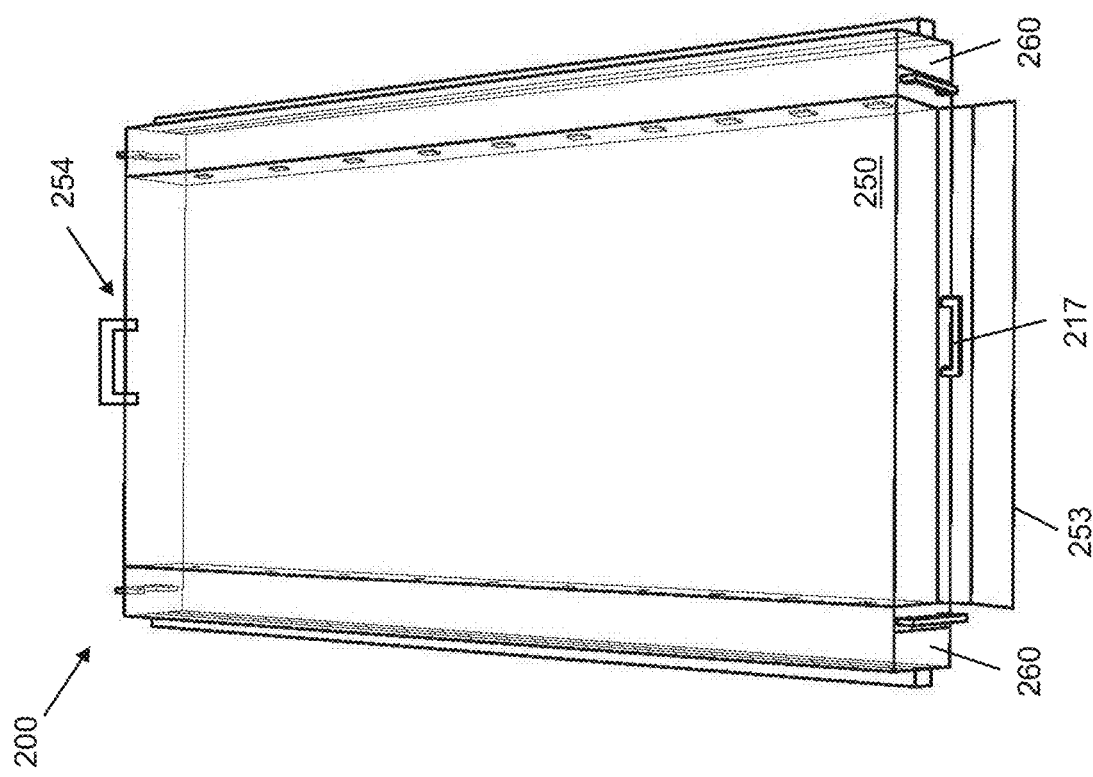
FIG. 12 is an expanded perspective and view of FIG. 10C showing a growing module with front (253) and back (254) surface access (250).
Figure 11:
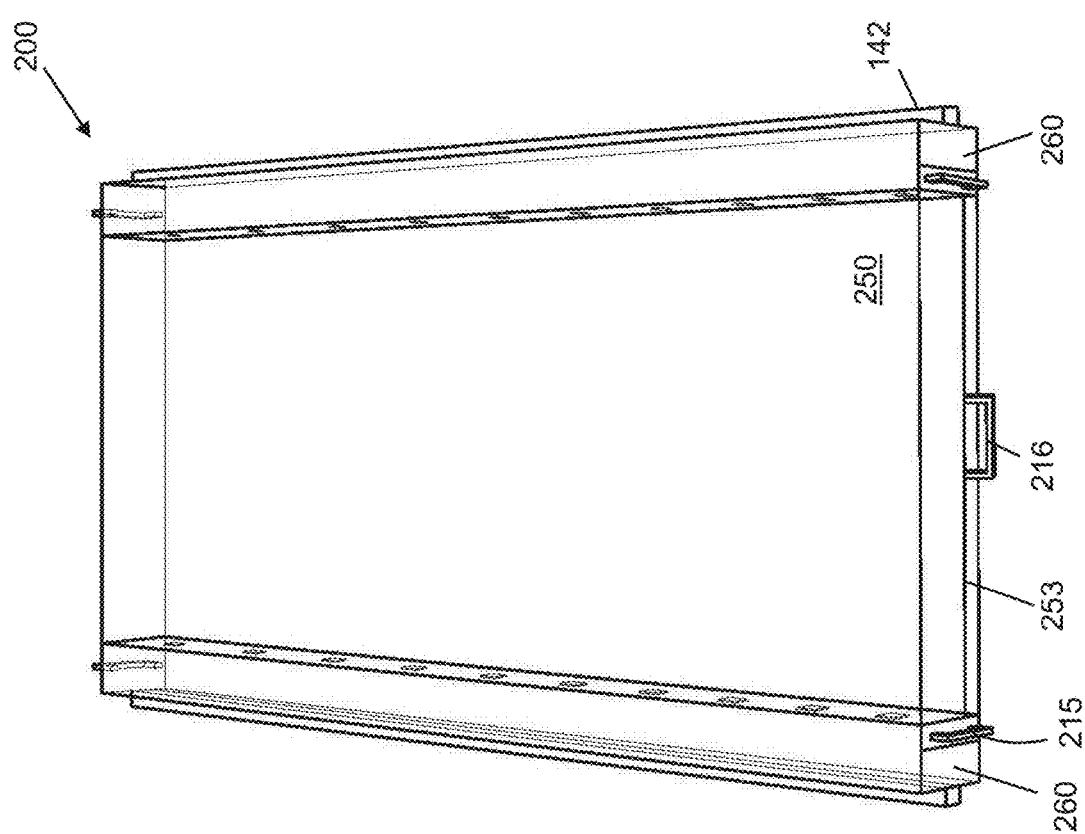
FIG. 11 is an expanded perspective and view of FIG. 10B showing a growing module with front surface (253) only access (250). The top cover is not shown in this perspective.
Figure 13A:
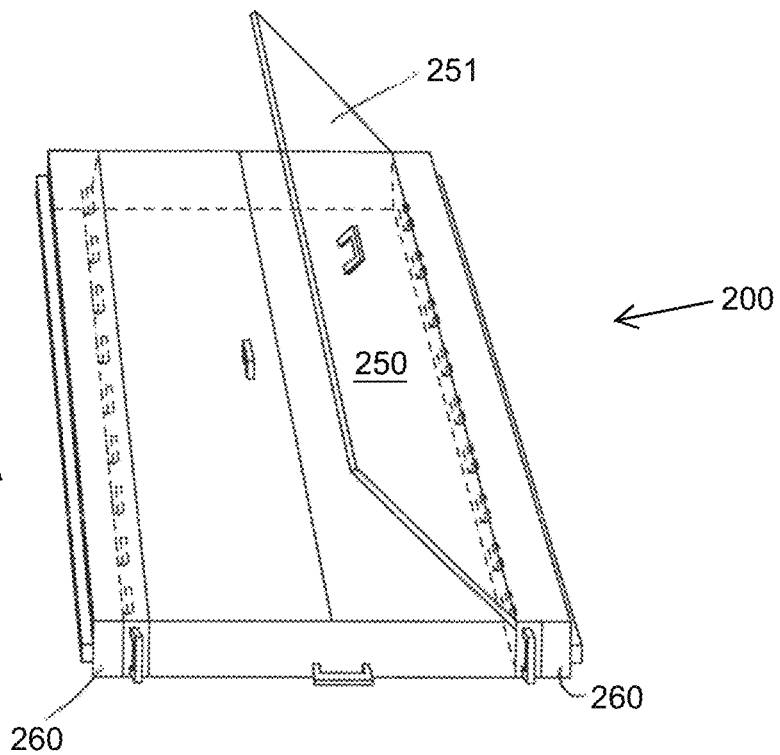
FIGS. 13A and 13B are an expanded perspective and views of the growing module FIG. 10D showing side air/gas flow ducts/channels (260) and air flow/circulation devices (261) within the channel/duct (260).
Figure 13B:
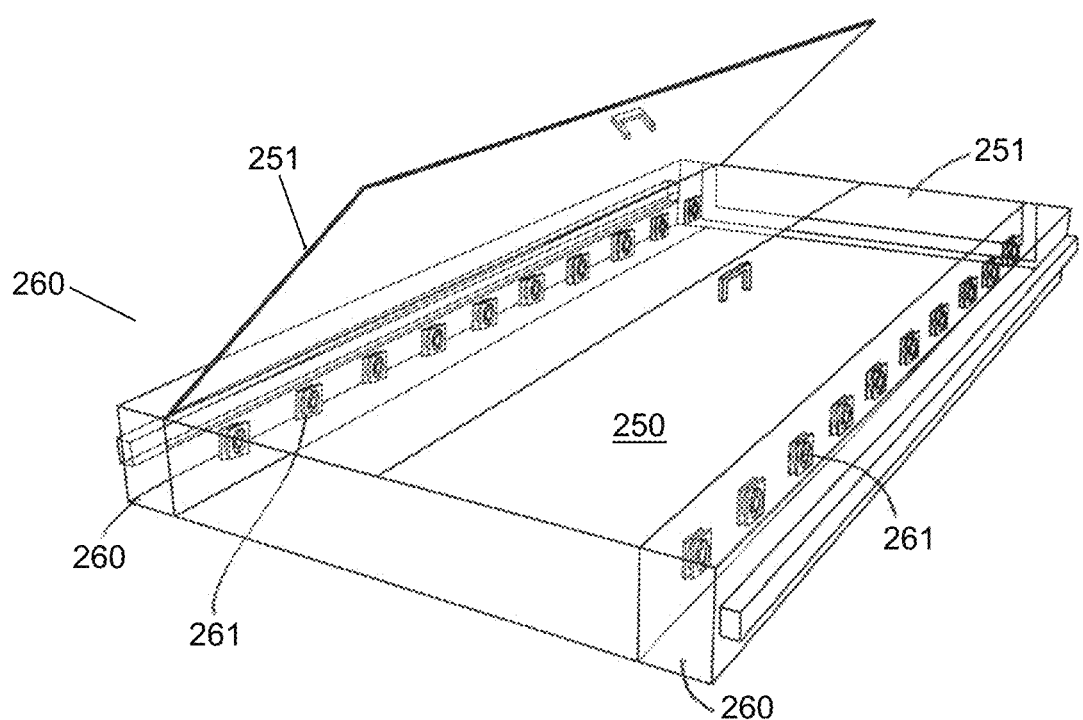
Figure 14:
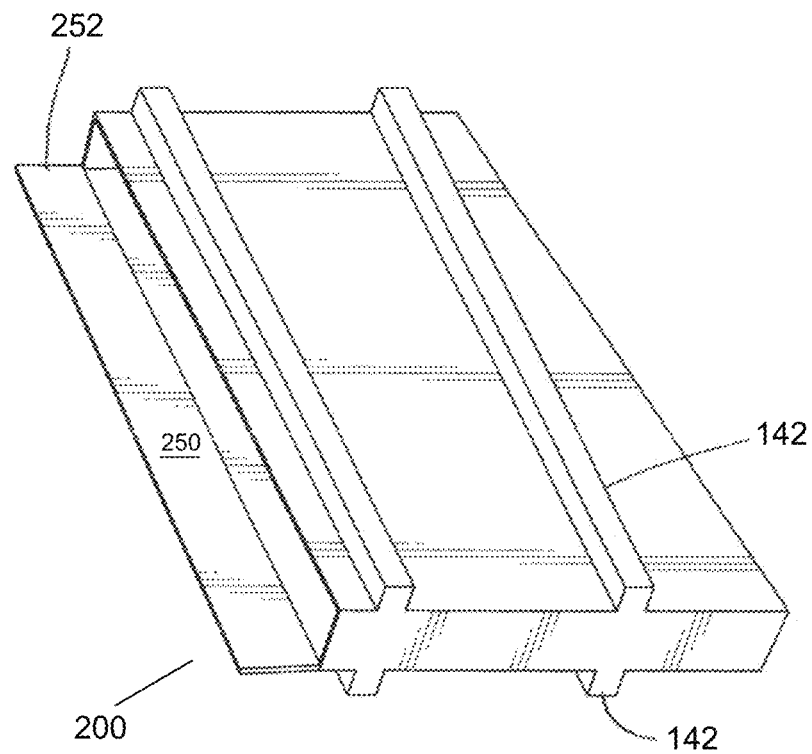
FIG. 14 is an expanded perspective of a growing module showing side access door (250). In this embodiment mounting component flanges are shown on the top and bottom surfaces of the growing module.
Figure 15:
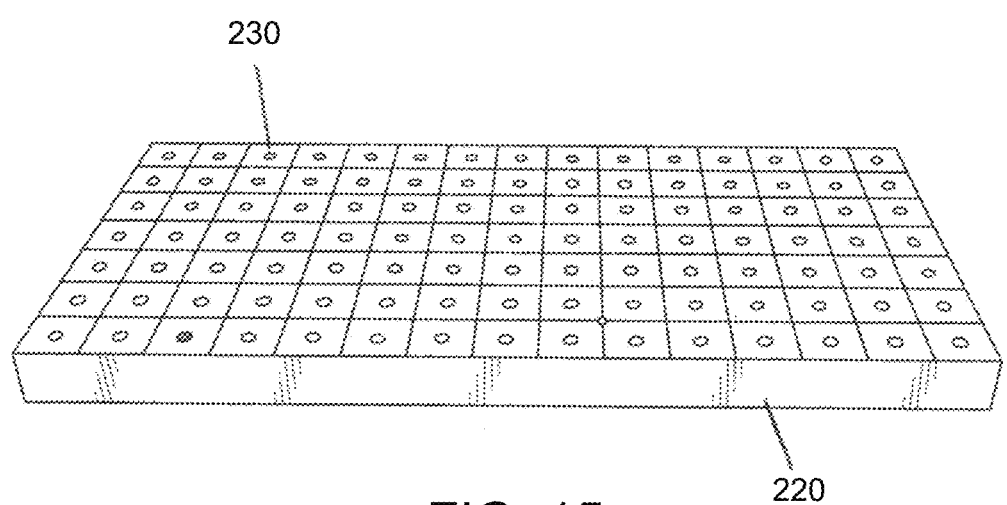
FIG. 15 is a perspective of a growing plane grid (220) with a plurality of cultivation cells (230).
Figure 16:
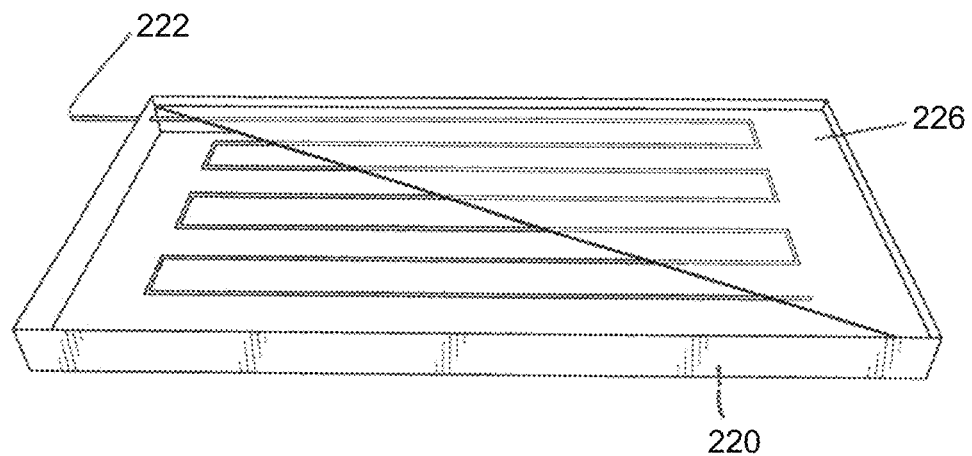
FIG. 16 shows an embodiment of a growing plane grid (220) of the present invention comprising a heating and/or cooling element (222). The heating and/or cooling element may be positioned in the surface of the grid (220), embedded in the grid, or positioned on the bottom side of the grid. The surface of the growing plane may be optionally coated (226) (for example with a reflective (e.g to light/heat)/self sterilizing/insulative coating).
Figure 17:
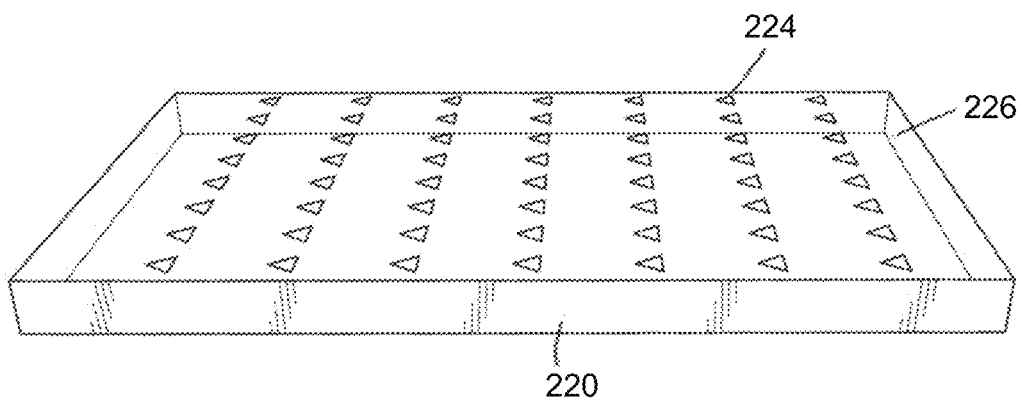
FIG. 17 shows an alternative embodiment of the growing plane grid (220) comprising a lighting element (224) (e.g. LED or other lighting source) embedded in the upper surface of the growing plane. The surface may also be coated (226). The lighting element provides lighting in an upward direction to the understory of the plant being cultivated. The lighting element may also be used for sterilization. The lighting may be a primary or supplemental source of lighting to the growing module.
Figure 18:
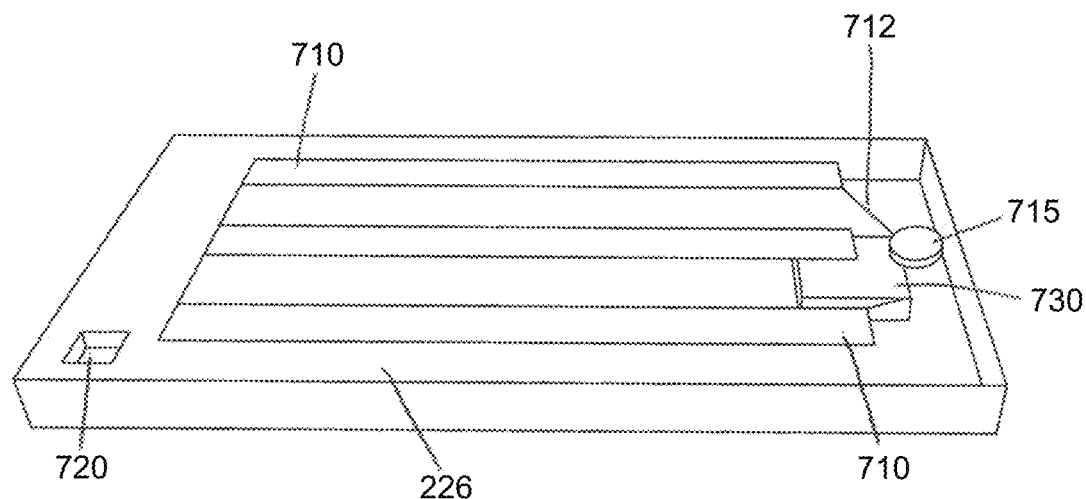
FIG. 18 is another embodiment of the growing plane grid (220) with a surface photovoltaic array (710), photodiode (730), below surface battery (730), and RFID chip (720) to provide wireless communication of growing parameters, etc.
Figure 19:
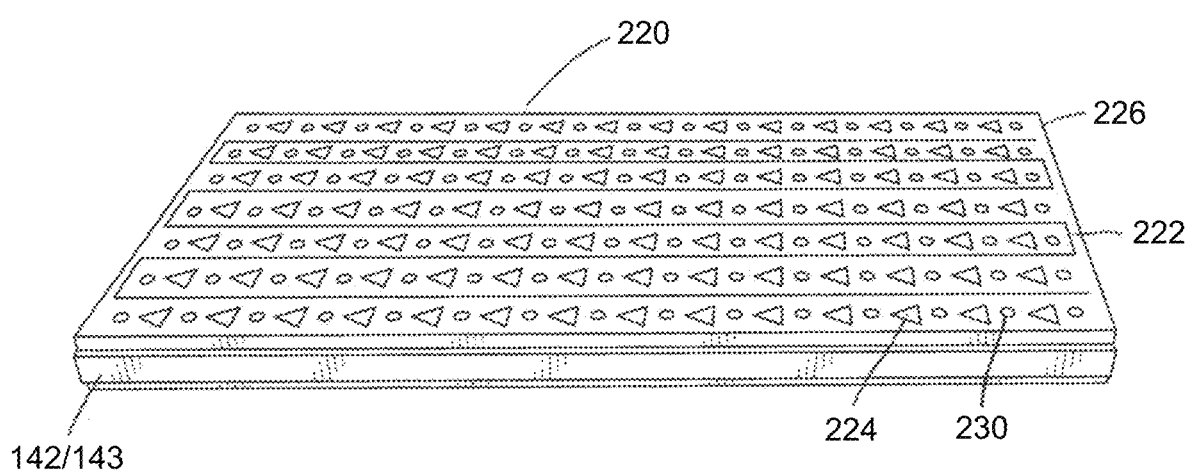
FIG. 19 is another embodiment of the growing plane grid (220) of the present invention with cells for crop cultivation (230) comprising a temperature control device (222), supplemental lighting (224) and a coated surface (226). The growing plane further comprises a tongue and grove mounting component flange (142) or floatation system (143).
Figure 20:
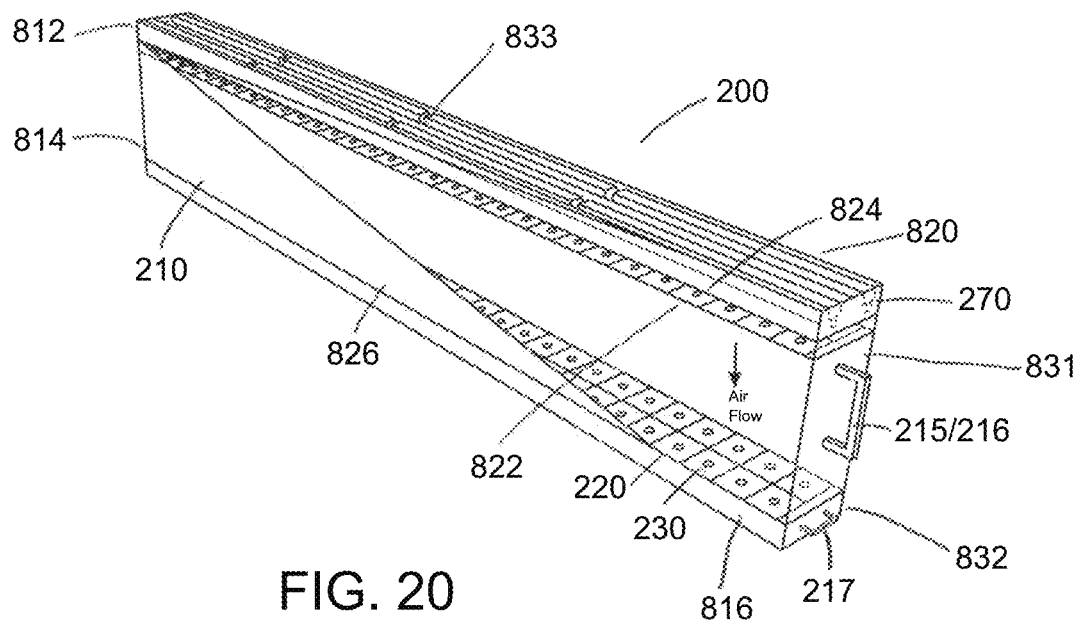
FIG. 20 is an exploded perspective view of a growing module of stacked system of FIG. 9
Figure 21:
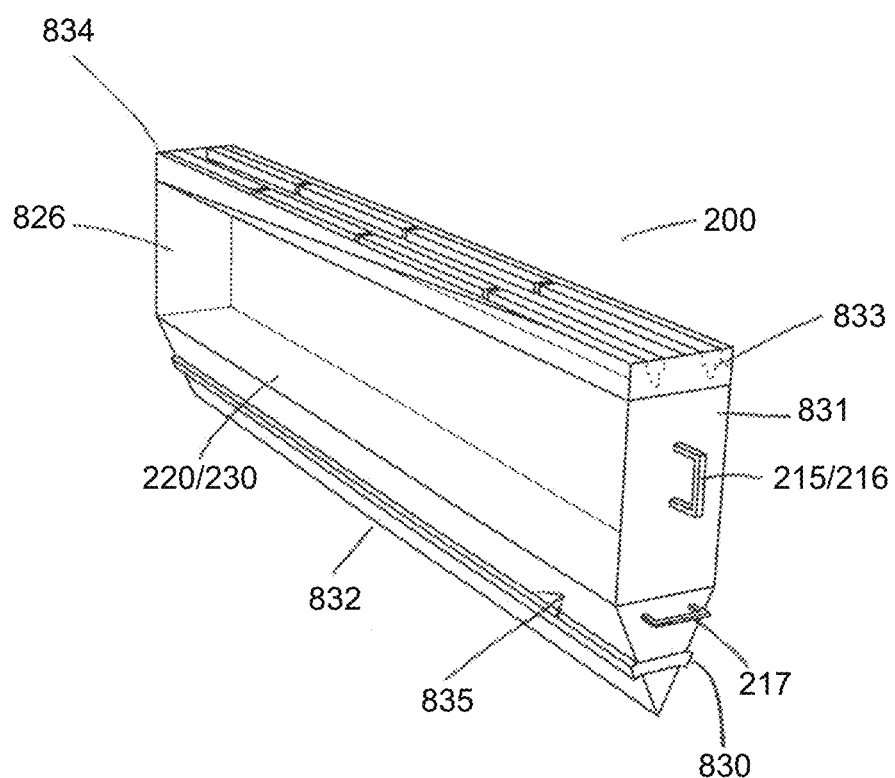
FIG. 21 is a perspective view of an alternative growing module of the present invention without assisted airflow.
Figure 22:
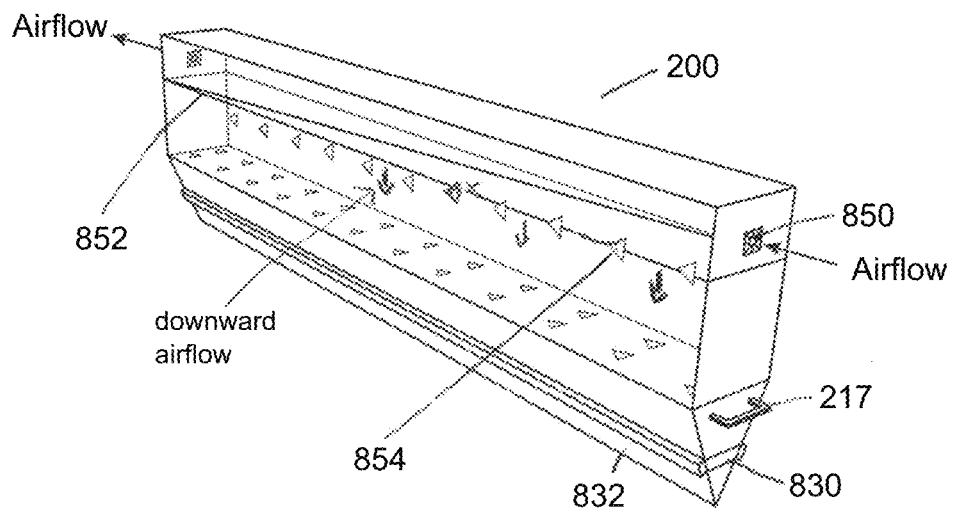
FIG. 22 is a perspective view of an alternative growing module of the present invention with airflow and sidewall lighting.
Figure 23:
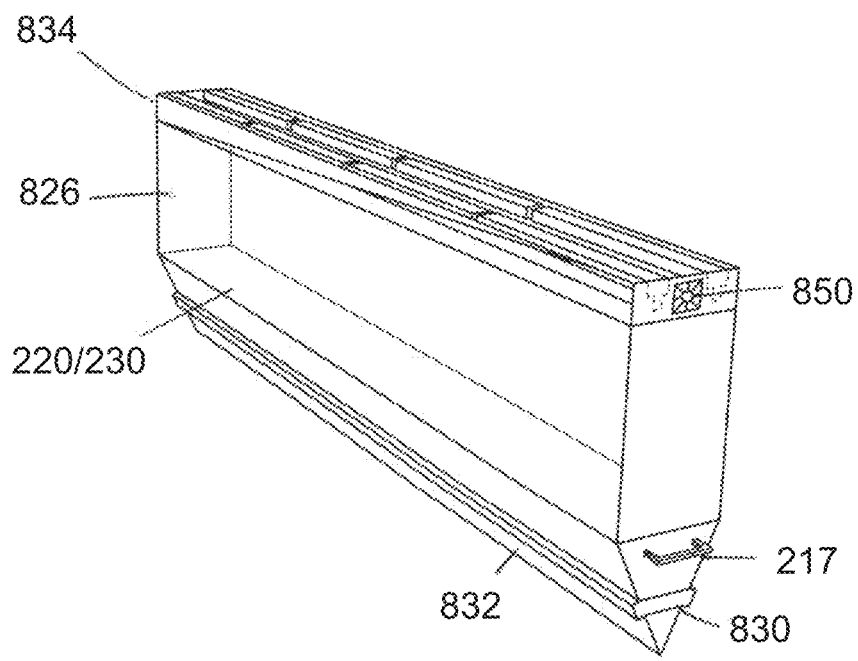
FIG. 23 is a perspective view of an alternative growing module of the present invention with assisted airflow.
Figure 24:
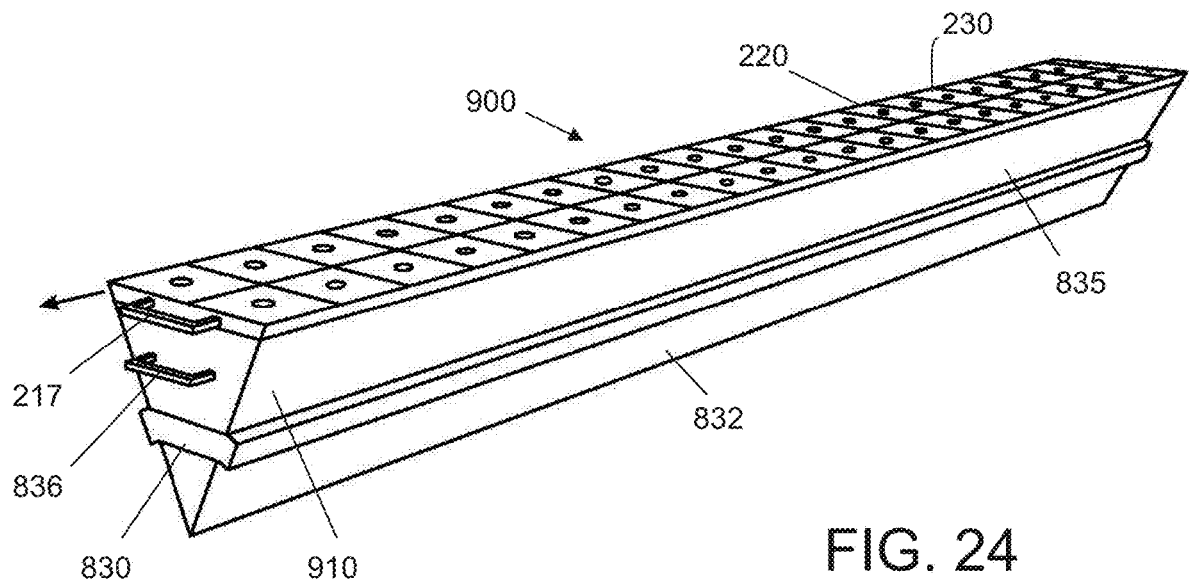
FIG. 24 is an exploded view of a growing plane and a utility module of a growing module of the present invention.
Figure 25:
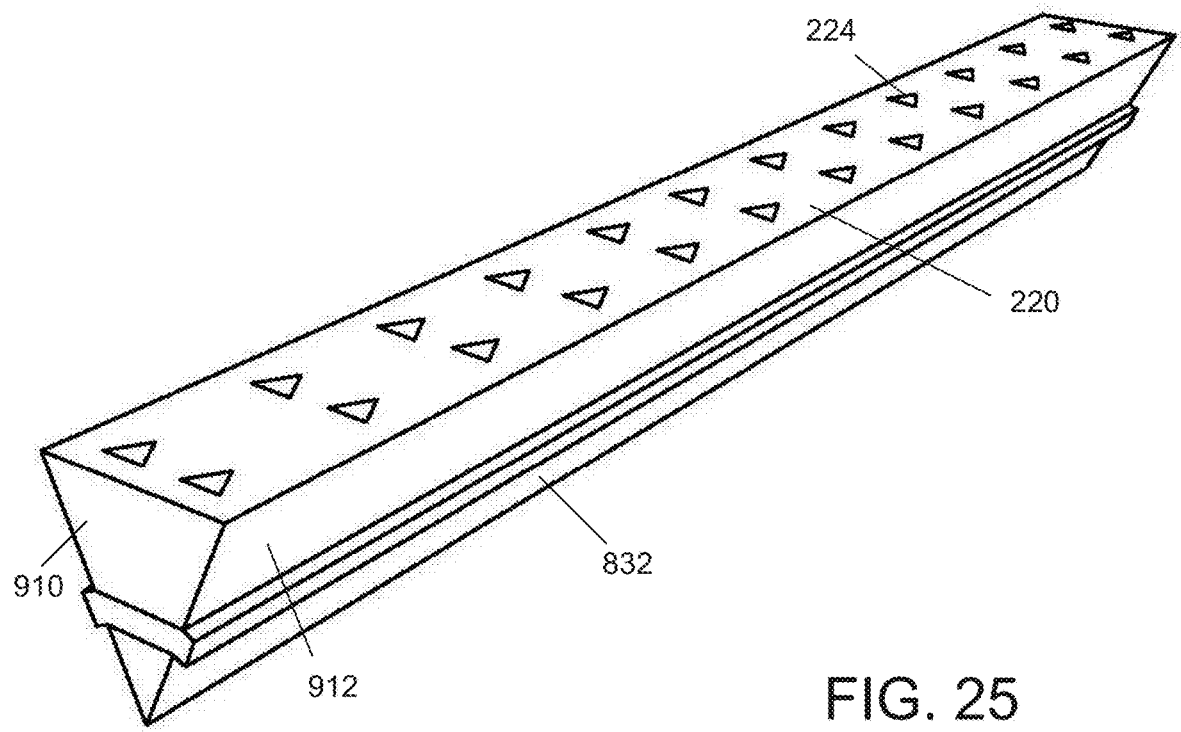
FIG. 25 is an exploded view of another embodiment of the growing plane and utility module of the present invention showing lighting in the growing plane surface.
Figure 26A:
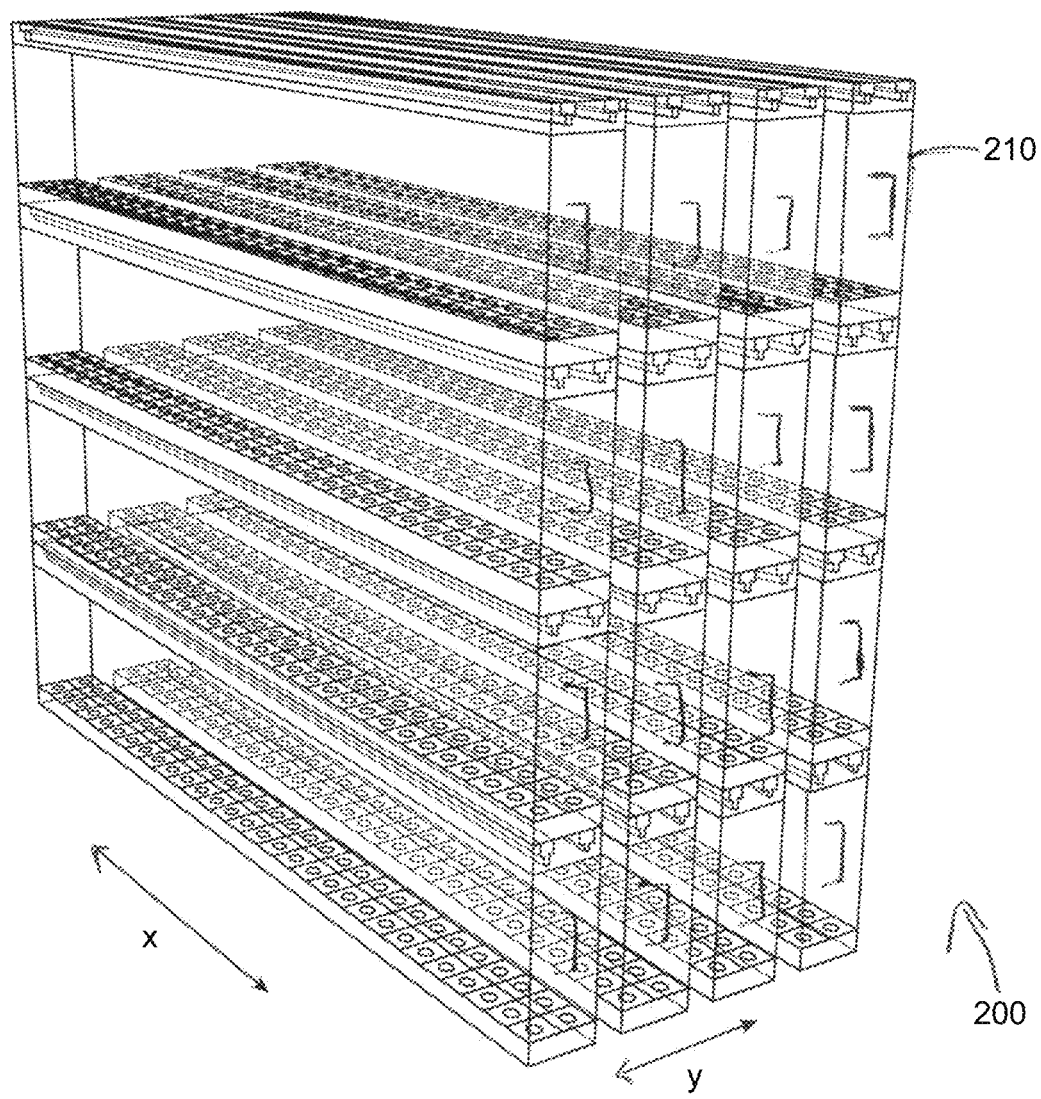
FIG. 26A shows an arrangement of multistacked growing modules of the present invention. The multistacked growing modules are moveable in the X and Y directions within a semi-automatic growing system of the present invention, allowing for access to the growing module stacks and individual growing modules for care, harvesting, maintenance, etc.
Figure 26B:
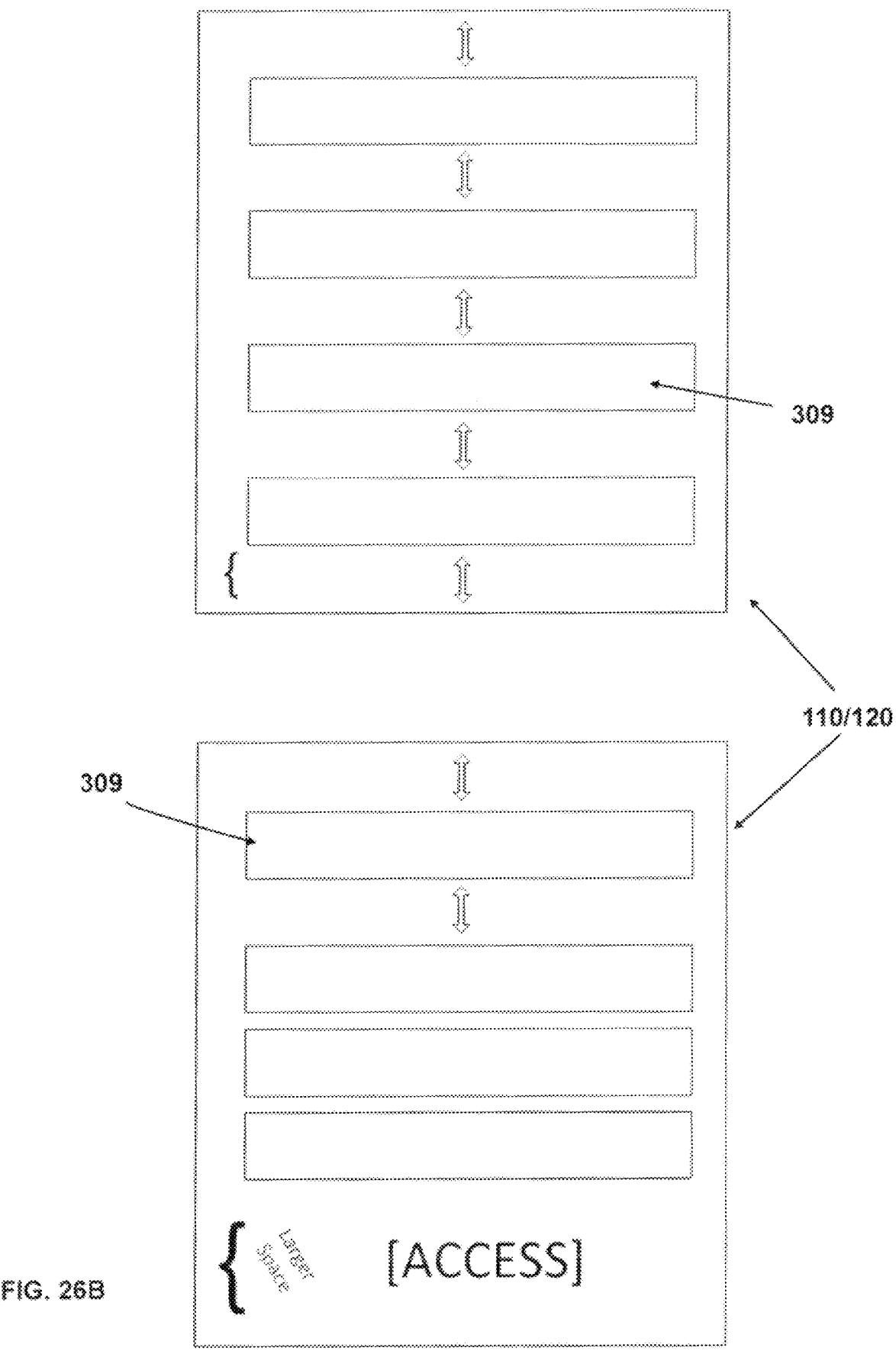
FIG. 26B illustrates the movement of stacked growing modules inside a shell, providing access to the growing modules.
Figure 27:
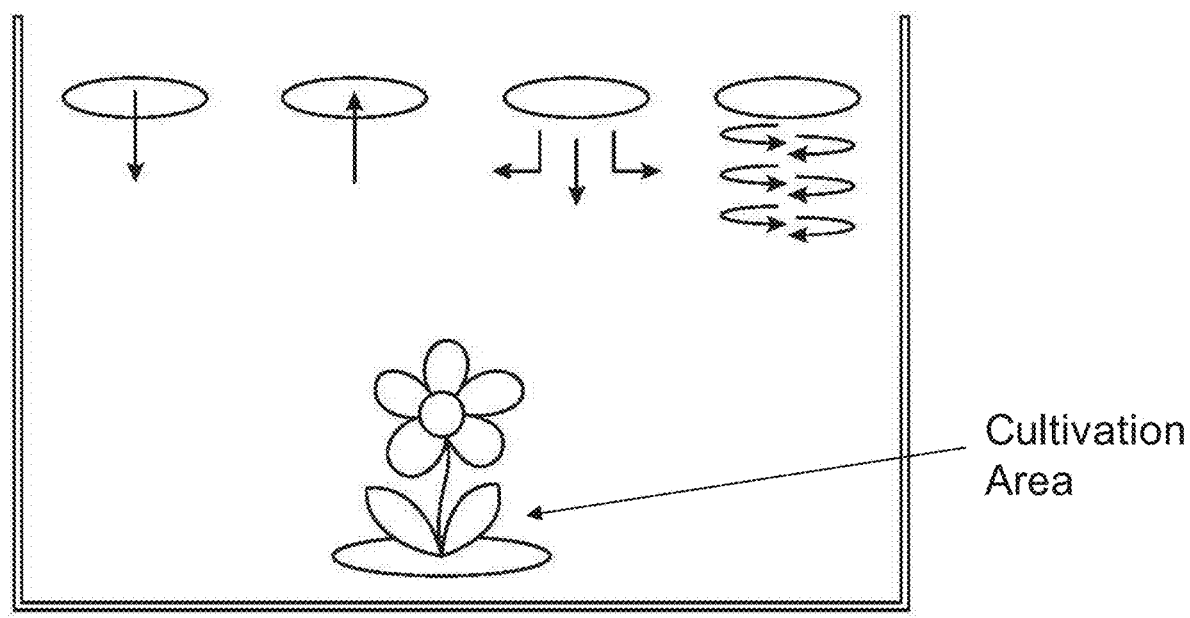
FIG. 27 illustrates examples of airflow patterns generated by different orifices configurations of airflow panels (344/822) of the present invention: (a) down/in (stream/directed); (b) up and out; (c) multi-directional; and (d) spiraling.
Figure 28C:
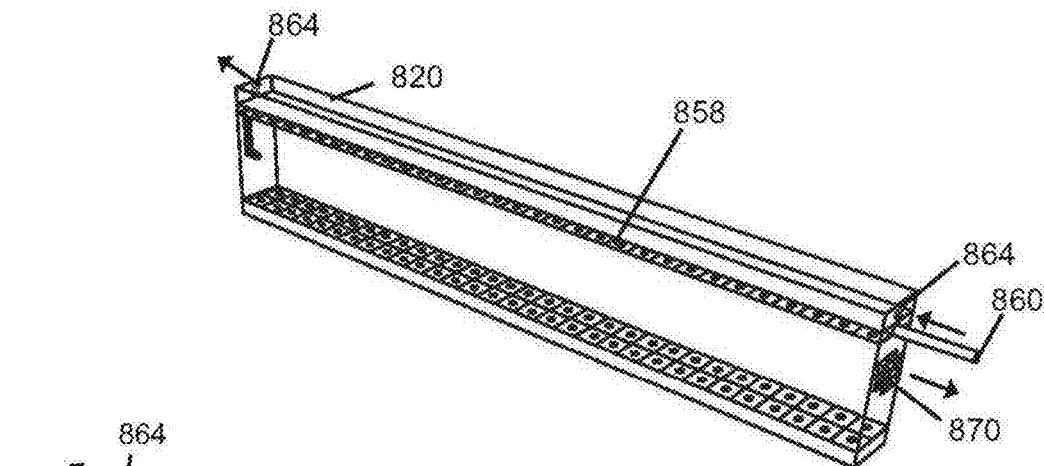
FIGS. 28A-28C illustrate examples of lighting cooling and gas distribution for growing module units (200) of the present invention.
Figure 28B:
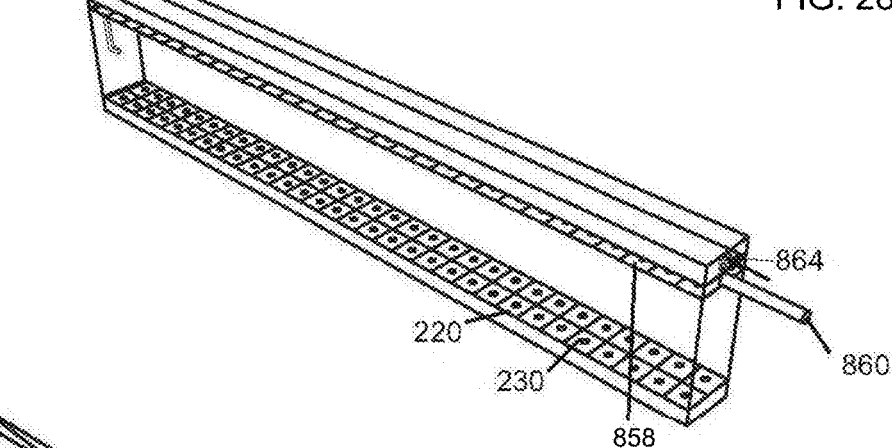
Figure 28A:
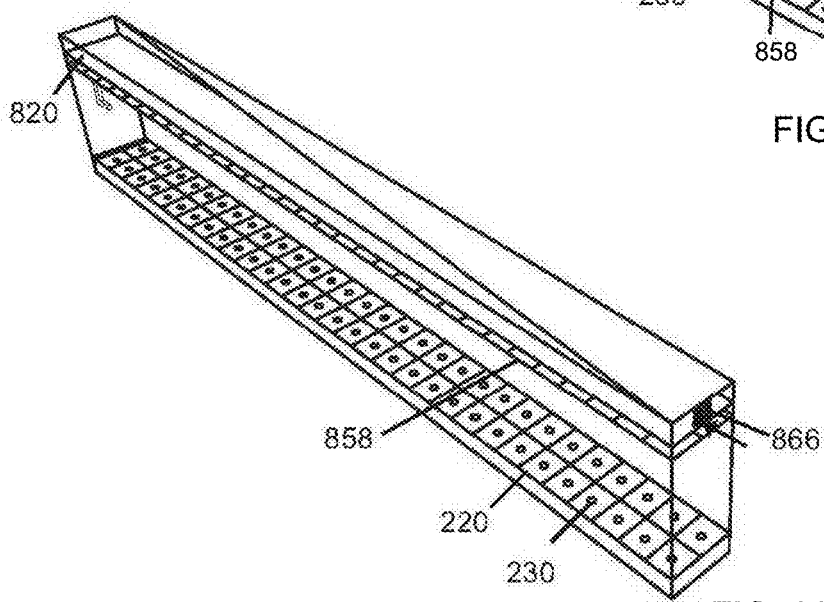
Figure 29:
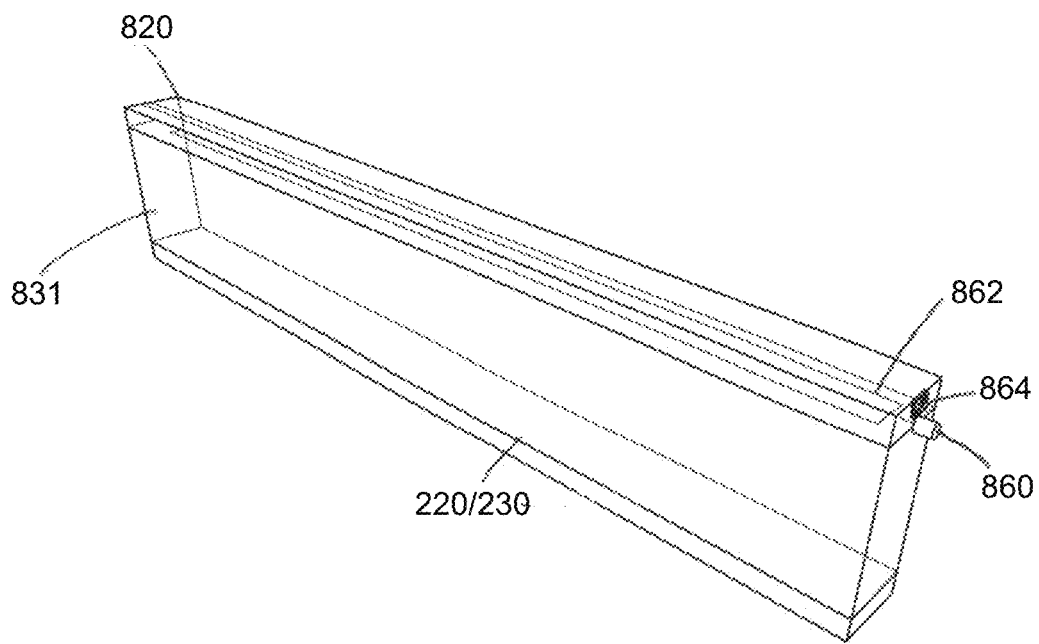
FIG. 29 shows a view of a gas distribution manifold of the growing module according to FIG. 28B.
Figure 30:
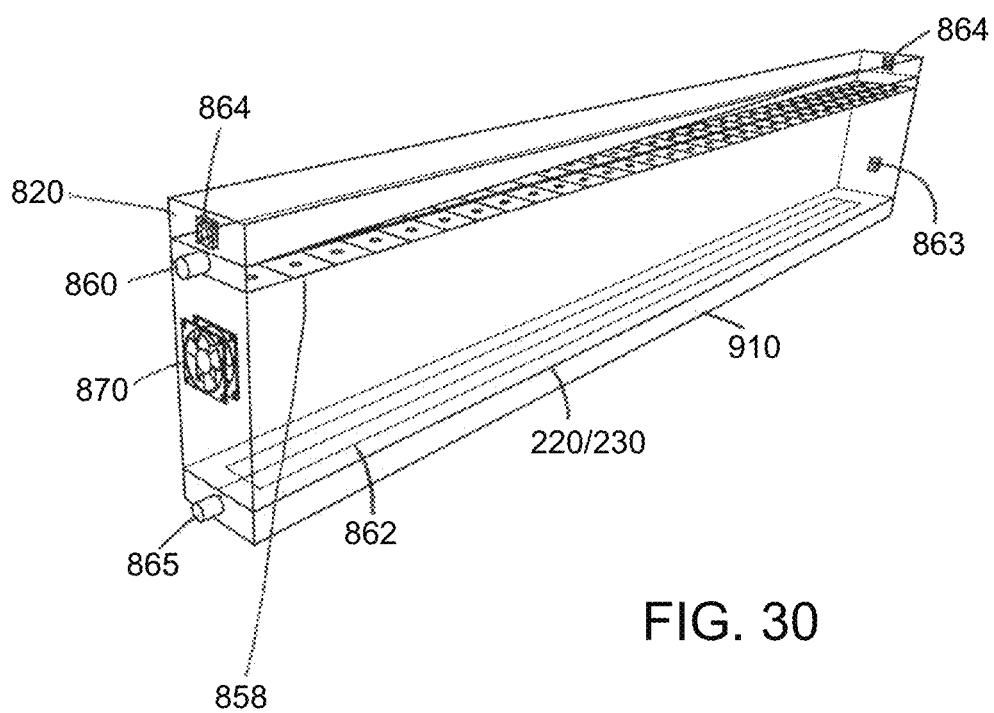
FIG. 30 shows an expanded view of a growing module including an upper gas distribution manifold in the lighting module and a lower gas distribution manifold in the growing plane.
Figure 31:
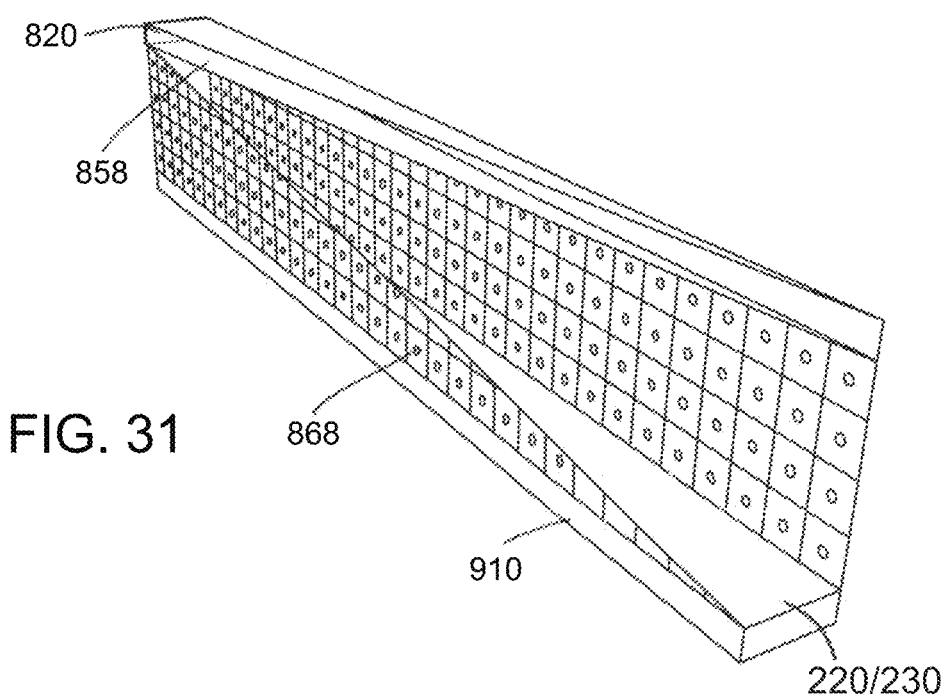
FIG. 31 is an exploded perspective of a side gas distribution system according to the invention, where gas is introduced into the growing module horizontally from the growing unit sides.
Figure 32A:
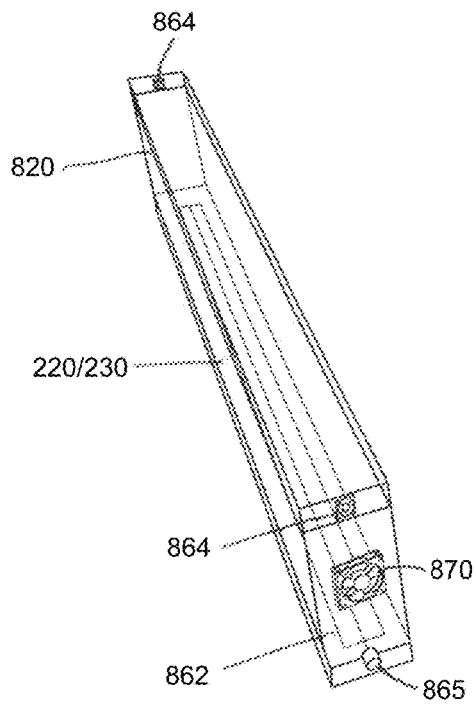
FIGS. 32A-32D show alternative embodiments of gas distribution and gas distribution manifolds for growing modules according to the invention.
Figure 32B:
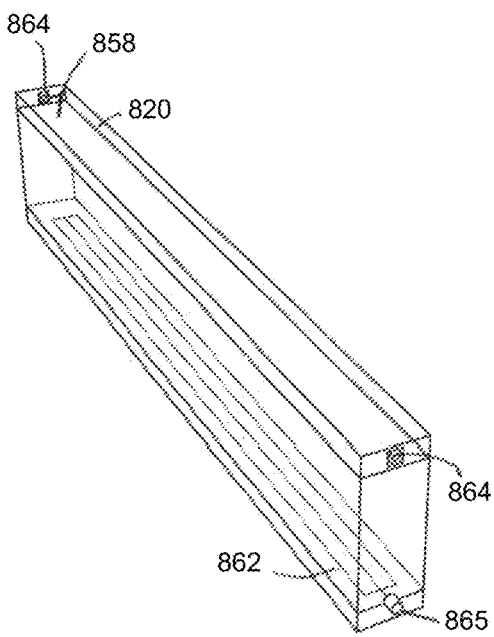
Figure 32C:
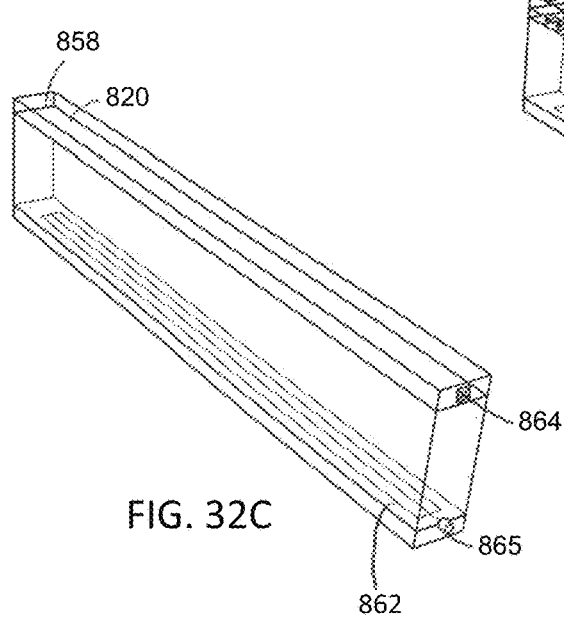
Figure 32D:
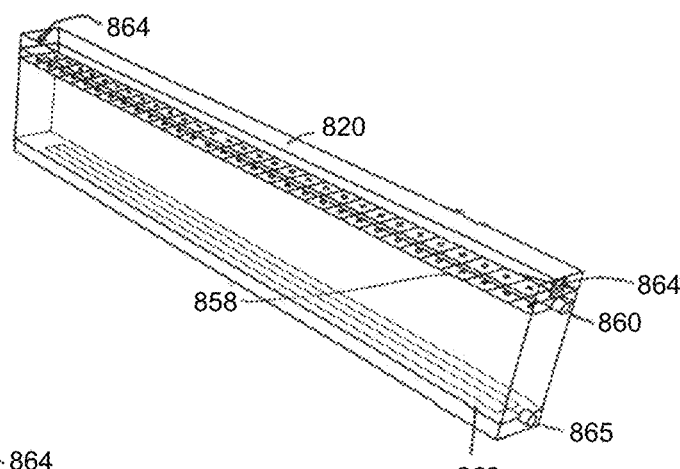
Figure 33:
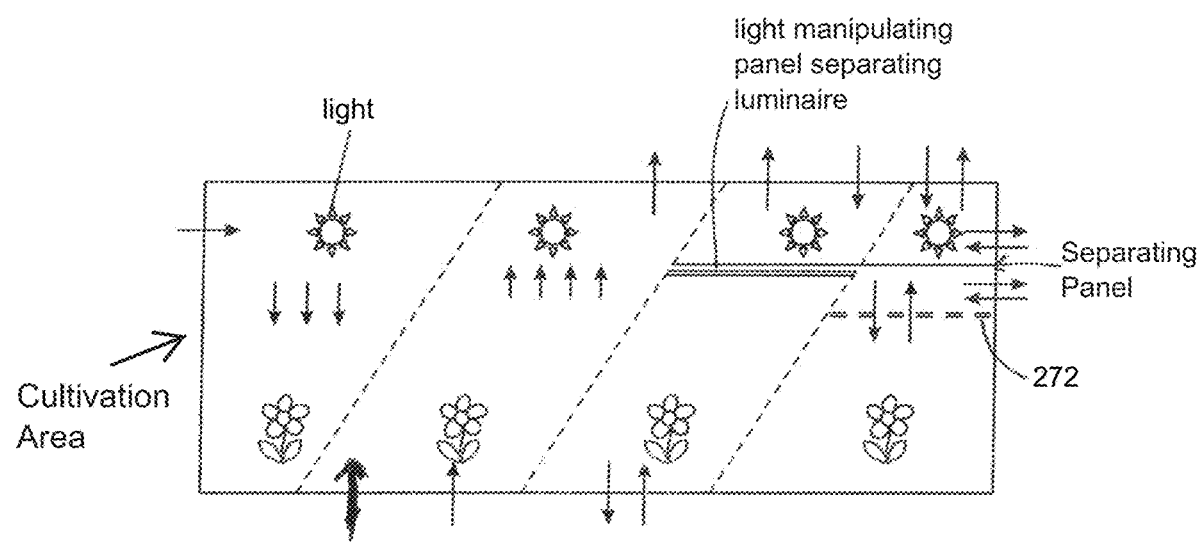
FIG. 33 illustrates airflow patterns for growing module embodiments of the present invention. Arrows indicate airflow, which may be passive, assisted or via gas manifold(s).
Figure 34:
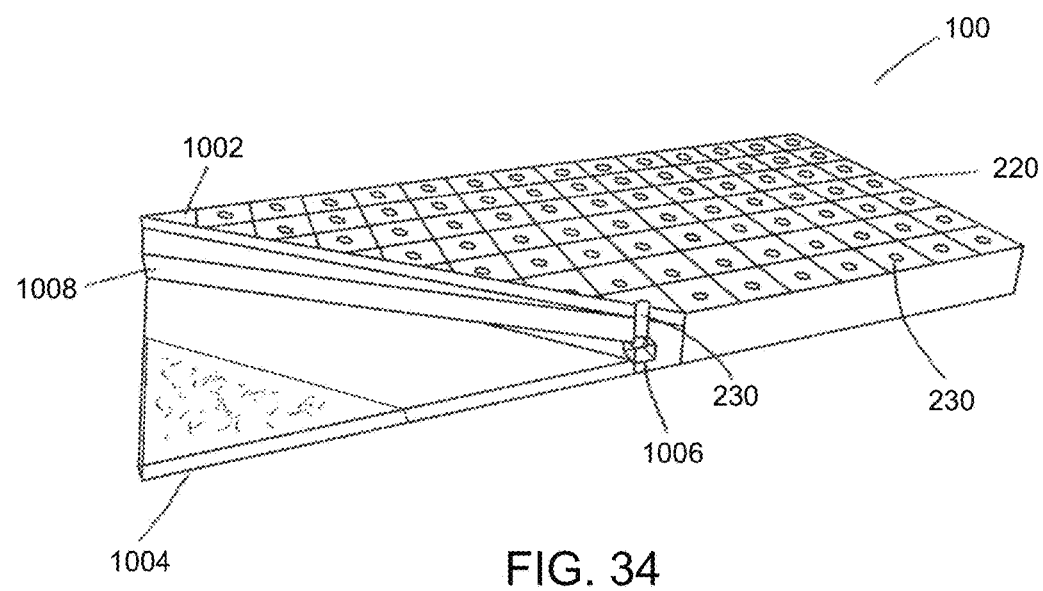
FIG. 34 is a cutaway view of the internal structure of a floating growing plane system (1000).
Figure 35:
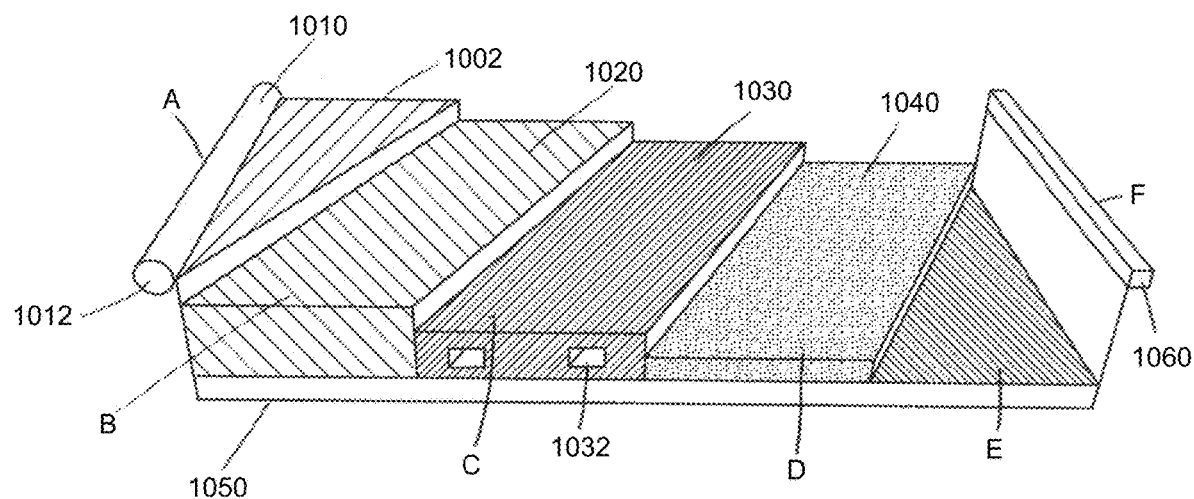
FIG. 35 shows 6 systems for making a buoyancy system for a floating growing plane with a coated upper surface (1002) and coated bottom surface (1004), which may optionally have a textured bottom surface: (A) rolled floating material or rolled with crimped gas space (1010); (B) Buoyant material layer (e.g. polystyrene) (1020); (C) layer with embedded gas or liquid bladder (e.g. gas bubbles, air bladder, cartridge, etc.) (1030); (D) coated porous buoyant material (1040) (E) coated surface with or without texture buoyant layer (1050); and (F) buoyant material insert (1060).
Figure 36:
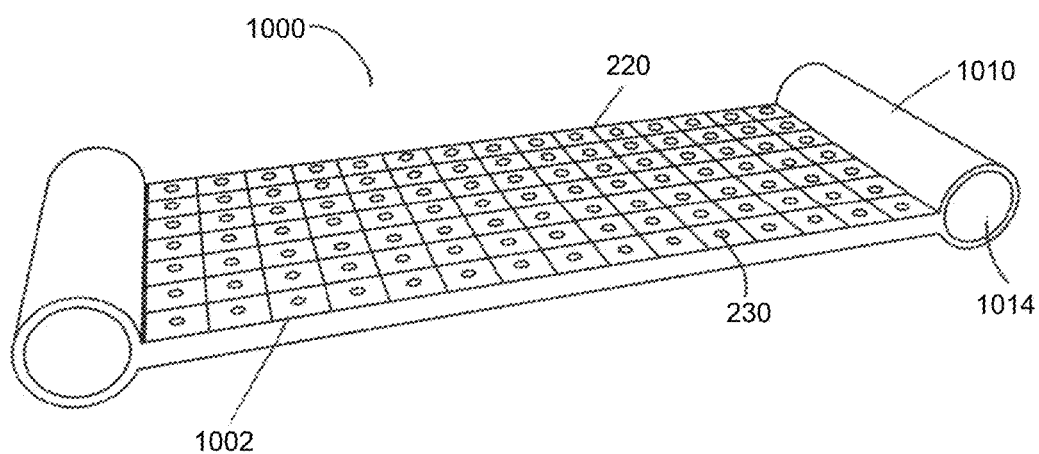
FIG. 36 shows one embodiment of a floating growing plane system formed from a coated growing plane surface (1002) comprising a growing plane grid (220) with a coated surface (1002) and a plurality of cells (230), buoyant end elements (1010) formed from gas as the buoyant material.
Figure 37A:
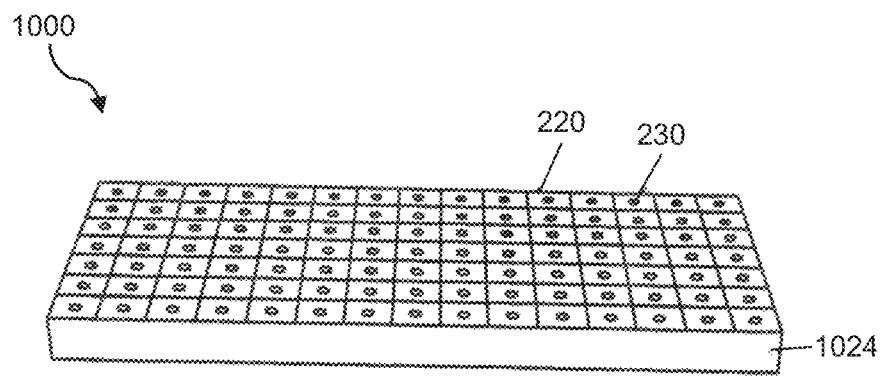
FIGS. 37A-37B illustrate buoyancy assemblies.
Figure 37B:
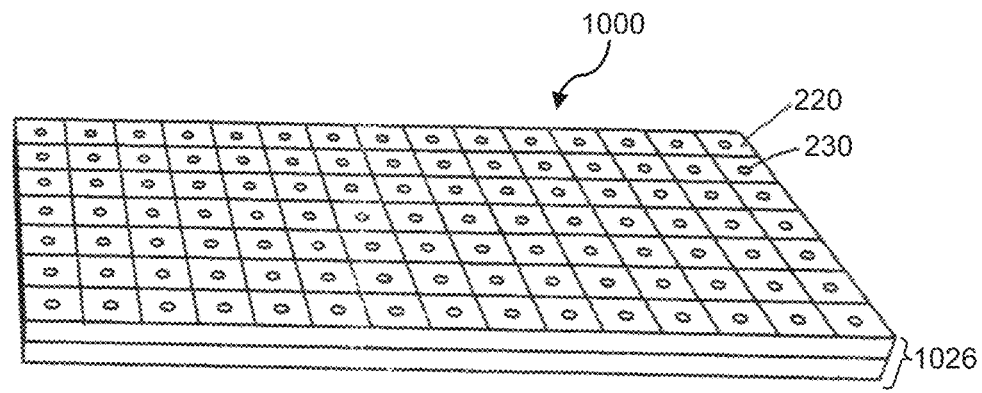
Figure 37C:
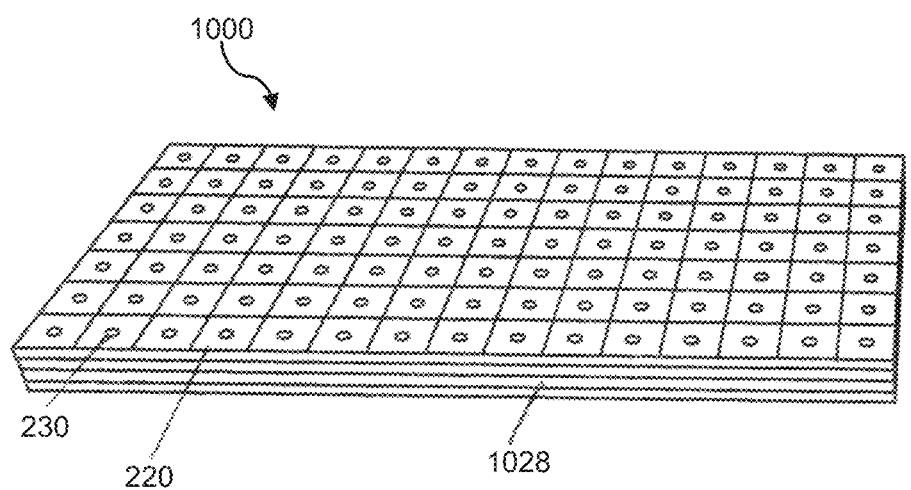
Figure 38:
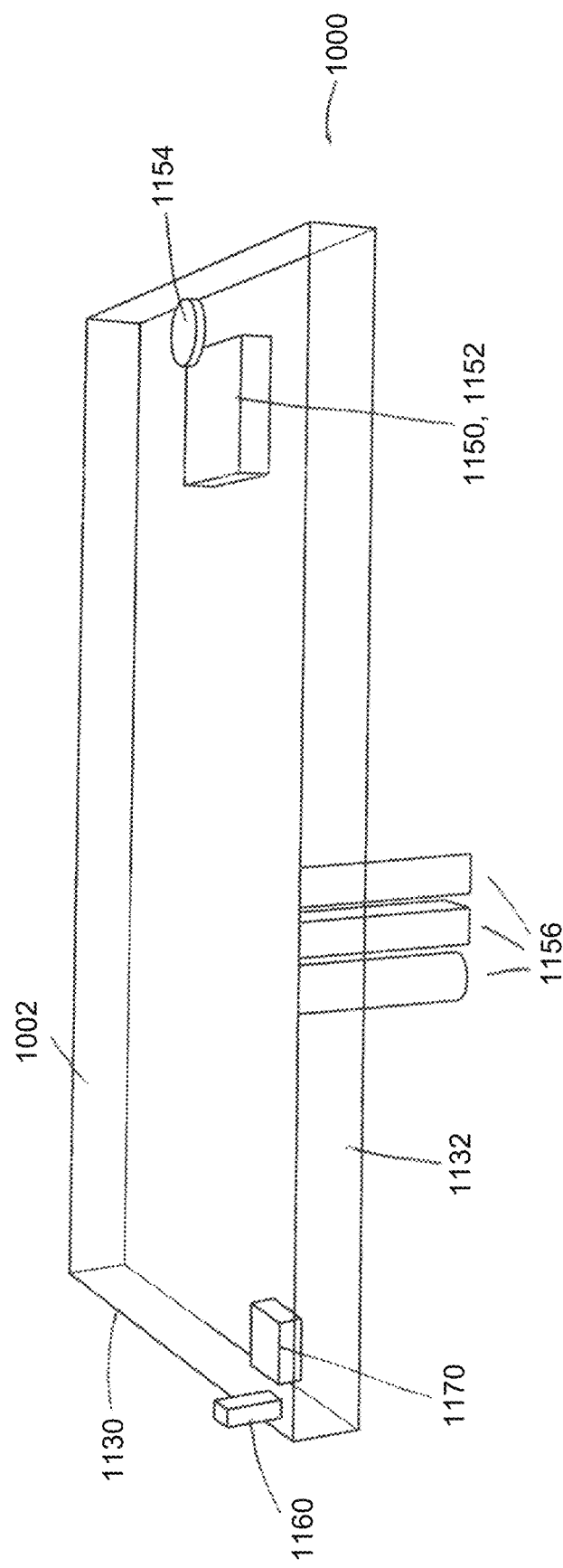
FIG. 38 shows one embodiment of a floating growing plane system of the present invention including electronic communication and control.
Figure 39:
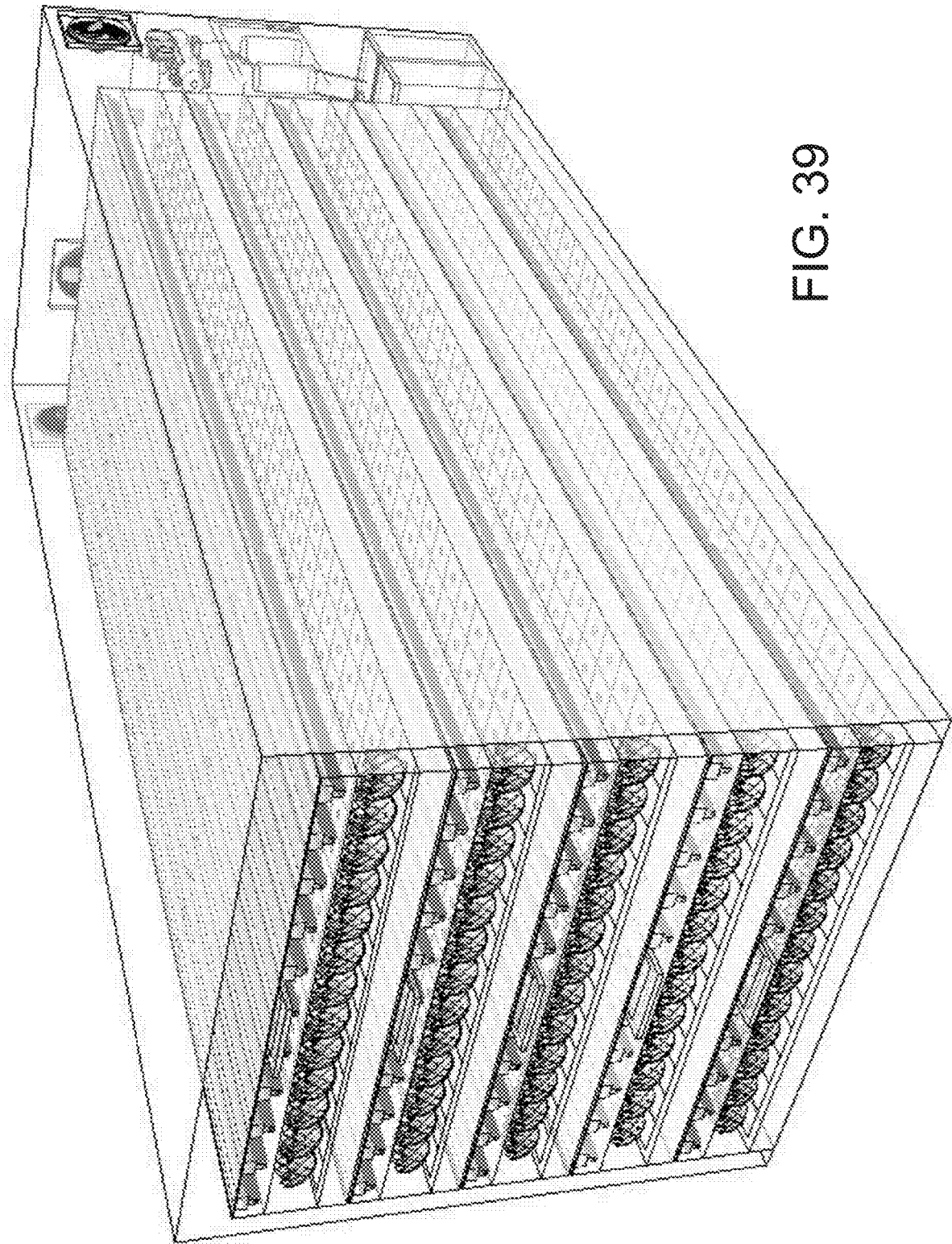
FIG. 39 is a perspective internal view of a shell where the growing modules according to the invention are inserted into an interior shell (110).
Figure 40:
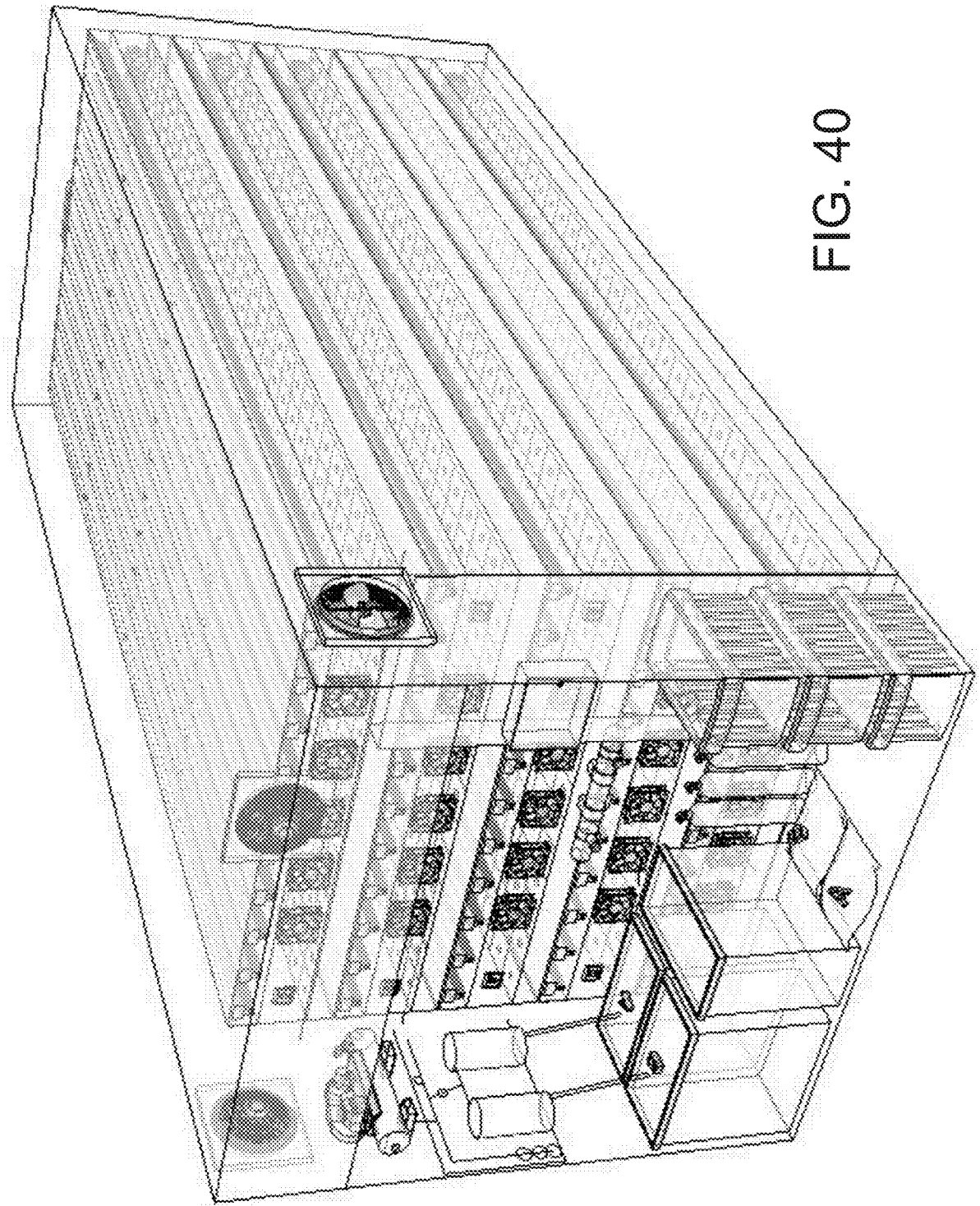
FIG. 40 is another perspective internal view of a shell with a growing module according to the invention inserted in the shell showing the interface with the air/gas handling, irrigation, temperature, etc. control systems.
Figure 41:
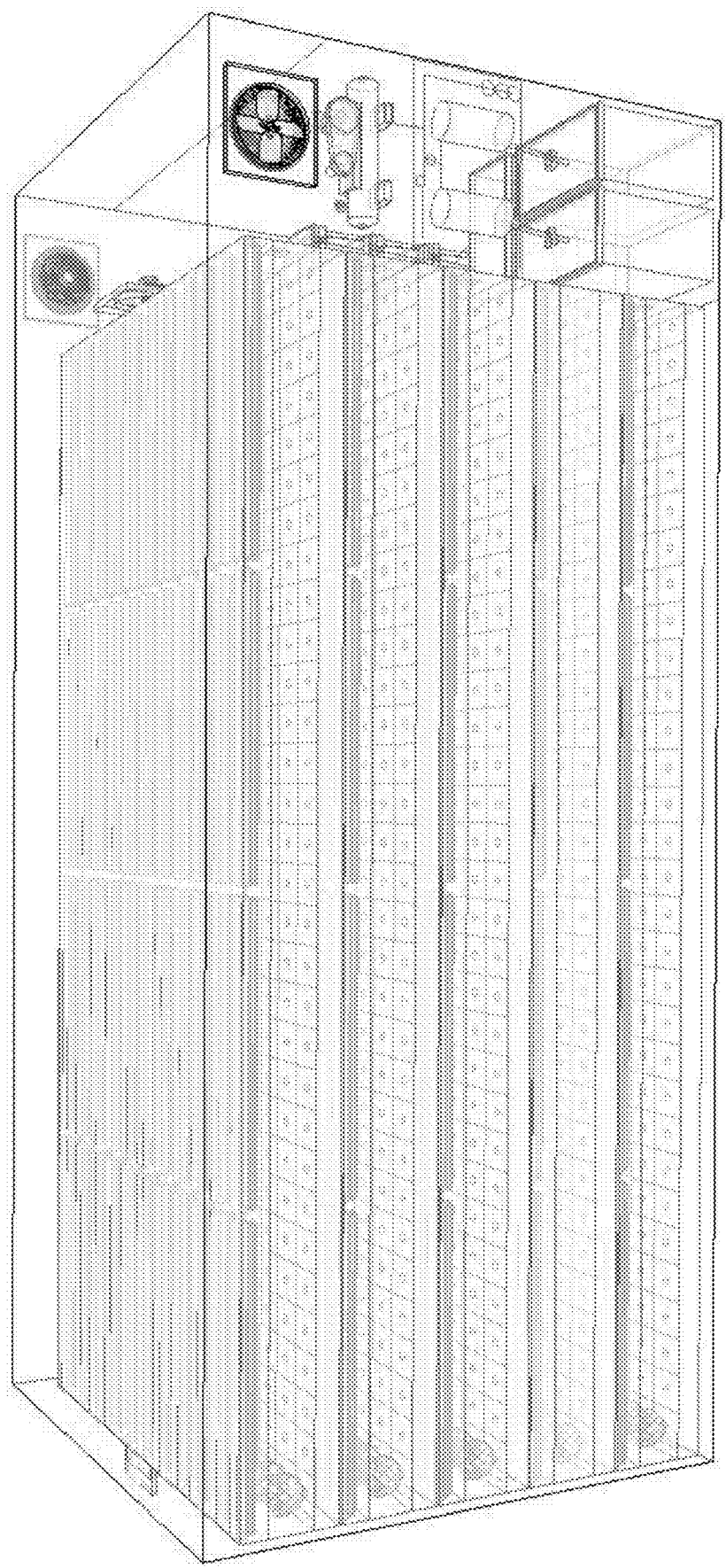
FIG. 41 is a front perspective internal view of a shell according to the invention with growing modules inserted into the internal shell.
Figure 42:
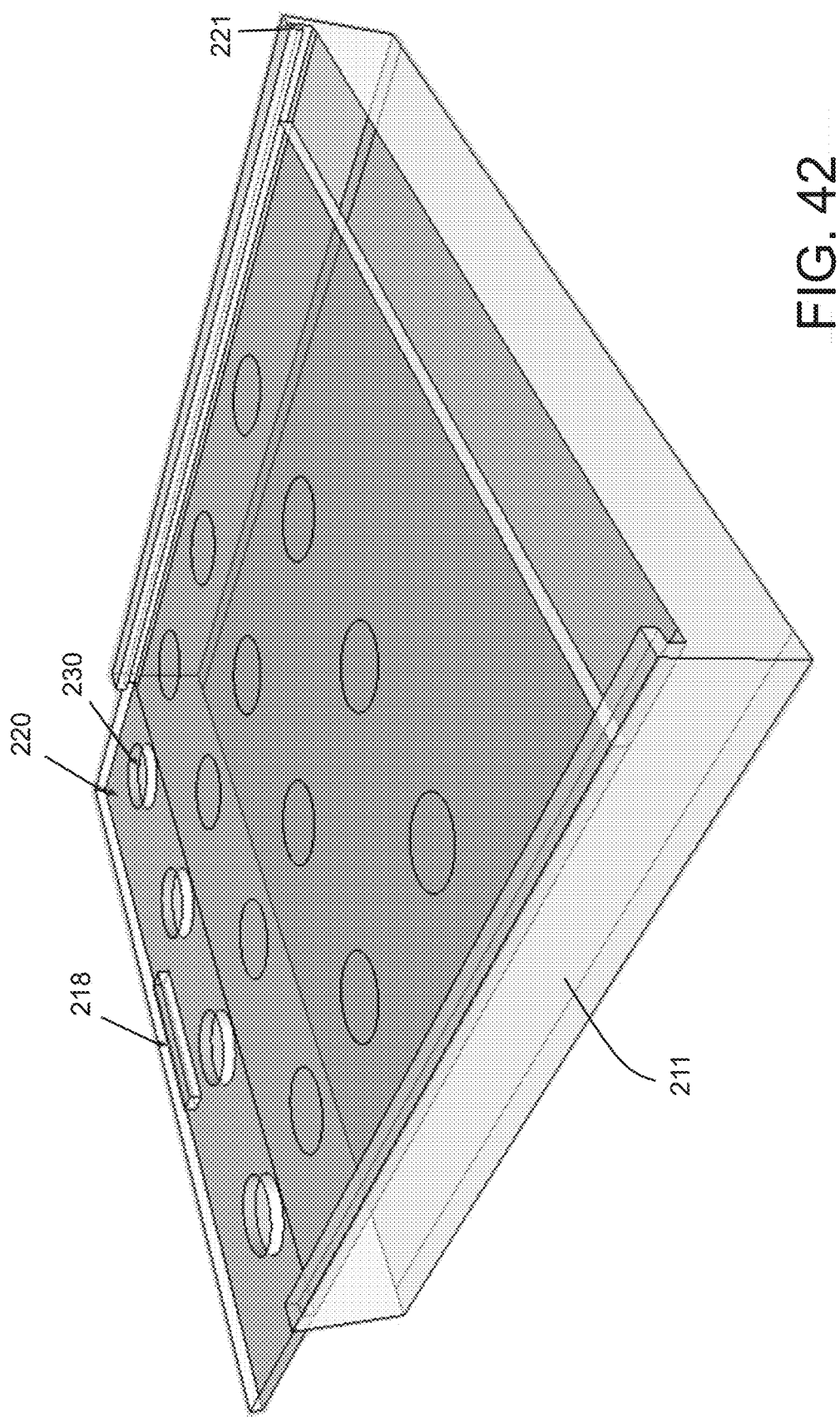
FIG. 42 is an expanded perspective view of a growing plane according to the invention showing a removable grid (220) and a support structure (211).
Figure 43:
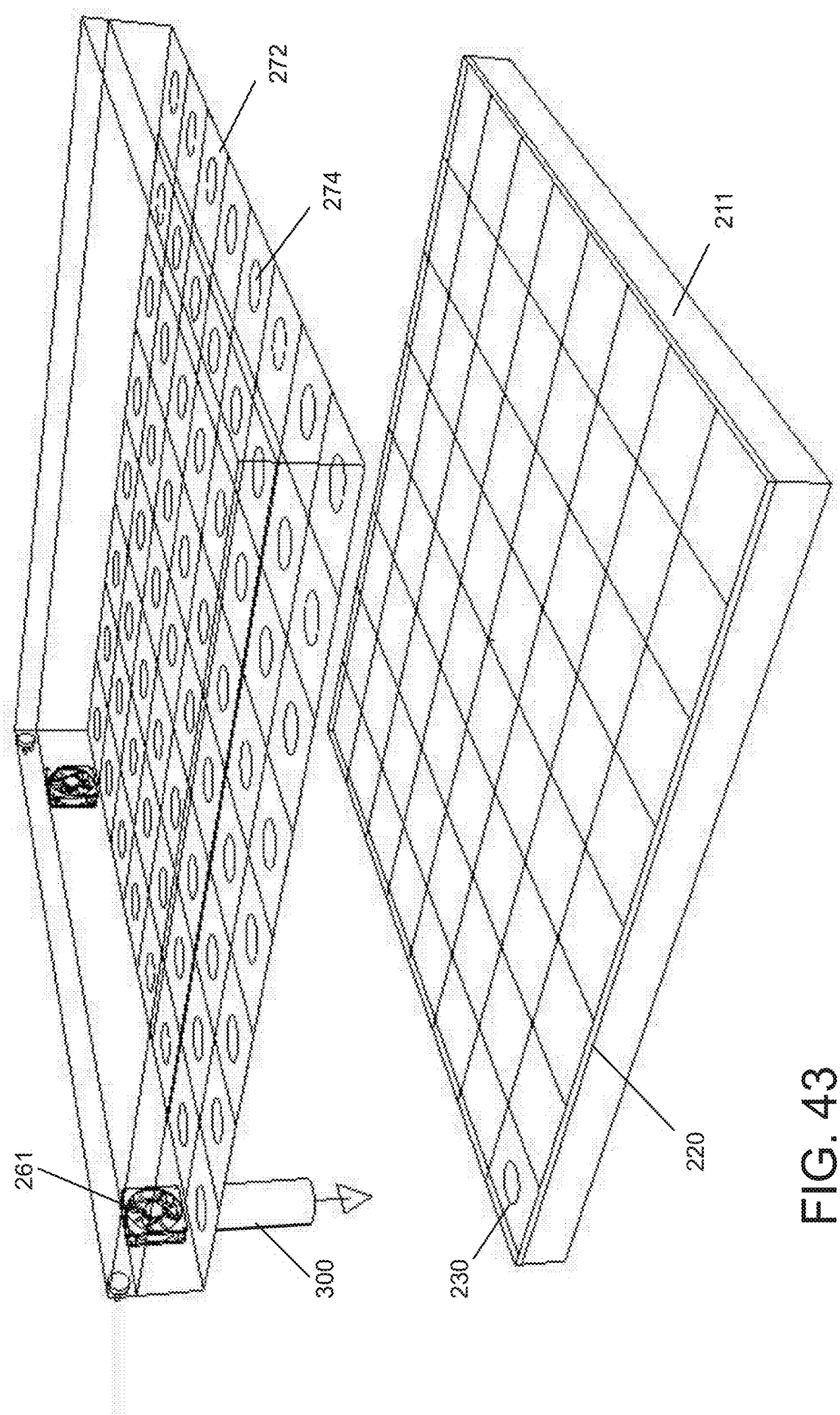
FIG. 43 is another perspective of a lighting and air flow unit with a growing plane (lighting elements not shown).
Figure 44:
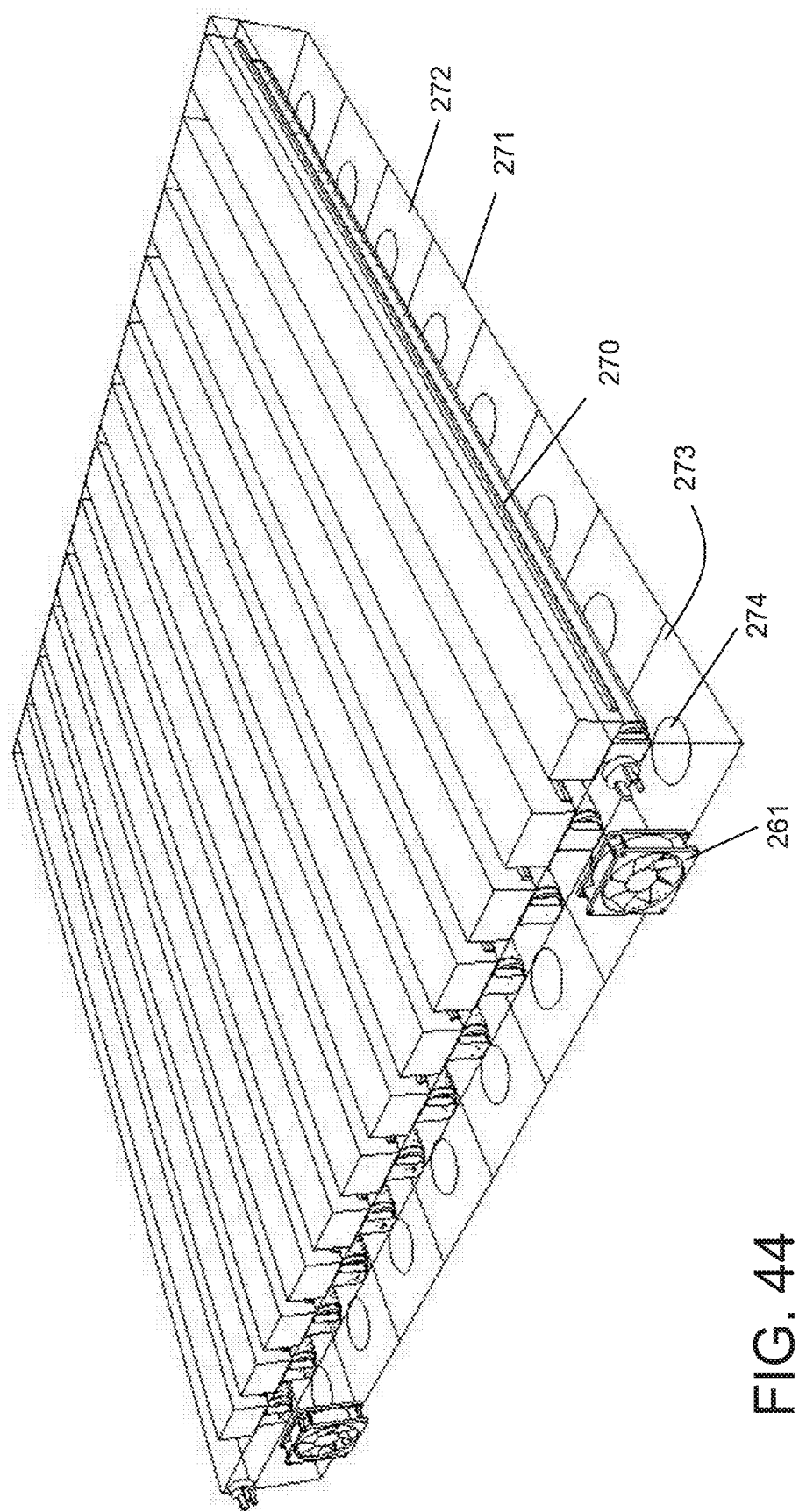
FIG. 44 is a perspective view of one embodiment of a lighting and air flow unit according to the invention.
Figure 45:
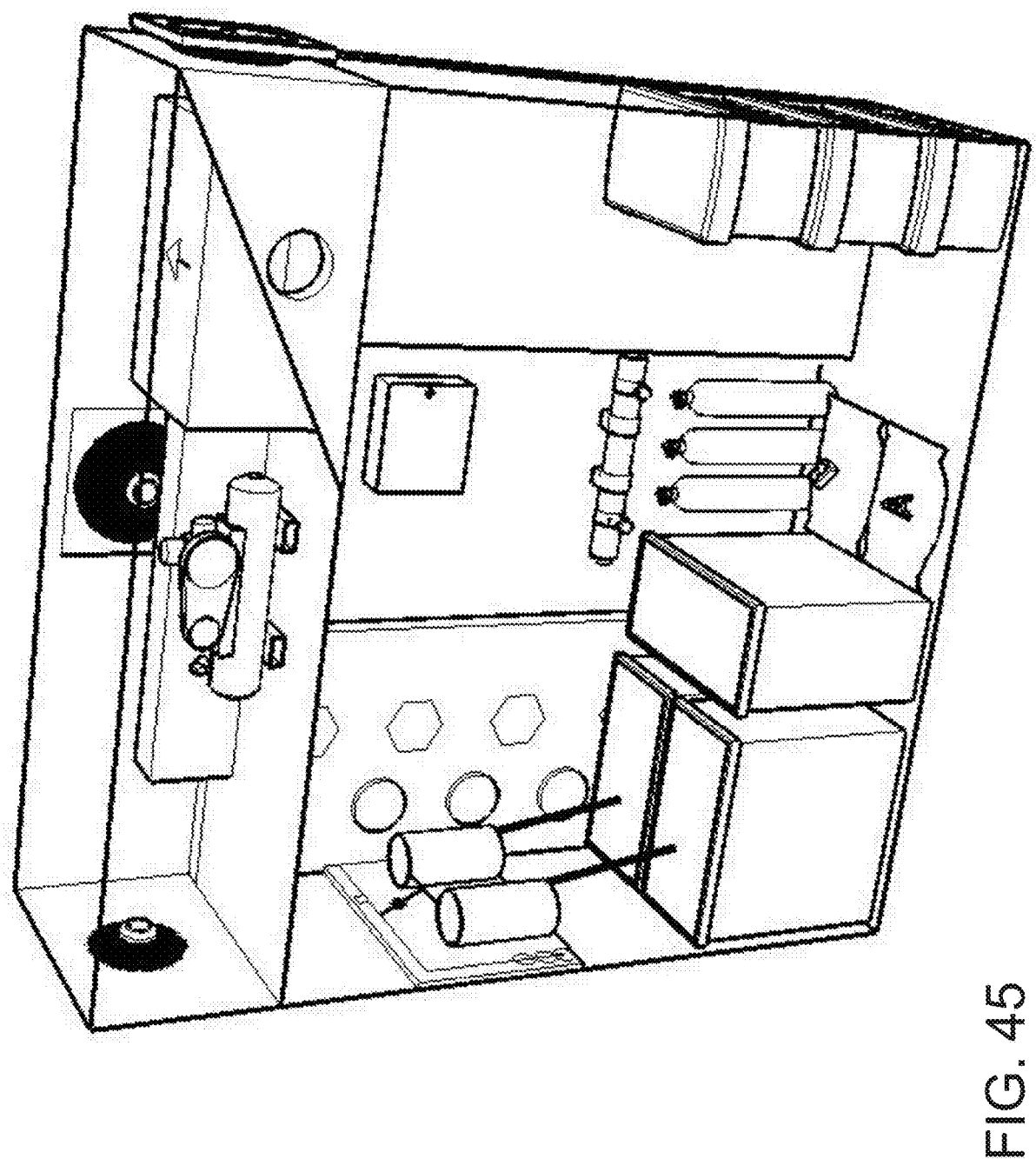
Figure 46:
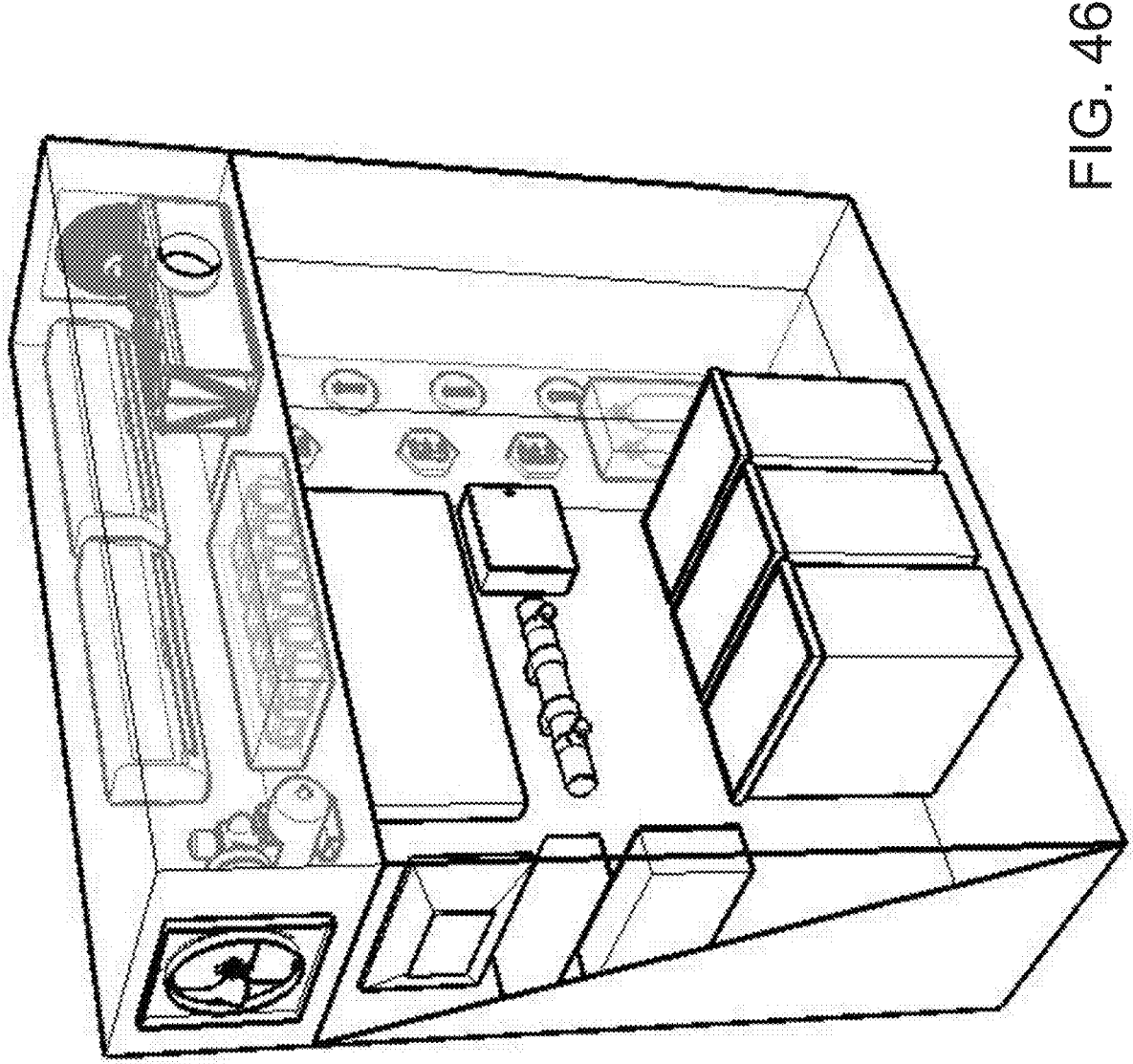
FIG. 46 is another perspective and internal view of an equipment module of the system.
Figure 47:
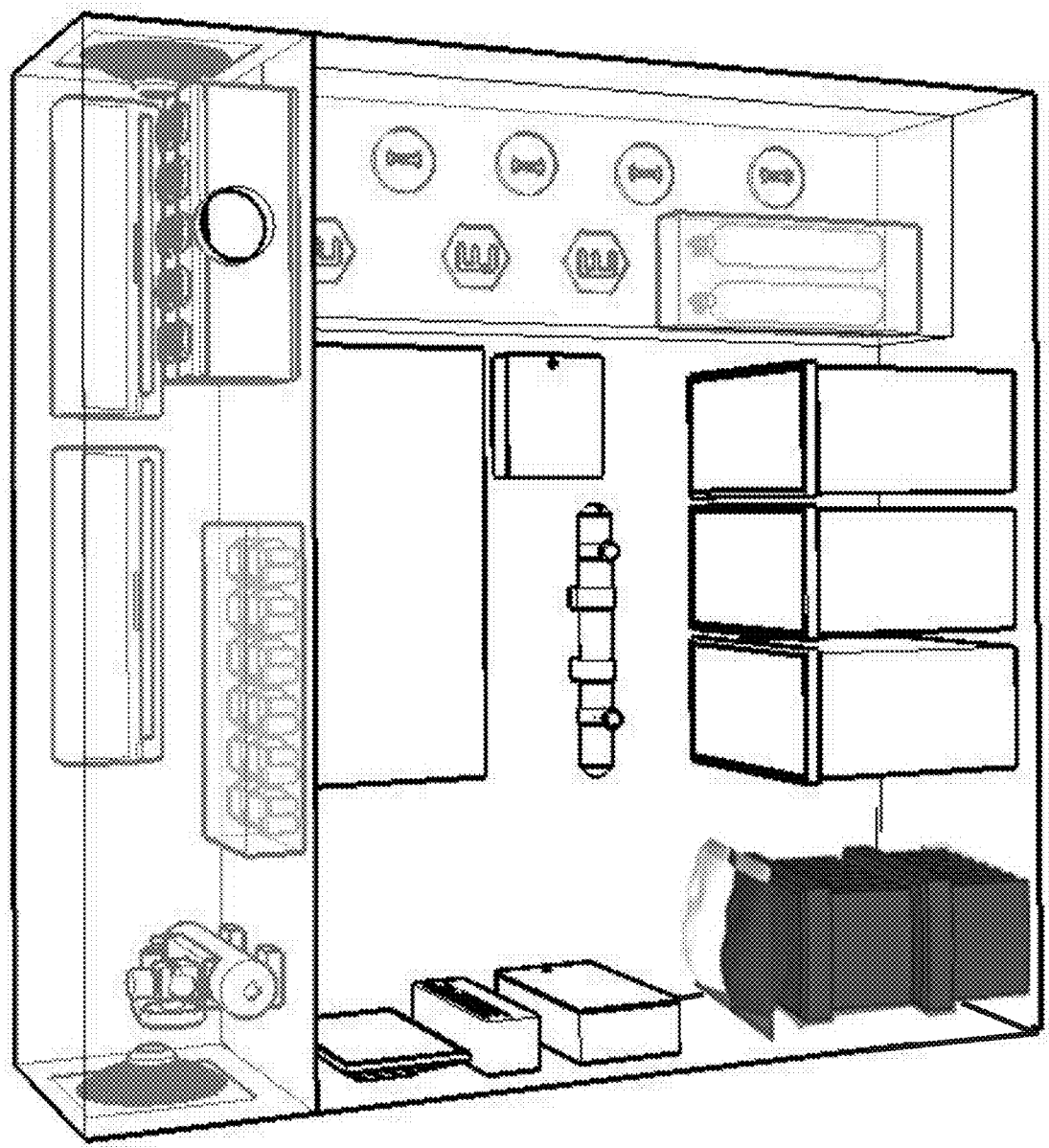
FIG. 47 is a front perspective and internal view of an equipment module of the system.
Figure 48:
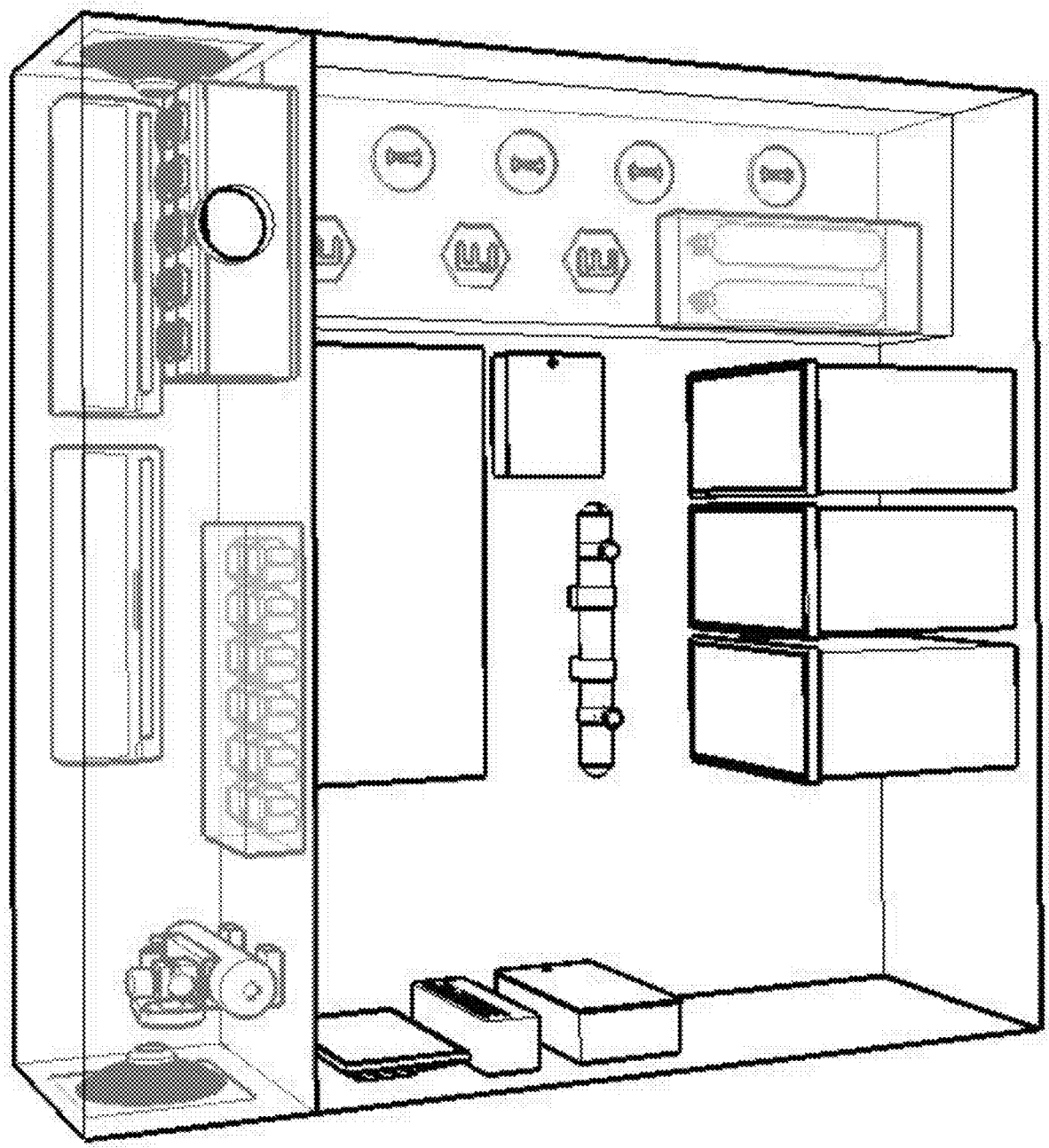
FIG. 48 is another front perspective view of an equipment module of the system.
Figure 49:
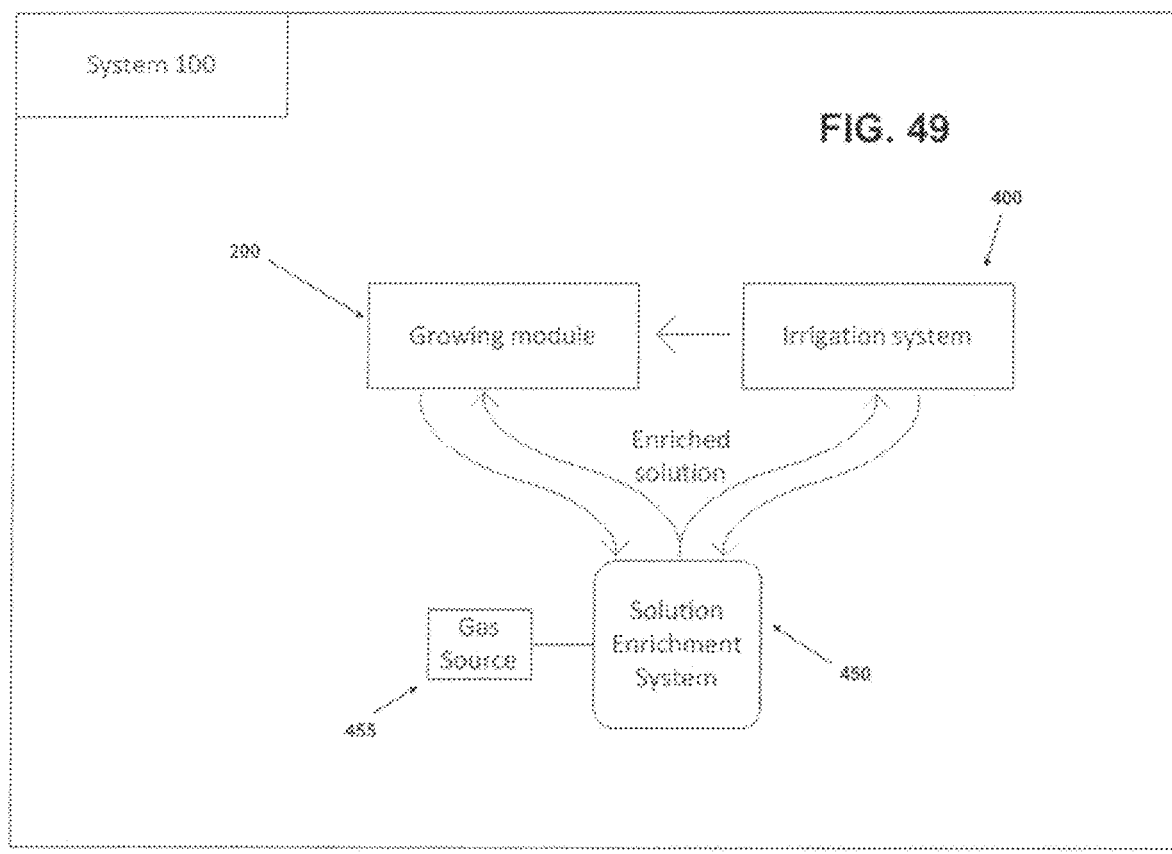
FIG. 49 shows a solution enrichment system for the system of the present invention.
Figure 50:
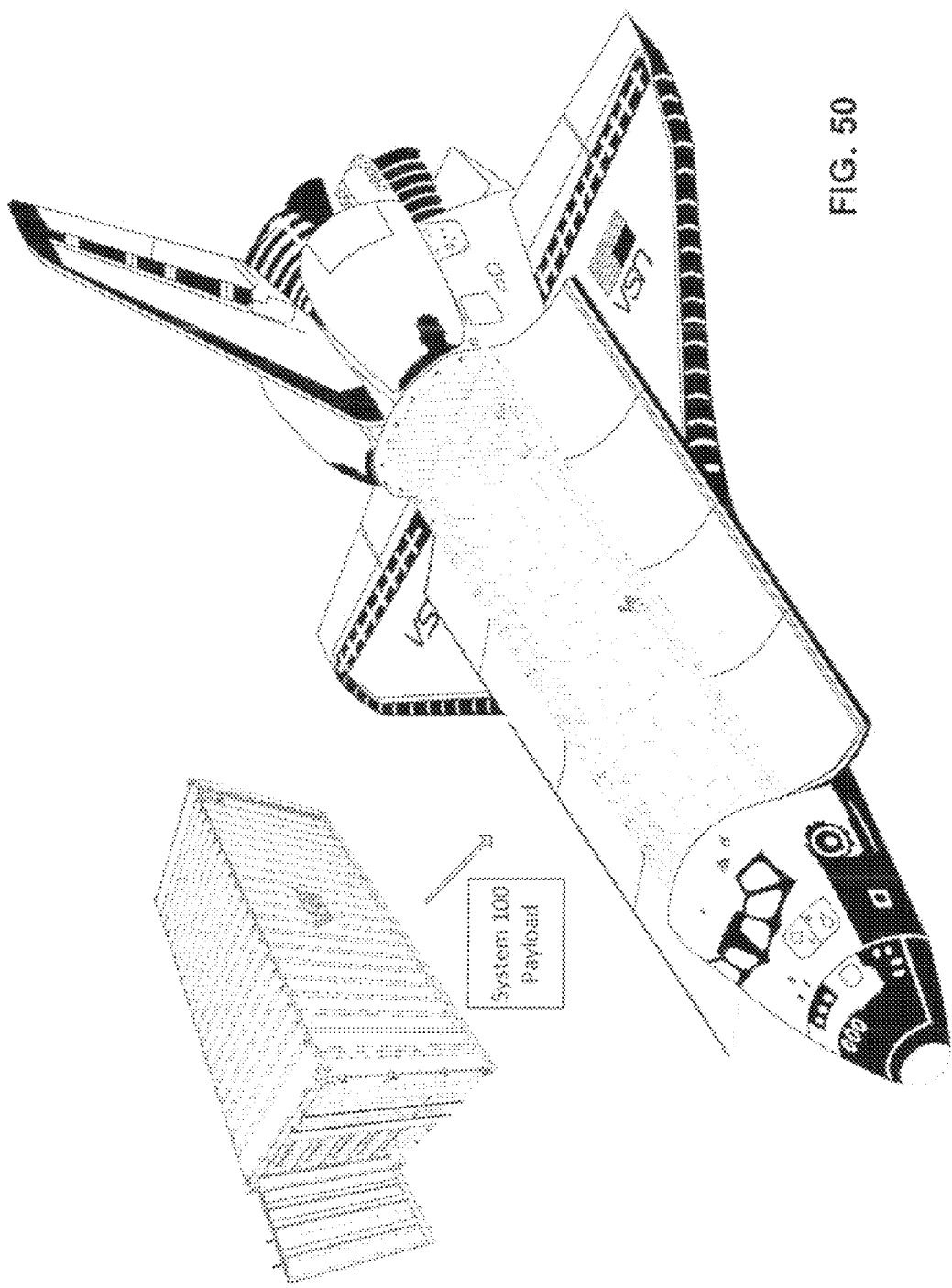
FIG. 50 shows system (100) as a payload of a spacecraft.
Figure 51A:
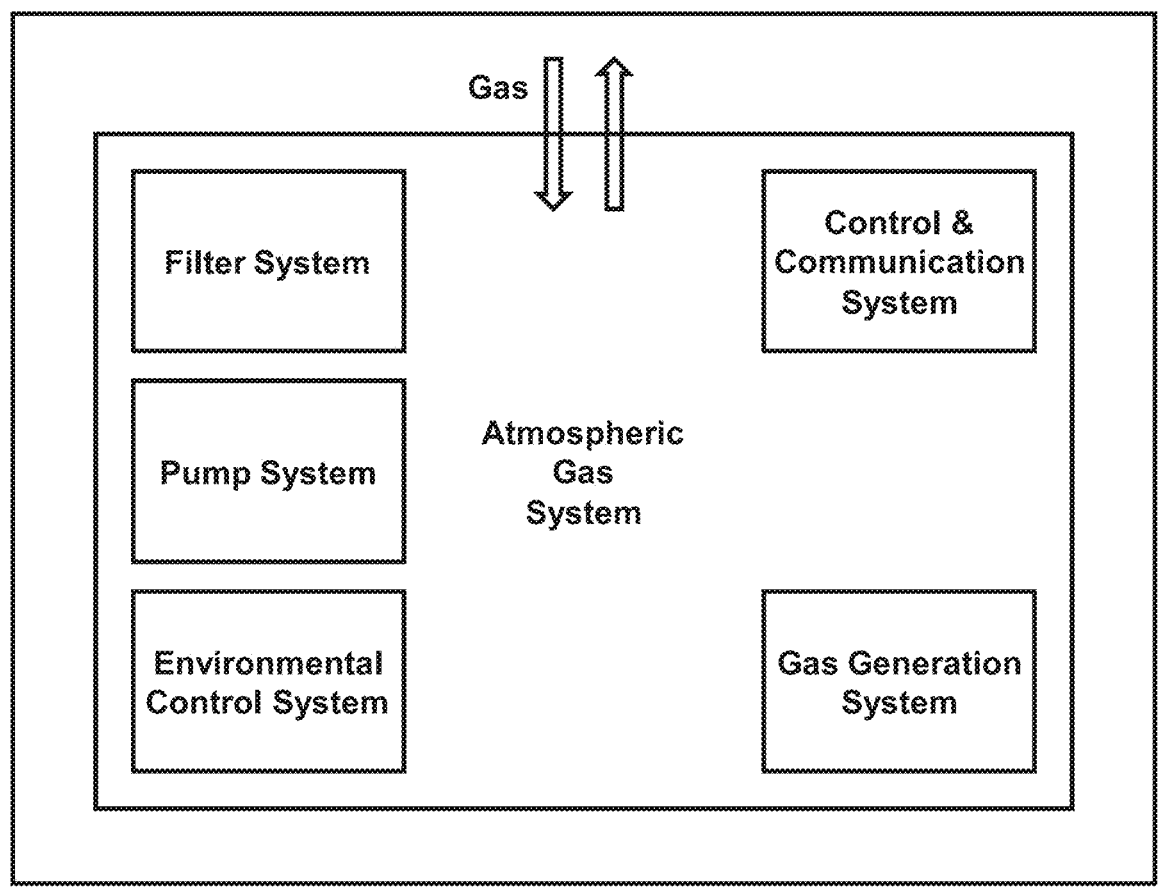
FIGS. 51A-51C show embodiments of the atmospheric gas system (950).
Figure 51B:
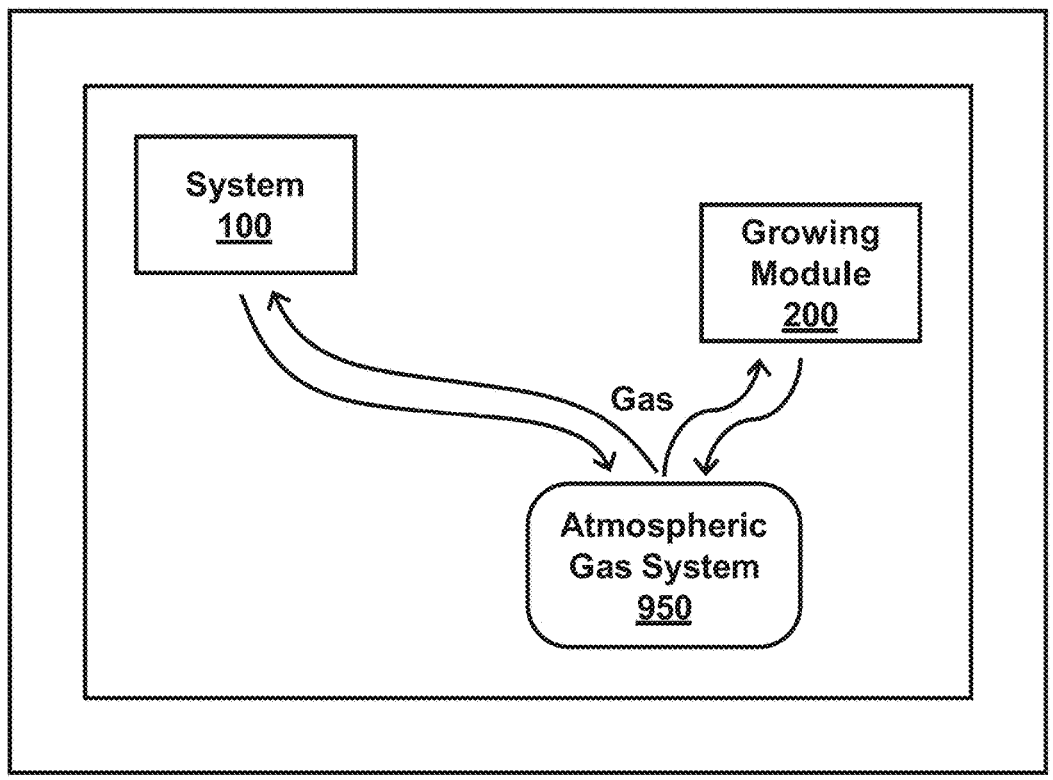
Figure 51C:
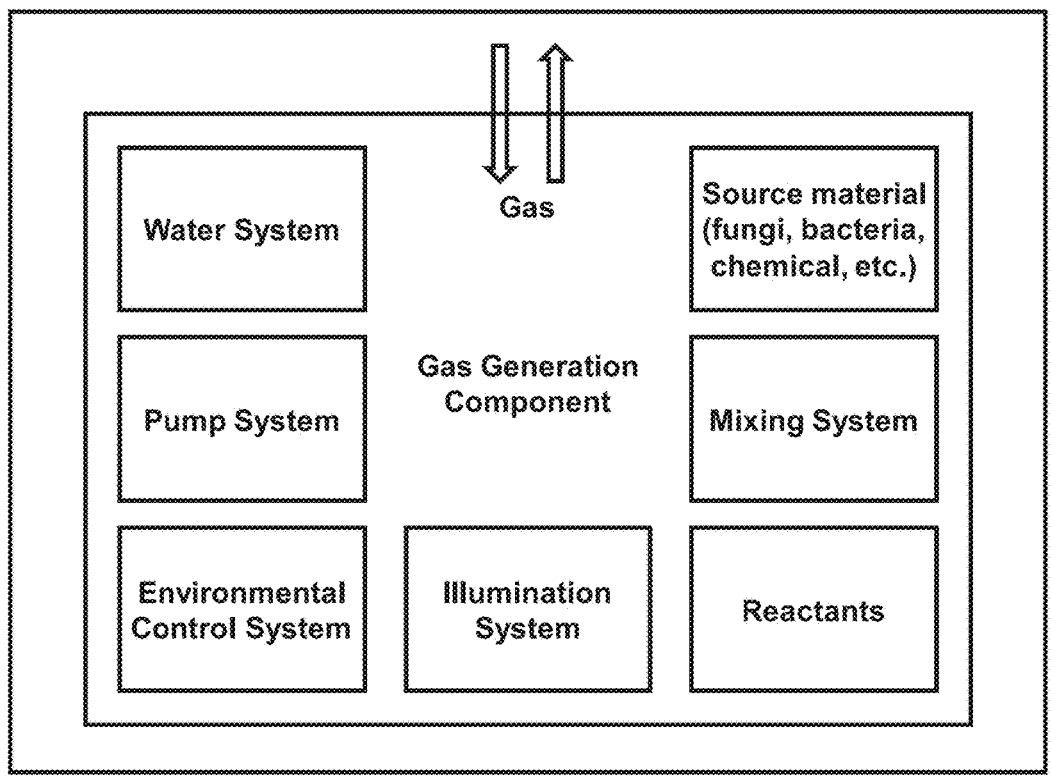

The following is a listing of numbers corresponding to particular elements referred to herein. The present invention is not limited to the described examples, components, and configurations.

- 100 semi-automated crop production system
- 110 interior shell
- 112 side wall of interior shell
- 120 exterior shell
- 130 door
- 135 interior cover or door
- 140 mounting component
- 142 mounting component flange
- 143 floatation system
- 147 insulating or reflective paint on exterior
- 148 chemical-resistant liner (may also include insulation paint, foam, or a combination thereof; the chemical-resistant liner and/or insulation paint and/or foam may go on one or both of the interior of the insert and/or the containment structure, e.g., the outer shell)
- 151 window
- 152 weather station (the system may feature an intake for natural ventilation that connects to the weather station)
- 153 GPS tracking and communication component (e.g., remote system disablement)
- 154 computer control system
- 155 alternative energy system (e.g., a photovoltaic system, e.g., wind, Peltier pump)
- 200 growing module or modular growing unit
- 210 growing module container
- 211 support structure for grid/cells (e.g., NFT, flood table/trays, bucket, gutter, cable sleeve, slab, aero, stacked)
- 212 growing module cover (may be fitted) (e.g. aluminum, plastic, mylar, etc.)
- 213 growing module exterior skin
- 215 handle for mounting or moving growing module or modular growing unit
- 216 handle to access contents of growing module (e.g. handle positioned on growing module opening access (250))
- 217 handle for accessing growing plane comprising grid/cells (e.g. handle positioned on support structure (211) to extract growing plane grid/cells and products from within growing module.
- 218 handle for removing top portion of growing plane grid
- 220 grid (or growing plane)
- 221 channel for placement of growing plane grid in support structure (211)
- 222 temperature control device (e.g. heating or cooling element (for example an electric element or device))
- 224 lighting element (e.g. LED or other light system such as OLED, etc.)
- 226 coated surface
- 230 cells (e.g. cultivation site)
- 235 cultivation unit
- 240 sensor array(s) inside growing area/volume (e.g. wireless, air T, RH, VPD, $CO_2$, PAR, EC, pH, TDS, DO)
- 250 growing module opening access
- 251 top surface access
- 252 side surface access
- 253 front access
- 254 back access
- 256 view window
- 260 side air/gas flow duct/channel
- 261 air flow/circulation device (e.g. AC or DC fan, or passive fan)
- 270 lighting source(s) for growing module (e.g. fluorescent, LED, HID, incandescent, or MV. Also includes LED-associated drivers, or other drivers required for the lighting system chosen)
- 271 support frame for light diffusing panel (272)
- 272 light diffusing panel(s) or colored lenses (plastic, glass, metal, composite, synthetic, etc.) with orifices or fixtures to direct air flow and/or light.
- 273 light diffuser or lens
- 274 orifice
- 280 electrical connections to fans/lights/sensors, etc.
- 282 air circulation fan(s) for growing area
- 284 air circulation fan(s) for lighting and airflow module.
- 286 air inlet and duct
- 287 return air duct and vent
- 300 lighting and airflow fixture (may include HID lamp and/or other source with containment and airflow)
- 305 support frame for growing modules
- 307 leveling device or component
- 309 stacked growing modules on movement mechanism
- 310 lighting and airflow fixture housing
- 311 coated housing
- 312 porous diffusing panel (optionally may be coated)
- 313 light bulb adapter
- 320 fan
- 321 air flow device (e.g. AC or DC fan, or passive fan)
- 322 perforated fixture for air flow and to hold filter
- 323 removal air filter
- 330 light emitting diode (LED) assembly board
- 332 LED (or other light system such as OLED, etc.)
- 333 perforated lighting plane to allow airflow (contains LED or other light emitting components)
- 334 lighting and/or power connector (e.g. standard bulb base such as type A12) (an invertor and/or transformer may be located in or within base)
- 335 LED assembly heat sink 340 light diffuser
341 light diffuser spectrum altering component
342 airflow orifices
344 airflow panel with orifices (optionally removable form lighting system and may be configured to change lighting spectrum and or focus light via lenses)
350 adjustable airflow nozzle
400 internal irrigation system
410 connection to irrigation system (in)
412 connection to irrigation system (out)
422 air compressor
424 injector board (e.g., injector, filters, pressure gauge, inline sensor)
426 mixing tanks
428 stock nutrient tanks
430 particulate filters
432 inline sensor arrays (e.g., pH, EC, DO, T, TDS)
434 solenoids (e.g., fresh water, nutrient solution)
436 chiller
438 heat pump
450 solution gas saturation system
455 gas source for solution gas saturation system
450 sterilizing system
500 boom system
501 Z direction/axis
502 X/Y direction/axis
503 moveable boom
504 data acquisition system
505 camera
506 temperature sensor
507 relative humidity sensor
508 gas sensor
710 photovoltaic array
712 lead
715 photodiode
720 RFID Chip
730 battery
812 inlet and outlet connections for fan, gases, air and utilities
814 inlet and outlet for fertilization, irrigation, aeration and utilities
816 reservoir (may also contain plumbing, irrigation, drainage and aeration unit)
820 lighting unit
822 airflow panel with orifices and/or dyes and/or coating to provide directed air flow to cultivation unit and/or cultivation sites individually or as a group
824 panel with orifices and/or dyes to provide cooling to lighting unit (820) and other equipment and/or light manipulation
826 coated or reflective interior and exterior growing module panels. Panels may be with or without insulation
830 support/movement mechanism
831 cultivation module
832 utility module (plumbing, electrical, etc.)
833 lighting module
834 lighting unit with dyed perforated panel for air flow and light manipulation
835 root zone/growing medium zone
836 handle to access trough/root zone
850 air flow/circulation device (e.g. AC or DC fan, or passive fan)
852 directed airflow panel with orifices
854 light source located in side wall of growing module
858 lighting and airflow panel manipulation panel.
860 gas inlet/outlet
862 gas distribution manifold. Manifold may have holes or be porous to distribute gas.
863 assisted or passive vent
864 lighting unit airflow device for cooling lighting unit. In some embodiments, the air flow device also is a gas inlet/outlet.
865 manifold gas inlet/outlet
868 gas flow orifices and/or manifold for gas distribution and airflow sideways, vertically and horizontally
870 cultivation area airflow device/supplemental airflow device
881 cultivation module top surface
882 cultivation module base surface
883 cultivation module first side
884 cultivation module second side
885 cultivation module front side
886 cultivation module back side
900 trough cartridge with growing plane and utility trough
910 reservoir
912 coating on interior and exterior of reservoir
950 atmospheric gas system
1000 floating growing plane system
1002 coated growing surface
1004 coated bottom surface
1006 air gap
1008 buoyancy mechanism
1010 rolled/or formed material surrounding a buoyant end element or material crimped around gas space
1012 gas or other buoyant material surrounded by roll.
1014 gas space
1020 buoyant material layer (e.g. polystyrene)
1022 gas surrounded by roll of buoyant material
1024 single layer buoyancy assembly
1026 bilayer buoyancy assembly with layers of two different materials
1028 multilayer buoyancy assembly with layers of at least 2 different materials
1030 layer with embedded gas or liquid bladder(s) (e.g. gas bubbles, cartridge, etc.)
1032 gas bubble or bladder
1040 coated porous buoyant material
1050 coated surfaces with or without textured buoyant layer
1060 buoyant material insert with cartridge, canister or bladder
1130 raft type floating growing plane system featuring rigid cover over a reservoir or on a plane. System requires mechanism to secure, lift, slide, or otherwise manipulate
1132 flotation system, securement mechanism, shelving, and movement mechanism
1140 subsurface and intra-plane sensor/probe/device array(s) with bi-directional link to computer, storage, equipment, or communication device
1150 Battery, computer, multi-directional communications hardware and storage in container (1152) embedded in buoyant layer
1152 waterproof, shock proof, UV resistant, antimicrobial, etc. container for RFID/communications hardware or other equipment embedded in buoyant layer
1154 surface sensor array(s), e.g. photodiode, air T, PAR, RH, VPD airflow, $CO_2$, alarm(s), etc. and/or ports to connect sensors for custom place
1156 sensors
1160 communications antenna/amplifier
1170 RFID chip, and/or multidirectional communication device (e.g. xbee)

1180 local cloud hardware

Figure 52A:
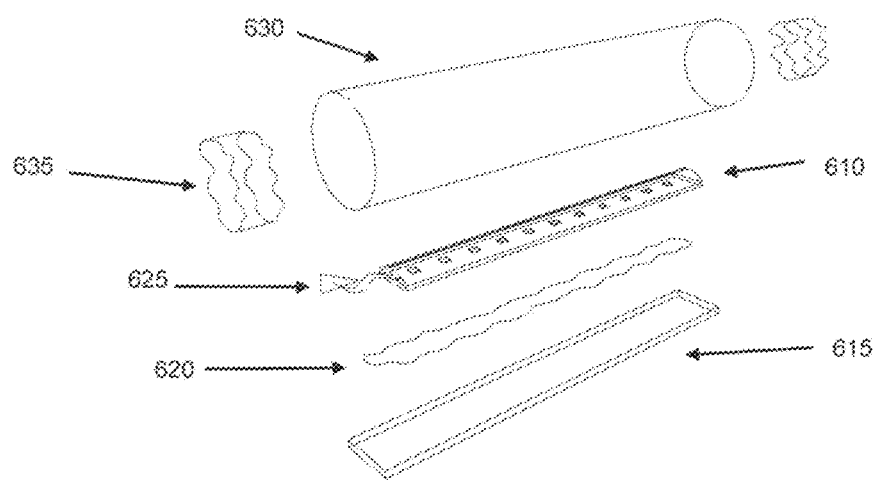
FIGS. 52A-52C show an alternative LED light system of the present invention.
Figure 52B:
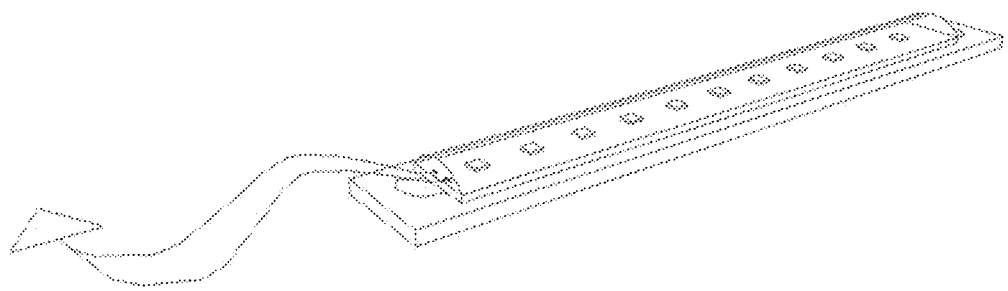
Figure 52C:
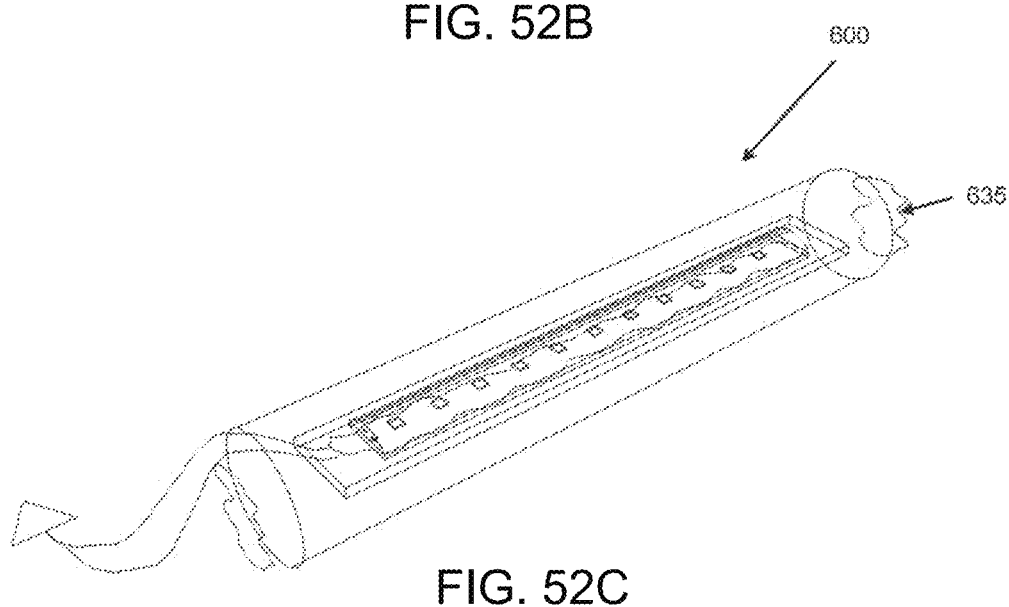

Referring now to FIGS. 1-52C, the present invention features a self-contained semi-automated crop production system (100) and componets thereof for culturing plants and other organisms (e.g fungi, bacteria, etc.) in a controlled environment. As used herein, crop may refer to a plant and/or other organism. The system (100) may be used in a variety of environments including but not limited to farms, yards, fields, warehouses or buildings, and the like. The system (100) can be easily transported from one location to another (e.g., because of the size of the system (100) and exterior shell (120)), and the system can be used for culturing during transportation. A user can engage in activities such as seeding and harvesting (and manipulating and treating), and the system (100) of the present invention performs the necessary tasks for cultivating the plants or organisms. For example, the system (100) can control conditions including but not limited to light, temperature, relative humidity, gas (e.g. carbon dioxide) concentration, irrigation, fertility, and the like, via internal algorithms and programs. Without wishing to limit the present invention to any theory or mechanism, it is believed that the system (100) of the present invention is advantageous because little agricultural knowledge and experience is required of a user to grow (and manipulate) plants and organisms with this system (100). Also, since the system (100) is contained, production of crops (plants and other organisms) can occur continuously, independent of the external climate and conditions. In some embodiments, during transport of the system (100), the system (100) can be powered using common connections in rail cars, semi-trucks, sea-faring vessels, planes, spacecraft, and/or its own alternative energy system.

The system (100) of the present invention comprise a shell, for example an outer shell (120) and/or an inner shell (110). In some embodiments, the exterior shell (120) is similar to a shipping container, which is well known to one of ordinary skill in the art, however the exterior shell (120) is not limited to a shipping container. In some embodiments, the shell is an ISO container (intermodal) or other modular transportation container. The exterior shell (120) may be constructed in a variety of sizes, for example sizes appropriate for small and large-scale use. For example, small scale systems of the present invention include those for use within a domestic environment such as a dwelling unit or other space, where the exterior shell (120) is similar in size to consumer applicances, such as automatic dish washers, refrigerators, freezers, washing machines, and the like.

One or more access points (e.g., doors (130)) are disposed in the exterior shell (120). The shell (120 or 110) may further comprise a variety of other components, for example for providing strength and/or insulation (e.g., for helping to control the internal environmental conditions accurately or protecting from external conditions, such as external radiation). For example, the system (100), e.g., the shell (120), may comprise a chemical-resistant liner, insulating paint, a relefective cating, paint, foam, gel, boards, fills, an anti-bacterial or self-sterilizing coating, etc., for helping to control the environmental conditions. In other embodiments, particularly for space or underwater applications, the shell (120 and/or 110) may be adapted to be pressurized. In some embodiments, one or more windows (151) are disposed in the exterior shell (120). Examples of window materials useful in the embodiments of the invention include glass, 2-way mirrors, composites and plastics. In some embodiments, ventilation ducts are disposed in the system (100), e.g., in the exterior shell (120). The system (100) may comprise one or more power sources. The power source, for example, may comprise an alternative energy-generating component (155) to create an off-grid or grid-tied system such as one or more photovoltaic panels (or wind, peltier, fuel cell, or other). In other embodiments, the system (100) may be powered from connection to the electrical grid or other power source by use of a power connector system such as those used by recreational vehicles, electric ovens, clothes dryers, etc., of suitable ampage (e.g. NEMA 14-50, NEMA TT-30, NEMA 10-30, etc). In some embodiments, the system 100 is connected to utility connections, such as, but not limited to, water, electricity, gas, drainage and/or sewer.

In some embodiments, insulating paint may be coated on the exterior shell (120). In some embodiments, insulating paint may be coated on the interior surface of both shells (110, 120). In some embodiments, one or both of the shells (110, 120) and/or other components of the system (100) feature an anti-bacterial or self-sterilizing coating.

In some embodiments, the system (100) further comprises a tracking component (e.g. GPS system) and communications component (153) (e.g., remote system disablement, communications and control) and/or a computer control system (154). The GPS tracking and communications component (153) may allow for communication to and from the system (100), remote shutdown or system disablement, and/or locational tracking. The system (100) may also feature communication components, which allow for communication of information to and from the device. The communication component may be used to remotely control system (100) functions, such as growing conditions, irrigation, etc. based on, for example, sensor information communicated to a remote control system. A weather station (152) may communicate external environmental information to and from the device for control. The weather station (152) may feature a natural vent, power, crop readiness and storage.

The system (100) may comprise an interior shell (110), which may slide into the exterior shell (120). The interior shell (110) may provide additional insulation for the system (100) (e.g., resistance to entry/exit or heating or cooling), a chemical resistant barrier, a radiation resistant barrier, a ballistic protection layer, and/or beams for securing internal structural components (e.g., providing additional strength to the system (100)), equipment, wiring, other devices, and the like. A chemical-resistant liner (148) (and/or an anti-microbial or self-sterilizing surface coating for protection may be on both the inside and outside of both the shells) may be disposed in the interior shell (110), allowing the unit to be effectively cleaned and sterilized in preparation for use or modification of the system without damaging the exterior shell (120). Various attachment or fitting components may be disposed on the outside of the interior shell (110), allowing the interior shell (110) to be slid or mounted into the exterior shell (120). The external or internal shell may coated or reflective interior and exterior growing module panels. Panels may be with or without insulation.

The present invention is not limited to a configuration with an exterior shell (120) and an interior shell (110). For example, in some embodiments, the system (100) comprises a single shell, and in some embodiments, the system (100) comprises a plurality of shells. In some embodiment, the system (100) may alternatively feature an insulated container (110 or 120) without the growing module (200) or the growing module insert without containment (e.g., the growing module container (210) without the shell (120 or 110)). Examples of insulated containers include, but are not limited to, ISO type modular containers.

The systems (100) of the present invention may be constructed in a variety of sizes including for small scale use, such as within a domestic environment such as a dwelling unit or other residential space. For example, in some embodiments, the interior shell (110) may be sized to fit into an exterior shell (120) with dimensions similar to those of consumer appliances, such as automatic dish washers, refrigerators, freezers, and washing machines. Compact size versions of system 100 may be placed in areas common for ordinary household appliances such that utility connections (for example, water, electrical power, and/or in some cases sewer or septic systems) will be available, for example installed in a kitchen. Small sized systems will be advantageous for use in areas where small-scale agricultural operations are not possible to produce locally grown fresh foods for increased quality, nutrition and lower price.

Compact crop production systems (100) of the present invention may utilizes components similar to those of household appliances, including, but not limited to, utility connections, system housing (the frame), internal components, such as water pumps, and external/internal features such as user interfaces and handles. The compact crop production systems further may comprise one or more of the components of larger systems such as water purification, air filters, lighting, and the like.

The compact systems of the present invention comprise one or more growing modules or shelving units for crop production. The number of growing modules contained in a compact system is dependent on the size of the system. For example, an under the counter unit may comprise 2 stacked growing modules, where has a larger compact system the size of a refrigerator, may comprise 3 or more growing modules. In some embodiments, each growing module may be separately environmentally controlled. In such embodiments, the growing modules may be mounted in the compact system as slide out drawers. In other embodiments, the growing modules are contained within a single environment. For example, behind a single door.

Compact crop production systems (100) of the present invention, may be operated by inexperienced persons using pre-programmed functions and consumable items such as, for example, packaged agricultural consumables (PACs), seeds, soil, and the like. In one embodiment, a user would place in the growing module PCAs, seeds and soil in specified modules or locations in the growing module, and by selecting pre-programmed functions through a user interface to instruct the system to perform one or more functions. Pre-programmed functions include, but are not limited to, germinate, grow, irrigate, harvest, sterilize, fertilize, pest control, rapid growth, slow growth, storage, and special treatment. The system 100 would then utilize the added consumables and utility connections available to engage in the selected process(es).

The compact systems of the present invention comprise a control system and user interface. In one embodiment, the control system comprises a microprocessor, associate hardware and software to control system functions. In one embodiment, the user interface is a control panel located on the system, such as a touch panel or buttons. In another embodiment, the system may be controlled via a remote user interface, such as a smart device (e.g. cell phone app or tablet) or a computer. The internal algorithms and/or software may control the operation of the unit via pre-programmed operation cycles selected by the user or via input of operation parameters from the user. For example, a user may specify all parameters such as, but not limited to, temperature or relative humidity, for crop production. In another embodiment, the user may select a program, for example to grow a particular crop, for example lettuce.

During operation the system may indicate status to the user of crops under cultivation. Upon completion of an operation cycle, the user interface of the system may indicate to the user via signaling, such as a sound and/or light, or by the remote user interface. The user may then interact with the unit to extract a crop for example for harvest by removing or opening a growing module. Access to a growing module may occur without disturbing the connections (e.g water and power) or the mounting of the growing modules in the system.

In some embodiment, the system 100 may default or be instructed to enter other modes of operation such as 'storage'. For example, if growth of a plant is complete, but the plant is not needed for a period of time, the system may alter the environmental conditions internally to preserve the plant for a period of time by, for example, a method such as lowering the temperature.

The compact systems of the present invention may interact with the environment (e.g. the kitchen or house, etc) it is installed in. In one embodiment, the system may be used as an air purification, carbon dioxide reducing, or oxygen generating device. In this embodiment, the system utilizes ambient $CO_2$ in the installed environment during the "day" cycle or photosynthesizing period, absorbing and using the $CO_2$ and releasing oxygen. During a "night" cycle or period in which the crop is respiring, the system would not interact with the installed environment, and would restrict all gas flow internally or to an external vent outside of the installed environment (to the outside).

The system (100) further comprises one or more growing modules (200) (e.g., small isolated containment units). The interior shell (110) provides a means of mounting the growing modules (200) and other materials needed for the system (100). For example, mounting components (140) may be disposed on the inner surface (e.g., the side walls (112)) of the interior shell (110) for mounting growing modules (200), irrigation components, light components, and the like. The growing module (200), e.g., the growing module container (210), may comprise one or more mounting component flanges (142) for slidably engaging the mounting components (140) of the interior shell (110). Mounting component flanges may be located on side surfaces and/or top surfaces of the growing modules. For example, the mounting component flanges may be drawer or shelving hardware that can be used to open, close and support the growing module. Alternatively, a rail and wheeled rack system may be used move the growing modules in and out of the shell. In some embodiments, one or more handles (215) are disposed on the growing modules (200) (e.g., on the growing module container (210)), allowing for easy sliding of the growing module (200) within the mounting components (140) or for inserting or removing growing module containers (210).

The system (100) creates micro-climates and treatments (e.g., with specific environmental parameters) inside the various growing modules (200) installed in the system (100). Each growing module (200) can be used to grow a specific plant or organism (or certain groups of plants or organisms), allowing the specific grown requirements of those plants or organisms to be met (or allowing experiments, storage, treatment, etc.). The artificial micro-climates created allows for growth of these plants and organisms in non-traditional environments such as buildings and other urban settings (and allows for experimentation), as well as life support applications (e.g. space/planetary exploration, underwater environments). When used in life support applications, the systems of the present invention are used not only to cultivate crops, but also to recapture and process water, process gases, an further provides protection from the outside environment, including space radiation. The growing modules (200) allow for efficient control of parameters such as temperature, light, humidity, gas (e.g. carbon dioxide, oxygen, etc.) concentration, and the like, because the growing modules (200) have a small volume of space. The environmental parameters are also monitored via sensors for feedback control.

The growing module (200) may comprise a growing module container (210) and a grid (220) disposed inside the growing module container (210). The grid (220) may be mounted on a support structure (211) or may be independently standing in the growing module container (210). The support structure (211) may be constructed of materials such as aluminum, steel, other metals, alloys, plastics, and composite materials. The growing module and associate components may be constructed out of any food safe materials that are also chemically stable and resistant. The grid (220) comprises a plurality of cells (230), each adapted to hold a crop (e.g. plant or other organism). For example, the grid (220)/cells (230) can hold a series of plants (e.g., a series of plants) with or without a container (e.g. pot) on a single plane independent of each other. In some embodiments, the grid (220) is accessible via an opening access (250) disposed in the growing module container (210). A handle (216) may be attached to the growing module opening access (250). In some embodiments, the opening access (250) is positioned in a top surface of the growing module container (210). In some embodiments, the opening access is positioned in a side surface of the growing module container (210). The growing module opening access (250) provides for access to the grid (220) and cells (230), as well as to utilities of the growing module. A handle (217) may be attached to the support structure (211) and/or grid (220) to enable the removal of grid or support structure from the growing module container (210) for harvesting of products or to perform functions, such as, cleaning, sterilization or seeding/planting. The growing module container (210) may comprise a window (256) through which to view the growing crops without disturbance. The growing module containers (210) may be freely exposed, e.g., the growing module containers (210) may not necessarily be incorporated into a shell.

In some embodiments, the growing module (200) may be removable and stackable. The modules (200) may be independently controlled and maintained in the system (100).

The growing modules (200) of the present invention may be stacked in a support frame. In some embodiment, the support frame comprises one or more leveling devices attached to the support frame. The leveling devices are engaged to level the support frame and growing modules. An example of a leveling device (307) is a foot that may be screwed into one or more legs of the support frame to adjust height and hence level the frame. Other methods for leveling the growing modules and/or support frame may also be used. Leveling the growing modules (200) assists the system in providing uniform irrigation to growing crops. In other embodiments, leveling devices may be located on the interior shell (110) or the exterior shell (120) of the system, or on the growing module inserts (210).

Growing modules (200) of the present invention may be stacked in multistacked units of one or more growing module containers (210). In some embodiments, growing modules may be stacked vertically. In other embodiments, growing modules (200) may be stacked in horizontally arrays. Stacked growing modules may be placed inside a shell (110/120), or other production system or facility (for example, a warehouse, greenhouse, plant factory, and the like). In some embodiment, the stacked growing modules may be movable inside the shell or other culture area using a movement system (which may or may not be motorized). In one embodiment, the growing module(s) and/or other components may be attached to or rest upon a movement system that allows growing modules and stacked units to be moved in the X, Y or Z directions.

Space allocation inside a growing chamber (shell), plant factory or similar to accommodate movement of humans and equipment can be challenging and may limit crop production, and hence operation feasibility, by reducing the area available for the crop production systems and crop yield. Further, moving installed growing systems and their components within a growth chamber for access can be challenging due to weight and limited space, especially when trying to maximize available production space. By stacking growing modules it is possible to maximize available space for crop production, while allowing space to accommodate equipment, and care and harvesting of crops inside the crop production system. Providing a movement systems for stacked growing modules within a crop production system (100) allows for tighter packing of stacked growing modules, and provides for ease of access to the growing module stacks, and to individual growing modules for functions such as care, harvesting, and maintenance.

In one embodiment, the movement system comprises a movement mechanism. Examples of movement mechanisms include, but are not limited to, wheel and track systems, motorized movement mechanism, pulley(s), carts and other devices. The movement mechanism may be attached to the shell (110/120). The movement mechanism provides for the movement along the X, Y, or Z directions of a movement chassis component. The growing modules, or a frame holding growing modules, and any associated components may attach to or rest upon the movement chassis component. The movement system may be in contact with or attached to any surface of the growing module or the shell (110/120), including, but not limited to, a floor, ceiling, or wall. The movement system may be operated manually by a user or may be motorized. In alternative embodiments, the movement may be automated or semi-automated through a user control interface or by remote command from the system 100 or other device.

The growing module container (210) may comprise an exterior skin (213) and/or cover (212), which may be fitted. The cover (212 and exterior skin (213) may be formed of a material such as, for example, metal (e.g. aluminum), plastic, composite, or mylar.

In some embodiments, the growing module (200) may include one or more sensor array(s) (240) comprising one or more sensors. Sensors for useful in the array(s) include, but are not limited to, wireless or wired devices to measure: air, solution and substrate temperature (T); relative humidity (RH); pH; irradiance; light quality; conductivity; dissolved gas concentration; ion concentration; and other parameters (e.g. VPD, PAR, EC, TDS and DO). Useful sensors include but are not limited to, pyranometers, anemometers, quantum sensors, psychromteters, hygrometers, thermocouples, thermistor, InfraRed Gas Analyzers, and others sensors know in the art. Sensor arrays may further include a camera (e.g., color, video, thermographic, hyperspectral, etc.). One or more sensor array(s) may be located inside the growing area/volume of the growing module, or in the reservoir area.

One or more sensors may be located on or within the growing plane grid (220) or support structure (211) for the grid (e.g. in the root zone or irrigation zone/reservoir area). Alternatively, sensor array(s) may be located above the growing plane grid in the cultivation space or within the lighting and/or air handling system of the growing module. In some embodiments, the growing modules may incorporate a weather station (152).

The growing module container (210) of the present invention comprises a cultivation space located above the grid (220). The grid (220) is also referred to herein as the growing plane and growing plane grid. The growing module containers of the present invention may comprise a reservoir beneath the grid containing an irrigation system. In some embodiments, a utility module (835) is positioned beneath the root zone (835). The utility module may comprise one or more utilities, for example, plumbing, electrical, sensors, gas systems, etc. The shape of the utility module may be chosen base on the size and shape of the cultivation modular, and the system (100). In one embodiment, the utility module is in the shape of a triangular prism. In one embodiment, the utility module is in the shape of a rectangular prism. Other polygonal shapes may also be used.

The growing module containers of the present invention may comprise a one or more fans. Fans may be located to cool the lighting system, or to provide air circulation around the crops under cultivation. The figures illustrate various fan configurations of the growing modules of the present invention.

The system (100) of the present invention may feature an XYZ coordinate boom system (500), e.g., a data collection and culturing device. The boom system (500) may or may not be featured in each growing module (as a component or an add-on over and/or around the culture area) or be mounted to the interior of the container (e.g., shell) or on a framework or around the culture area (e.g., when only a single plane of culturing organisms exists).

The boom system (500) may comprise a track along the X/Y direction (502) and Z direction (501), allowing for motorized or non-motorized movement along the axes. The boom system (500) may comprise a moveable boom (503) along the X/Y axes (502) with or without its own independent track that moves along the X or Y axes with or without air and/or water ducting to support standard horticultural functions and specialized treatments. The boom system (500) may comprise an irrigation/fertilizing system or components thereof, and/or air ducting or an air flow/vacuum creation device with orifices, and/or lighting system(s) and/or a means of gently contacting the organism (bristle brush or fiber or strips of metal (504)) attached to the moveable boom (503). Contacting the growing crop with mechanical stimulation may help to promote crop growth, health and strength (rigidity and hardiness), as well as provides for the mechanical pollinations crops.

The boom system (500) may comprise a data acquisition system (504) comprising sensors and cameras (505, 506, 507, 508). Such sensors and cameras may be mounted or embedded onto the moveable boom (503) or mounted without the boom on the X/Y/Z tracks (501, 502), allowing for movement in all directions over the culturing area. The boom system (500), e.g., data acquisition system (504), may allow for processing, archiving, and feedback control. The data acquisition system (504) may comprise a camera (505) (e.g., color, video, thermographic, hyperspectral, etc.), a temperature sensor (506) (e.g., air and non-contact organism & culture area), a relative humidity sensor (507), and a gas sensor (508) (e.g., sample by vacuum on moving boom analyzed by IRGA). The data acquisition system (504), e.g., gas sensor (508), can help to monitor conditions such as concentration of Ethylene, VOC, NOX, and other gases.

The boom system (500), e.g., the boom (503) and/or the data acquisition system (504) may perform standard horticultural functions including but not limited to water application, fertilizer application, pesticide application, and/or other chemical or biochemical treatments. In some embodiments, the boom system (100), e.g., the boom (503) and/or the data acquisition system (504) may perform additional functions including but not limited to (a) eliciting nastic and/or tropic responses through methods such as, but not limited to, mechanical stimulation for rigidity and hardiness or pollination of the organism by contact with the movable boom (503) or by attached apparatus or materials of the data acquisition system (504) (e.g., bristles (e.g. brushes, metal strips, or fibers), (b) direct air injection combined with carbon dioxide or other gas for pest control and growth management capability allowing for increased growth of certain organisms, (c) stimulation by air flow for rigidity and hardness and pest control by non-contact as means to avoid soiling instruments or spreading pathogens and/or pests, (d) moving lighting system mounted on the boom (503) or the data acquisition system (504), e.g., pulse lighting to apply treatments and/or to reduce electric power consumption, (e) special light treatments either in the data acquisition system (504) or mounted on the boom (503), e.g., application of UV, Far-red, and others to elicit morphological, biochemical, or physiological change within an organism, and (f) vacuum or filtration on the boom (503) or on the data acquisition system (504) of air, pest, particulate matter in the immediate culturing area minimizing disease, pests, and other pathogenic risks, and providing for sampling for data and analysis.

The boom system (500) may take information via sensors (e.g., air temperature, leaf temperature via non-contact methods such as laser measurements, infrared thermometry, relative humidity (RH), gas concentration (e.g. carbon dioxide concentration), air pressure, etc.). In some embodiments, the boom features a camera for video or photo recording, infrared, thermal recording, photo archiving, etc. In some embodiments, a vacuum obtains air samples for processing by IRGA or other system to obtain rates of photosynthesis, transpiration, evapotranspiration, and/or gas consumption or production. The boom system (500) allows for feedback of information to a connected system for a user, e.g., a controller/software, etc.

The system (100) may also be designed to provide the user information about the plant or organism as it progresses, either for educational purposes or to help the user to make decisions, e.g., to modify conditions or to harvest, etc. The ability to instantaneously adjust environmental settings based on what is occurring inside the growing area and regulates the immediate conditions of the aerial cultivation environment surrounding the organism allows for almost complete control of its culture and manipulation, modification, and/or response. Through the use of external weather stations, the system (100) may opt to utilize external conditions for heating and cooling the device (e.g., via a natural vent), as well as using data for acclimatizing plants to external conditions where and when appropriate (e.g., for crop transplant production, plant storage, crop readiness, etc.). Usage of passive cooling and heating will increase the efficiency of the device and lower its power requirements. One advantage of the system (100) is the ability to acclimatizing crops to the external conditions of the environment prior to transplant into the field based on external collected data.

Using lighting sources in the growing module such as, but not limited to solar collectors, LEDs (332), HID lamps, microwave plasma, redirected solar via fiber optics, and fluorescent lights, the culture and manipulation of plants and other organisms is made possible without the use of sunlight. And, such light sources allow the system (100) to manipulate the light conditions as desired (e.g., pulse lighting, alternative light cycles, radiation treatments for manipulating biochemical synthesis in organisms, higher nutrition or relevant chemical compound, etc.). Light diffusing panels (340) may be used to achieve uniform lighting throughout the growing module (200), while able to provide cooling and additional airflow (possibly directed) to the aerial portion of the growing environment. For example, the light diffusing panels (340) may be used to direct temperature controlled air with or without added gases (e.g. carbon dioxide). Overhead or horizontal airflow may provide the advantage of faster growth, breaking up of a boundary layer, or solving of other physiological issues. Additional heat generated by the light source may be separated by the diffusing panel (340) and then ventilated away from the growing environment. Removing excess heat reduces the load on the air conditioning units, creating a more efficient system.

Controlling the light output reaching the organism allows precise and accurate control and manipulation of the plant's/organism's development through exposure to specific wavelengths of light emitted including but not limited to UV (10-400 nm), PAR (400-700 nm), near IR, IR spectrum, far red, and/or other wavelengths outside the wavelengths commonly used in the field may be used (a spectrum similar to sunlight may be used, or special spectrums for special treatments may be used, etc.). Since the amount of light needed varies per plant/organism, the system (100) of the present invention integrates algorithms contained within the computer control systems. These algorithms and programs communicate with sensors inside the growing modules to control light intensity, duration, color, quality, and other factors, such as pulse lighting treatments, to yield the desired type of growth or manipulation. This combination of automatic environmental control and sensing allows users to operate the device without prior knowledge of the plant's/organism's optimal conditions.

Computer control systems coupled with sensors monitor real-time parameters including but not limited to: air temperature (AT), solution temperature, RH (%), PAR (umol m−2 s−1), $CO_2$, dissolved oxygen, and other parameters, in addition to visual monitoring through camera and other imaging techniques. Communications between sensors and the computer control systems allow for automated control of the conditions required for growth of the selected organism based on pre-programmed set points so the user requires no prior experience or knowledge. For example, a consumer with an appliance sized unit located in a dewelling would be able to select a pre-programmed growth cycle for a crop such as lettuce without requiring knowledge of cultivation requirements. Alternatively, a user may enter alternate parameters or set points. Integrating visual monitoring allows for pre-programmed decision software to completely control plant growth and reduces the user's interaction. The computer and other control systems allow remote monitoring, access, and control to be accomplished through terminals, computers, laptops, PDAs, and other communication devices. Remote access allows user interaction and troubleshooting to occur in a non-contact manner (e.g., low jack, kill switch), helping to eliminate disturbing of the production process.

The present invention also features lighting and airflow fixtures (300), which may be incorporated into a growing module (200). Each lighting and airflow fixture (300) comprises a housing (310), e.g., a cylindrical housing. A fan (320) is disposed in the housing (310) and is positioned to blow air downwardly (e.g., to a cell (230)). In some embodiments, the fan (320) is attached to the exterior of the housing (310), driving air in and then passing it through a porous diffusing panel (312). The lighting and airflow fixture (300) as shown in the figures positions the fan (320) at the top portion of the housing (310) and the bottom portion of the housing (310) is open to allow air flow to exit the housing (310).

A light emitting diode (LED) assembly board (330) comprising LEDs (332) (or other light system such as OLED, etc.) is disposed below the fan (320) in the housing (310). A light diffuser (340) is disposed below the LED assembly board (330), wherein the light diffuser (340) comprises airflow orifices (342). The light diffuser (340) is adapted to shape light passed to the cells (230) (e.g., a plant in a cell (230)), and may optionally change the color of the light passed to the cells.

In one embodiment of the light and airflow fixture (300), an adjustable airflow nozzle (350) extends downwardly from fan (320) and protrudes through the LED assembly board (330) and the light diffuser (340). The light diffuser (340) may have a particular orifice shape on the diffusing panel, e.g., to elicit directional airflow either vertical, diagonal, horizontal, or somewhat horizontal). The adjustable airflow nozzle (350) provides directed air flow downwardly toward the bottom area of the housing (310). A plant (e.g., in a cell (230) in a grid (220) of a growing module (200)) may be positioned below the air flow.

In another embodiment of a lighting and airflow fixture (300), the fixture of the present invention comprises a bulb base that is compatible for connection with common screw type or pin based connectors light bulb fittings. Such adapted fittings allow for the retrofitting of the LED light and airflow fixture (300) of the present invention into existing incandescent and compact fluorescent light bulb sockets. Such adapted fixtures provide for ease of replacement in horticultural lighting applications where there is little uniformity across the industry in standards for LED lighting systems. In one embodiment, the base type of the lighting and airflow fixture (300) is a E26 screw base. This provides for the ability to utilize already existing infrastructure which lower the cost of installation and maintenance. For example, when individual luminaire maintenance is required, the bulb is replaced, as opposed to having to disconnect and replace an entire system, as is common in newer LED lighting systems. When bulb supporting hardware is required or needs maintenance, components used in the system are widely available such as wire, bulb bases, switches, and other hardware. Additionally, in sensitive production scenarios, in the event of a failure of a lighting and airflow fixture (300) with no available replacement of the same technology, the failed unit may be replaced with another bulb of a different, possibly older technology such as compact fluorescent or incandescent bulb, preventing potentially catastrophic production results from inconsistent or failed illumination and environmental fluctuation such as temperature, when a failed luminaire is left not functioning.

In some embodiments, a plurality of lighting and airflow fixtures (300) is contained within a light and airflow "unit." In some embodiments, a light and airflow "unit" (e.g., a plurality of lighting and airflow fixtures (300)) is disposed in a growing module (200). For example, a plurality of light and airflow fixtures (300) may be positioned above the grid (220) and arranged such that each lighting and airflow fixture (300) is positioned above a cell (230) and air flow from the fan (320) and light from the LEDs (332) of the lighting and airflow fixture (300) is directed downwardly to its respective cell (230).

In some embodiments, the growing module (200) and the lighting and airflow fixtures (300) are housed in a shell, e.g., the inner shell (110) and/or the outer shell (120). In some embodiments, the growing module (200) and the fixtures (300) are slidably inserted into a shell. In some embodiments, the growing module (200) and/or the fixtures (300) are free standing, hanging, or stacked.

The growing module of the preset invention may comprise a lighting component and housing that surrounds it which hold airflow devices, and mounting component flange(s).

In some embodiments, the growing modules of the present invention comprises a lighting and airflow module, comprising one or more light sources (270) and one or more air circulation fans (284). The light sources (270) for these modules may be selected from fluorescent, LED, HID, incandescent, MV, or other light sources, including solar. The lighting and airflow module may further comprise one or more drivers (e.g. LED-associated drivers). The lighting and airflow module further comprise light diffusing panel(s) or coloured lenses (272) with orifices or fixtures for airflow position beneath the lights and above the growing plane. The light diffusing panel(s) or coloured lenses may be constructed of glass, metal, composite, or synthetic materials.

The system (100) may further comprise an internal irrigation system (400) for providing irrigation solutions (e.g. water or other liquid) and/or nutrients to the crops under cultivation. The irrigation system (400) may provide for the controlled (and optionally continuous) circulation or recirculation of water (and/or nutrients). In other embodiments, the irrigation system provides for filling the reservoir of the growing module and for the discharge of used water after a period of time. The irrigation system (400) may feature an inlet connection (410) and an outlet connection (412) to carry water to and from the growing module (200). The system (400) may allow for recirculation and recapturing of atmospheric vapor and water condensate with a condensation device. In some embodiments, the inlet connection (410) and the outlet connection (412) are disposed in the growing module container (210), e.g., the stabilizing structure (211). In some embodiment, the inlet and outlet connections of the growing module are connected to the irrigation system by quick-connect type fittings that allow for the disconnection or connection of the irrigation system from the growing module when the growing module removed or inserted into the system (100). In some embodiments, the growing module is connected to the irrigation system by a connection such as a coiled hose that extends and allows the growing module to be pulled out to plant, harvest, and or service. The outlet connection may further provide for maintaining the water level in the cultivation module. In some embodiments, the outlet may comprise a solenoid value to maintain the level of irrigation fluids or to drain the system. The inlet connection (410) and outlet connection (412) connect to the irrigation system (400), for example to a sterilizing system (450), a mixing tank (426), a nutrient tank (426), a particulate filter (430), heat exchanger (e.g. a chiller) (436), and/or a heat pump (438). In some embodiments, the irrigation system (400) comprises an injection board (424) dosing injectors or other chemical introduction methods, an inline sensor array (432), solenoid valves (434), and/or an air compressor (422) and/or filters. In some embodiments, the system recaptures water with a condensate generation and recovery system, then water can be treated prior to recirculation. In some embodiments, condensation is collected from air conditioning and/or heat pumps and is subsequently treated prior to recirculation (e.g., if it is a stand-alone unit).

In some embodiments, water of the internal irrigation system (400) may be treated and/or sterilized via the sterilization system (450). The sterilization system (450) may feature sterilizing lamps, anti-microbial lights, ozone-generating systems, and/or chemical systems. Treating in this way, the nutrient solution and water may be recirculated without introduction of pests, pathogens, and other organisms that may develop or be introduced otherwise. Other treatments (e.g., chemical additives, ionizing radiation) may be used with the systems of the present invention. The recirculation of nutrient solution and it's sterilization may provide for optimal water usages, and higher efficiency usage of nutrients as well. The water treatment and/or sterilization system may also be used to produce portable water for drinking and cooking in a life support system.

In some embodiments, the system (100) of the present invention further comprises a reverse osmosis system for filtering water. In some embodiments, the system (100) of the present invention further comprises peltier pumps for generation of a trickle charge on the exterior and/or interior of the shell(s) (110, 120).

In some embodiments, the system (100) of the present invention further comprises pulse lighting (e.g., via LED) to reduce power consumption.

In some embodiments, the system (100) of the present invention further comprises an irrigation system with load cells immediately underneath the cultivation module and other equipment. In some embodiments, the thermoelectric devices (Peltier pumps) are mounted to the surfaces of the shell(s). In some embodiments, the thermoelectric devices may be powered to cool/heat a surface and/or collect, store and use energy from waste heat (e.g., using heat generated on the exterior surface by solar radiation).

In some embodiments, the system (100) of the present invention further comprises a heated/cooled growing tray or an insert coated in resin or anti-microbial material. In some embodiments, the system (100) further comprises LED/OLED lights embedded for intercanopy lighting. In some embodiments, the system (100) is impregnated with silver ion.

In some embodiments, the system (100) of the present invention further comprises a water recapture system with a condensation unit or an air conditioning unit and filter. In some embodiments, the system (100) of the present invention further comprises mobile shelving for space utilization (the mobile shelving may or may not be motorized). In some embodiments, the system (100) of the present invention further comprises biological and/or chemical and/or biochemical carbon dioxide generation using fungal, bacteria, chemical or biochemical reactions.

In some embodiments, the system (100) of the present invention further comprises intercanopy and/or intracanopy light ropes or a woven light curtain or blanket. In some embodiments, the system (100) further comprises waterproof endcaps to allow for healing and high humid environment.

Many current models of LED lights for horticulture use are expensive and do not feature the ability to easily maintain the system for uniform illumination as the light source(s) degrades or needs to be replaced. While LEDs are relatively inexpensive, the assembled systems produced by manufacturers often require dedication to a brand and a suite of accessory components. Many lack interchangeable parts, are bulky, heavy, and do not have easily or inexpensive replaceable components. Others are sensitive to moisture, movement, and must be treated delicately to prevent damage, which is not conducive to an active crop production scenario. Cheaper LED systems such as reels of LED strip type lighting have been introduced, but themselves have performance issues which have prevented their large scale introduction to agricultural and other lighting requiring scenarios. Surface mounted LED Strip light tends to warp as a result of high temperatures when run for extended periods of time. This results in a deformed product requiring maintenance or other physical alteration, inconsistent lighting conditions, reduced life of the illumination unit, damage to the factory waterproof coating, and degraded quality during the life of the unit. Malfunctions as described can lead to damage or danger in systems.

Another embodiment of the present invention provides an improved LED strip lighting system (600) for high moisture environments, and other applications. The LED strip lighting system comprises a commercially available surface mounted LED's (SMD type) on a strip of material (610) that may or may not feature an adhesive backing and or IP (Ingress Protection) rated moisture proof coating. The LED strip (610) is mounted on the surface of a mounting material (615). In one embodiment, the LED is mounted to the surface of the mounting material using an adhesive, thermal compound, or adhesive thermal compound layer (620). Other methods of attachment may also be used. The LED strips mat be placed one side or on multiple sides of the mounting material. The attachment of LED strip lights on multiple surfaces of the mounting material allows for illumination to occur in multiple directions. This provides options for inter/intra-canopy lighting of either a supplemental or primary nature. The mounting material (615) may be comprised of one or more layers of material that may be rigid or flexible. The mounting material may be comprised of a material that acts as a 'heatsink' such as aluminum. The LED strip (610) and/or the mounting material (615) may or may not feature an adhesive, thermal compound, or adhesive thermal compound to assist in mounting and energy transfer.

The LED strip (610) comprises electric leads attached to a connector (625). Examples of connectors (625) useful in the invention include, but are not limited to 2.1 mm DC power connector, or Molex©/JST pin-type connectors. The connector may or may not be moisture-resistant.

A piece of polyolefin, or other material type, heatshrink tubing (630) is placed over the mounted LED (610), the mounting surface (615), and the connector (625) leads at the attached point on the LED strip if present. Prior to application of heat to the 'heatshrink' tubing (630), an amount of waterproofing or sealing agent (635), such as silicone, is placed in each exposed end of the LED Strip System (600). Heat is applied to the unit, reducing the size of the 'heatshrink tubing' (630).

The LED strip light system (600) features improved structural support and energy management from attachment to the mounting surface (615) and moisture proofing in the form of 'heatshrink tube' (630) and waterproofing agent (635). Connector (625) provides electrical power via a commonly available power supplies that can be used in high moisture environments. The LED strip light system (600) of the present invention is an inexpensive, durable, light weight, easily cleaned, and interchangeable LED lighting that offers improved structure and efficient operation in a variety of environments, including to horticultural, without hazardous materials such as glasses, rigid plastic, or mercury as is found in commonly available illumination systems, which can also be easily recycled after its useful life. Further, the attachment of LED strip lights on one or multiple surfaces of the mounting material provides illumination that may occur in multiple directions. This provides options for inter/intra-canopy lighting of either a supplemental or primary nature.

The system (100) may comprise one or more manifolds to provide mist, fog, or other droplet types to the cultivation area. Mist, fog or droplets may be generated using water pressure and nozzles, ultrasonic atomizer or other atomizing type device. In some embodiments, the growing module comprises one or more manifolds to provide mist, fog, or other droplet types to the cultivation area. In some embodiments, the system (100) further comprises a fog system and ultrasonic mist system for sterilization, pest, virus, bacteria, "pre-entry" control and/or humidity control. For example, such a system may be used to provide "pre-entry control" to prevent pests, virus, batereria and like from entering the cultivation area when an operator needs access.

The present invention also features a growing plane system. The growing plane system (like the boom system (500)) may be stand-alone devices, or the growing plane system (like the boom system (500)) may be incorporated in other components and/or systems described herein.

In some embodiments, the growing plane system may help control and provide optimal temperature via an energized wire element and/or a thermo-electric device (e.g., a peltier-type thermoelectric device). In some embodiments, the growing plane system may deliver light (e.g., via a lighting system (optionally either surface-mounted or embedded)), e.g., away from the surface in the culturing area, diffused in the coating/covering, or elsewhere. In some embodiments, the growing plane system may provide a growing surface in immediate contact with the culturing area that is water and chemical resistant and resistant to bacterial, microbial, virus, fungal, and/or other biologic system(s). The growing surface may optionally be self-sterilizing.

The growing plane system may comprise a mounting surface, which may be lightweight, rigid, semi-rigid, and/or flexible. The growing plane system may further comprise a series of thermo-electric devices, e.g., surface-mounted, peltier type. The growing plane system may further comprise a wire-type energized element (e.g., surface-mounted). Sensors may also be placed in the surface of the growing plane.

The growing plane system may further comprise a surface mounted lighting system, e.g., a surface-mounted lighting system. The lighting system may provide specific wavelengths of light. The lighting system may work in combination with the coating/cover (coating/cover described below). The lighting system may allow a user to provide lighting to the culture area. For example, the lighting system may provide intercanopy and/or intracanopy lighting for replacement of light, supplementation, or treatments in the culture of photosynthetic organisms. Light ropes or the LED strip lighting system (600) may be used to provide such lighting.

The growing plane system may further comprise clear or opaque or diffusers (e.g., for distributing light evenly). Such diffusers are places beneath the lighting system, and may also be used to control the spectrum of light reaching the growing organisms.

The growing plane system may further comprise a coating (or cover). In some embodiments, the coating is chemically resistant and/or waterproof. In some embodiments, the coating self-sterilizing In some embodiments, the coating is impregnated with an anti-microbial, anti-viral or anti-bacterial element, e.g., elemental silver (silver ions). In some embodiments, the coating is impregnated with photo catalytic coatings and/or other elemental-type chemical formulations (such as commercial product OxiTitan featuring formulations of zinc and/or titanium and/or silicon-based molecules). The coating may be operatively (e.g., electrically) connected to the main system via lead wires.

The coating may be layered. The coating may provide protection for the electric components against moisture (reducing electrocution risk, etc.) and allowing for submerged or moist condition operation. The coating may diffuse light from the lighting systems (which may or may not be embedded) so as to achieve uniform lighting conditions. The coating may provide protection against pathogens, e.g., via the composition of the coating.

The growing plane system may further comprise a thermo-electric device. The thermo-electric device may allow for heating or cooling of the area. This may allow for a user to provide an environment for plant culture that may suppress some temperature-sensitive pathogens, reducing the need for standard pathogenic control. The thermo-electric device may allow for culturing in less-than-optimal conditions, allowing a user to consume less electric energy in the form of aerial environment conditioning and therefore reduce production costs. In some embodiments, the control of irrigation and data collection is via load cell.

The growing plane system may provide standard horticultural functions enabling the user to control root zone or culture zone temperature to provide optimal culturing conditions during phases such as germination as a propagation mat would.

The semiautomatic crop production system (100) of the present invention may require supplemented nutrition or other treatments to maintain crop health and yield. In one embodiment, supplemental nutrition or treatments may be provide as a pre-package agriculture consumable (PPAC). The size of PPACs may be varied depending on the size of the crop production system (for example, PPACs for compact crop production systems will be smaller in size then those of large scale facilities). The contents of PPACs may be biological or chemical components used in the operation of the system 100, or by the crop under cultivation, and/or in processes otherwise related to its existence. The content of PPACs is chosen depending on the system or crop treatment desired. Treatments include, but not limited to, fertilizing, supplemental nutrition, gas generation for pest control, gas treatment with or without supplemental $CO_2$, water treatment, and system sterilizing. The content of PPACs may also be formulated specially for the type of crop under cultivation. One benefit of using PPACs, particularly with compact crop production systems of the present invention, is the ease of use. In particular, using PPACs reduces or eliminates the need for measuring or handling chemicals or biologics by the user, the need for specialised equipment or knowledge, or the type The contents of PPAC may be in the dry, liquid, or gel state. The contents of PPACs include, but are not limited to, sterilizing agents, gas generating agents, nutritional agents, supplemental nutritional agents, pH modifying agents, water treatment agents, pest control agents, and other system maintenance agents.

In one embodiment, the PPACs comprises a dissolvable packaging system to hold the contents. In some embodiments, there may be one or more one dissolvable package. This is desirable where two or more of the contents react with each other. In some embodiments, PPACs are provided in solid, pre-measured cake or tablet form. In other embodiments, PACS, are provided as a pre-measure liquid, gel or solid in a container.

In one embodiment, the PPAC is loaded into dispenser in the system (100). In another embodiment, the PPAC is placed in the growing module irrigation area. In another embodiment, the PPAC is place in a container in the system that acts as a reservoir for the system (100) to draw and dispense from. In one embodiment, the PPAC interacts with a liquid, such as water, that interacts with the packaging system and causes it to dissolve and release its contents. In another embodiment, the PPAC interacts with a liquid, such as water, that releases its contents and initiates a reaction, for example gas generation. In yet other embodiments, one or PPACs are placed in a carousel or other automatic dispenser for use or release at preset times. Such dispensers may be used for automatic, semi-automatic or manual operation of the system (100) and may be used for time based or stage of growth based dispensing, or may be used based on treatment desired or problem present (e.g. pest). The PPACs may also be used for regular or required maintenance agents. For example, the PPAC dispenser system may be used to clean and/or sterilize after harvest of a crop, or to clean irrigation and water treatment equipment.

If the desired contents of a PPAC react with each other, 2 or more PACS may be utilized to prevent chemical interaction. In some embodiments, two or more PPACs may be used to prevent chemical reaction or other undesirable interaction of the contents. The two or more PACS may be contained separately in different containers or packaging. Alternatively, the contents of the PPACs may be applied in a variety of ways to prevent interaction, for example by dilution, mixing, or timing of application or use. For example, the contents of a first PPAC may be diluted with water and the contents of a second PPAC add. Similarly, the contents of a third or more PPAC may be added or mixed for use.

In one embodiment, the system 100 further comprises a solution gas saturation system (450). The solution gas saturation system provides a means for the saturation of the irrigation solution (or hydroponic solution) with dissolved gas, and in particular with dissolved oxygen. In one embodiment, the solution gas saturation system provides for the saturation of the irrigation solution with dissolved oxygen. In one embodiment, the dissolved oxygen a particle (bubble) size of 1-200 nm, alternately 1 to 125 nm, or less.

There is a range of dissolved oxygen in the irrigation solution that is desired to promote growth of organisms, such as plants. The concentration range of dissolved oxygen in solution is preferably between 3 to 8 mg/L. Below 3 mg/L, anaerobic and low oxygen levels will sponsor the growth of unwanted organisms and contaminants, as well as degrade or destroy a plant's health. Dissolved oxygen concentrations above 8 mg/L, while not damaging to plant health, do not provide significant operational advantages over concentrations in the range 3 to 8 mg/L. The dissolved oxygen concentration may be further regulated by temperature and pressure of the local environment, and a typical saturation limit of dissolved oxygen is 8.9 mg/L at 21 C. The concentration of dissolved oxygen is higher at lower temperatures.

It has been found that by saturating the irrigation solution with oxygen with a particle size of 125 nm or less, oxygen is retained longer by the irrigation solution compared to a solution saturated with oxygen by standard methods (air or oxygen gas injection, or turbulent (hydraulic) mixing) where the elevated oxygen levels quickly return to those normal for the local temperature and pressure. Further, oxygen with a particle size of 125 nm or less has a greater ability to interact with surfaces such as a plant root or an organism cell, and the smaller the size the greater the effect. The benefits of the smaller particle size of the dissolved oxygen include, but are not limited to, improved growth, reduced equipment operation costs because dissolved oxygen is retained longer in solution as a result of the smaller than 125 nm particle size, increased equipment life as equipment does not have to be run as long, algae reduction, water quality improvement, unwanted organism reduction, improved oxygen content in contained substrate production of plants, and improved maintenance of organic solutions requiring a constant aerobic solution environment.

Other benefits of the described solution gas saturation system improve current methods of production through modifying water chemistry. Currently, pH modification of solutions is performed through chemical additions. Chemicals commonly used include nitric, phosphoric and sulfuric acids, as well as sodium hydroxide and similar bases. These represent significant cost and risk in production. Typical storage and handling requirements exceed those possessed by an average worker without specialized training. Use of these agents can be reduced or eliminated by modifying water chemistry through dissolving different gases into solution. For example, in one embodiment, the solution gas saturation system (450) may be used to modify solution chemistry (e.g. pH) through gas introduction as in the case of acidifying water through the introduction of carbon dioxide. Other gas may also be used to change the water chemistry. This reduces storage and handling requirements, as well as potentially reduces costs associated with acquiring the required chemical.

To improve production of organisms, reduce production risks, and/or reduce costs within the system (100) and elsewhere, the system (100) further comprises a solution gas saturation system (450). The solution gas saturation system (450) is capable of concentrating and/or creating mixtures of gas from the local atmosphere, and/or contained sources (e.g. bottled gasses), which can then be introduced into solution at a significantly reduced particle size and specified temperature to modify water chemistry and affect system performance. Improved production in the system (100), it's components, or elsewhere can be defined as, but not limited to, improved organism health and production compared to other production scenarios, reduced equipment operation resulting in increased useful life and reduced operational cost, reduced contamination and control of foreign matter such as algae or other organisms, improved water and/or solution quality, reduced consumable usage such as fertilizers and pH modifying chemicals due to the solution gas saturation system's (450) ability to modify solution chemistry through gas introduction.

The solution gas saturation system (450) of the present invention comprises one or more of the following components: a hydraulic mixing system, a gas source (455), a gas concentrator, a gas compressor, one or more valves and/or regulators, a filtration system, a control system, a communication system, and/or a temperature control system.

The hydraulic mixing system may be a passive (flow-thru type) or active (requiring external input) device (for example, a static hydraulic mixing device), to integrate the gas into solution and reduce the gas particle size in solution. The hydraulic mixing system may comprise a mixing chamber.

The gas concentrator may be used to concentrate atmospheric, supplied (e.g. bottled gas), or recirculated gases, and remove concentrations of other unwanted gases to achieve a desired gas mixture for injection into the irrigation system of the System 100, or one of its components (e.g. growing module). A gas compressor may be a component of the gas concentrator, or may be an independent component, to compress the gas and/or raise the pressure during use or storage.

The solution gas saturation system (450) may comprises one or more valves and regulators, which may also be part of the gas concentrator, and/or the gas compressor, or independent, to facilitate storage and delivery of gases and/or solution(s). The solution gas saturation system (450) may further comprise one or more connections to the irrigation system (400) and/or growing module(s) (200)

The filtration system comprising components may be used to modify gas content, particulate and foreign matter content, moisture content, temperature, and other factors.

The control system and/or communication system may be used to facilitate the control of the solution gas saturation system (450), which may include sensor communications, device(s) control, and other functions.

The temperature control system may be used to modify the temperature of the gas entering solution.

Gas supply and regulation within a growing system, such as system 100 and its components is critical to obtaining optimal conditions for organism culture. Commonly, gas is supplied to greenhouse growing systems and small growth chambers by means of gas burners and compressed gases, respectively, to augment growth of organisms such as photosynthetic organisms. However, the ability to safely generate usable gases, such as carbon dioxide, have been limited in smaller production scenarios, such as, but not limited to, those described for some embodiments of system 100 of the present invention. The ability to produce a gas through a source that is part of the system, regulate the gas environment in the system (100) and growing module (200), or recover a gas as a waste product, as opposed to resupplying the system with a compressed gas (e.g. a bottled gas), provides for increased efficiency and the ability to self-sustain in areas where gas supplies may be limited, or where such systems are used in life support applications. When using the atmospheric gas system (950) of the present invention, a biological source of gas production may be used, such as, but not limited to, a fungus or fungi, in which accessory product is generated in the form of edible fungal biomass, while supplying critical gases such as carbon dioxide.

In some embodiments, the system (100) of the present invention further comprises an atmospheric gas system (950). The atmospheric gas system (950) provides the ability to supply, generate, regulate, and change compositions of gas, along with other functions, within the system (100) and its components such as the growing modules and cartridges, as well as before discharge externally. In some embodiments, the system (100) of the present invention further comprises biological and/or chemical and/or biochemical carbon dioxide generation using fungal, bacteria, chemical or biochemical reactions. In some embodiments, carbon dioxide from the air (naturally occurring) or from by-products of system operation may be used in the gas systems of the present invention.

In one embodiment, gas may be generated within the atmospheric gas system (950). In an alternative embodiment, gas is generated outside of the atmospheric gas system (950). In yet another embodiment, gas is generated inside the system (100) or one of its components, by or in concert with a component(s) in the system 100, such as, but not limited to, a waste gas utilization system (such as a system comprising a catalytic converter). In other embodiment, the gas may be supplied to the atmospheric gas system (950) or system 100 through other means, such as, but not limited to, bottled compressed gas or liquefied gas. The atmospheric gas system (950) may be the source of gas for and/or combined with the solution gas saturation system (450).

The atmospheric gas system (950) of the present invention may comprises one or more of the following components: a gas generation component, a control system, a filter system, an environmental control system, a pump system, utility connections, one or more valves and/or regulators, and supply lines.

In one embodiment, the atmospheric gas system (950) consists of one or more of the following components: a water system, a pump system, and environmental control system, an illumination system, a mixing system, a reactant and/or catalyst unit contain reactants and/or catalysts that may be required by the system, gas generating source materials, such as fungi, bacteria, or other chemicals.

In some embodiments, a reaction (chemical or biological) will require the addition, removal, or modification of the water content by the water system of the gas generation component in order to provide gas generation or modification. These reactions and other functions may be regulated by environmental conditions such as temperature, relative humidity or light, which may be controlled by an environmental control system or the gas module illumination system. In other embodiments, additional chemicals, catalysts, reactants, or other components may be required to complete the desired function of gas generation beyond the source material(s) contained in the source material(s) system. In some embodiments, a reactant/catalyst system may provide the required materials. In some embodiments, external mixing of materials by various methods may be required, which may occur in the mixing system.

The gas control system controls functions within the generation module and may communicate with system (100), one or more of its components, or other devices. Functions controlled within the atmospheric gas system (100) include, but are not limited to, gas generation, gas movement into and out of the system (100) and its components through control of valves, gas modification (for example, temperature, humidity, concentration, or pressure), communication with sensors, algorithms, programs, software, or other components to determine system functions or operations.

The atmospheric gas system (950) may comprise a filtration system. In some embodiment, fungal organisms used to generate carbon dioxide lead to the generation of unwanted gases that have negative effects on organisms such as plants. The release of volatile organic compounds (VOC's) can be detrimental to organism production. The filtration system may contain mechanisms to remove specific gas, often referred to as 'scrubbing', using chemical such as potassium permanganate, materials such as porous stone or fabric, catalysis, passing gases through a liquid, ionizing or polarized surfaces, radiation such as ultraviolet radiation, or other known methods. The filter system may modify characteristics, such as, but not limited to, gas composition and concentration, moisture content, temperature, and foreign matter content, such that optimal gas conditions are supplied to the system (100), its components, or to the external environments.

A pump system may be used with the atmospheric gas system (950) of the present invention. The pump system may be comprised of various components such as, but not limited to, solenoid valves, gas/air compressors, air pumps, fans, ionizing air movement devices, and components such as pipe, valves, fittings, and other devices comprised of a material required for handling of specific gas(es).

The atmospheric gas system (950) may be connected to one or more has manifolds located in the growing modules of the present invention. Gas manifolds may be located above the growing plane in the lighting module, or may be located in the growing plane.

The solution gas saturation system (450) and atmospheric gas system (950) may be connected directly to utility connections and supply lines, such as, but not limited to, water, electricity, gas, drainage and/or sewer. While the solution gas saturation system (450) and atmospheric gas system (950) are described in connection with use with system 100, either may be used on their own with other types of crop growing systems.

In one embodiment, the system 100 features typical horticultural type functions such as providing lighting and environmental control. Features within the system 100 such as the XYZ boom system allow for unique advanced procedures common in modern germplasm production and agriculture such as "chipping" (removing a small piece of germplasm to use as a unique identifier based upon the organisms genetic code). Through the controlled XYZ coordinate boom system and integration of an automated chipping apparatus, linked to the control system, communication system, and system software (100), the user/system 100 can identify the location within the growing plane of the germplasm that has been sampled using chipping or other techniques. With this combination of system features, many different lines of germplasm can be tested in a variety of environments, and with a variety of treatments, to rapidly determine organism response. This can further research by increasing the speed at which organisms may be tested in a controlled and contained environment, and may be used to rapidly developed and bred new crops, and test the effect of pesticides, growth hormones, and the like.

In some embodiments the modular growing unit (200) of the present invention comprises a cultivation module (831), where the cultivation module provides an area in which crops or other organisms may be housed, and where various components and system of the present invention are housed, e.g. the boom system (500).

In some embodiments, the modular growing unit (200) a lighting module (333), the lighting module (333) providing a housing for various lighting elements of the present invention. Further, the lighting module (333) may provide a housing for fans, and/or a pathway for airflow through the modular growing unit (200).

In some embodiments, the modular growing unit (200) of the present invention comprises a utility module (332), the utility module providing housing for various components and systems of the present invention, including but not limited to the irrigation system (400). Further, the utility module may also comprise a zone to contain a medium (352) in which various crops may be cultivated. Roots from some crops growing in the cultivation module may extend down in the growing medium (835) to the reservoir (816)/irrigation system (400).

In some embodiments, the semi-automated crop production system (100) of the present invention further comprises a cloud farming system. The cloud farming system comprising cloud software, local cloud hardware (1180) disposed on the semi-automated crop production system (100) and remote cloud hardware, disposed remotely from the semi-automated crop production system (100). In some embodiments, the local cloud hardware (1180) communicates with the remote cloud hardware using the cloud software to receive, process, and transmit information to and from the semi-automated crop production system (100) and the remote cloud hardware and associated hardware/accessories. The cloud farming system may comprise an unmanned aerial vehicle (UAV) to collect data external to the system (100) and communicate this to the control system. Such external data may be use to regulate conditions inside the crop production system to acclimatize crops for transplant.

In some embodiments, the semi-automated crop production system (100) of the present invention comprises a transportable power source, e.g. a battery, e.g. a lithium-ion battery or the like, that powers the semi-automated crop production system (100), or components contained within, either during transport or where other energy sources are unavailable. The inclusion of a transportable power source is particularly advantageous when the transporting vehicle is incapable of powering the semi-automated crop production system, or where traditional power sources, are unavailable, e.g. at a remote research outpost, or the like.

In some embodiments, the system (100) comprises a pre-entry chamber. The pre-entry chamber may be used to provide functions such as sterilization, air treatment, air filtering, prevention of pest and disease from entering the cultivation area, pest and disease removal, and airlock functionality. Sterilization may be performed by a variety of methods, including but not limited to chemical sterilization, UV sterilization, and the like. Air treatment may involve a variety of methods, including but not limited to chemical treatment of air, etc. Air filtering may be accomplished by a variety of methods, including but not limited to filtering air through one or more air filters. Pest and disease removal may be accomplished by a variety of methods, including but not limited to chemical treatments, treatment with carbon dioxide to eliminate organisms that depend upon oxygen for respiration, etc. Airlock functionality may be accomplished by a variety of methods, including but not limited to the use of two airtight doors that open non-simultaneously. Use of a pre-entry system may increase crop yield by preventing disease and pests from entering the cultivation area.

In some embodiments, the pre-entry chamber may further comprise a transfer chamber. In some embodiments, the transfer chamber allows transfer of something into the cultivation module without being subjected to the various treatments performed by the pre-entry chamber. For instance, a user of the present invention may wish to introduce beneficial or commensal bacteria into the cultivation module while still removing any additional contaminants. In this way, the commensal or beneficial bacteria may be placed in the transfer chamber for introduction into the cultivation module without destroying the commensal or beneficial bacteria, while harmful bacteria (e.g. carried by an operator) may be simultaneously destroyed in the pre-entry chamber. Alternatively, the transfer chamber may be used to treat under harsher conditions than the pre-entry chamber, for example, with chemicals or irradiation.

In some embodiments, the present invention further comprises one or more insulation components, including but not limited to insulating paints, insulating foams, insulating surface treatments, and the like. Other insulating materials include those that insulate against external radiation (e.g. cosmic radiation) or ballistic events. The insulation components may provide insulation to the interior of the system (100) or the growing module (200) from the outside environment, or may insulate the exterior of system from the insider environment.

In some embodiments, the present invention comprises a frame system disposed within the shell (110/120). In some embodiments, the frame system further comprises irrigation components that provide water and/or other chemicals to organisms growing in the cultivation module. In some embodiments, the frame system further comprises electrical components including, but not limited to, light sources and airflow devices. In some embodiments, the frame system comprises gas distribution components including, but not limited to, one or more gas manifolds capable of delivering gasses to the organisms growing in the cultivation modules of the present invention.

In some embodiments, the present invention further comprises a waste resource utilization system. In some embodiments, the waste resource utilization system is capable of utilizing exogenous and/or endogenous waste sources. Examples of waste resources that may be utilized in the waste resource utilization system of the present invention include, but are not limited to, thermal energy (e.g. heat produced by heat-producing components of the present invention), gases (e.g. carbon dioxide produced by a nearby factory), water (e.g. reclaimed water flowing from a nearby golf-course), chemicals (e.g. fertilizer circulated through the irrigation system of the present invention), and other production by products.

In some embodiments, the present invention further comprises a catalytic converter. In some embodiments, the catalytic converter produces carbon dioxide and water, which may be introduced into the cultivation module and/or utility module of the present invention in order to utilize the carbon dioxide and water for crop growth and sustenance.

In some embodiments, the present invention comprises compartmentalization of heat-generating components away from non-heat-generating components, and vice versa. Compartmentalization may include, but is not limited to, interior walls between heat-generating and non-heat-generating components constructed of thermally insulating materials.

In some embodiments, the present invention comprises a water treatment component. In some embodiments, the water treatment component treats water circulating through one or more of the modular growing units of the present invention. In some embodiments, water treatment may include, but is not limited to, treatment with water filters, treatment with chemicals, treatment with UV light, treatment with nano-sized gas particle and liquid solutions, ozone, and other known water treatment methods. Water treatment may occur at one or more points in the system (100). For example, water may be treated before water enters or leaves the system (100), before water enters a modular growing unit, while water is in a modular growing unit, or after water leaves a modular growing unit.

In some embodiments, the present invention comprises a water circulation component. In some embodiments, the water circulation component comprises a water pump. In some embodiments, the water circulation component comprises an internal irrigation system (400). In some embodiment, the water circulation component provides for continuous water circulation through the irrigation system (i.e. water may be continually recirculated through the irrigation system). In other embodiments, the water circulation component may provide for intermittent water circulation (for example, timed circulation), partial water recirculation, linear water flow though the irrigation system, or circulation or flow through a reservoir component. The reservoir component may comprise a water tank, or the like. As water and/or chemicals are consumed by the growing crops they may be added to the system to maintain water levels and/or chemical balance.

In some embodiments, the present invention comprises a first system-based communications element disposed on a first semi-automated crop production system, and one or more other system-based communications element disposed on one or more other semi-automated crop production systems. In some embodiments, the first system-based communications element of the first semi-automated crop production system is informationally connected to the one or more other system-based communications elements of the one or more other semi-automated crop production system, thereby informationally connecting the first semi-automated crop production system and to the one or more other semi-automated crop production system. Communication may be unidirectional, bidirectional or multidirectional between connected units. In this way, the first and the one or more other semi-automated crop production systems may provide each other with information, including but not limited to information regarding lighting conditions, growing conditions, growing problems, operating conditions, working conditions, and/or utilities conditions. Communications may also include commands, such that one semi-automated crop production system may instruct another semi-automated crop production system to perform certain tasks, etc.

In some embodiments, the present invention comprises a system-based humidity management component. In some embodiments, said system-based humidity management component is effective for increasing, maintaining, or reducing the humidity inside the semi-automated crop production system, and thereby increasing, maintaining, or reducing the humidity inside the modular growing units.

In some embodiments, the present invention comprises a gas management module. In some embodiments, the gas management module is effective for increasing, maintaining, or reducing gas levels inside the semi-automated crop production system and/or modular growing units.

In some embodiments, the present invention comprises a carbon dioxide generation module. In some embodiments, the carbon dioxide generation module generates carbon dioxide using one or more methods selected from the group consisting of chemical, biochemical or biological carbon dioxide production. Biological carbon dioxide production includes respiring fungal organisms. The carbon dioxide produced by the carbon dioxide generation module may be used to provide increased carbon dioxide for the process of photosynthesis taking place in crops disposed in the modular growing unit.

In some embodiments, the present invention comprises a level component or device (307). In some embodiments, the leveling component levels the semi-automated crop production system. In some embodiments, the leveling component may include, but is not limited to adjustable leveling feet, leveling springs, or the like. Leveling offers the advantage of more efficient water use and distribution within the growing module, especially the utility module as well as use of the system (100) on non-level and non-uniform surfaces.

In some embodiments, the present invention comprises a system-based cooling system. In some embodiments, the system-based cooling system provides cooling to the various systems, modules, and components of the semi-automated crop production system of the present invention. In some embodiments, the system-based cooling system is a water based system. The cooling system comprises various components, including, but not limited to, a pump, piping or tubing, contact heatsinks, etc. In other embodiments the cooling system may be a heat pump, refrigerant based system, or other cooling system know to those in the art.

In some embodiments, the present invention comprises a modular growing unit. In some embodiments, the modular growing unit further comprises a cultivation module. In some embodiments, the cultivation module comprises a cultivation module top (881), a cultivation module base (882), a cultivation module first side (883), a cultivation module second side (884), a cultivation module front side (885), and a cultivation module back side (886). In some embodiments, the first and second sides and the front and back sides may be the same or different lengths. In one embodiment, the handle for inserting and removing the cultivation module is located on the front side. The grid (220) and cells (210) are located in contact with or near the bottom side (882).

In some embodiments, the present invention further comprises a grid disposed inside the cultivation module proximal to the cultivation module base (i.e. the "bottom" of the cultivation module when the cultivation module is an upright position). In some embodiments, the grid further comprises a plurality of cells, each adapted to hold a crop. In this way, in some embodiments, an individual organism of a crop may be held by each cell.

In some embodiments, the present invention further comprises a lighting module. In some embodiments, said lighting module is disposed on the cultivation module top (i.e. the "top" of the cultivation module when the cultivation module is an upright position). In some embodiments, the lighting module further comprises a lighting unit disposed above the grid, said lighting unit thereby producing light directed downwardly at the grid.

In some embodiments, the present invention comprises a utility module. In some embodiments, the utility module is slidably and removably disposed on the cultivation module second end. In some embodiment the utility module comprises an irrigation system. In some embodiments, the irrigation system comprises an inlet connection and an outlet connection. The inlet and outlet connections provide a pathway for liquids (e.g. water) to enter and exit, respectively, the irrigation system.

In some embodiments, the cultivation module of the present invention comprises a variable wavelength lighting component. In some embodiments, the variable wavelength lighting component is capable of being selectably adjustable to manipulate wavelengths of light produced from the lighting unit. In some embodiments, the variable wavelength lighting component may comprise a dyed or colored lens or the like.

In some embodiments, the cultivation module of the present invention further comprises a light and airflow diffuser. In some embodiments, the light and airflow diffuser is disposed proximal to the cultivation module first end. The light and airflow diffuser diffuses light and/or airflow, thereby increasing light and airflow to the crops in the cultivation module.

In some embodiments, the cultivation module of the present invention further comprises a first airflow component. In some embodiments the first airflow component provides for airflow through the cultivation module. In some embodiments, the first airflow component provides airflow downwardly towards the cultivation module first end and towards the grid. In some embodiments, the first airflow component thereby provides additional downward airflow to the crops or other organisms disposed in the grid. In some embodiments, this increases the rigidity of crops located in the grid, thereby increasing crop health and resilience.

In some embodiments, the cultivation module of the present invention further comprises a gas distribution system. In some embodiments, the gas distribution system further comprises an inlet for connecting to a gas source. In some embodiments, the gas distribution system may supply various gases to the cultivation chamber, including but not limited to carbon dioxide to further process such as photosynthesis.

In some embodiments, the cultivation module of the present invention further comprises a second airflow component. In some embodiments, the second airflow component provides airflow through the cultivation module from the cultivation module front side to the back side of the cultivation module. The airflow may also fo from the back side to the front side of the cultivation module. In some embodiments, the airflow passes over and through the crops disposed in the cells of the grid. In some embodiments, the airflow increases the rigidity of crops located in the grid, thereby increasing crop health and resilience. The airflow further creates a positive pressure environment across the grid that may provide for resistance to contaminant introduction (for example, pests).

In some embodiments, the cultivation module of the present invention comprises a robotics component. In some embodiments, said robotics component comprises a boom system. In some embodiments, said boom system further comprises an X/Y track, a Z track, and a moveable boom that can travel along the X/Y track and/or Z track. In some embodiments, the boom comprises a number of components having functionalities relevant to the operation of the semi-automated crop production system.

In some embodiments, the moveable boom comprises a pollination component. In some embodiments, said pollination component may comprise a brush or other organism contacting attachment. In some embodiments, the pollination component may comprise a non-contacting acoustic, airflow or vibrational pollination component or the like that may or may not be attached to the boom. For example, a non-contact vibrational component may be a vibrating device that moves the module, supporting trellis, or growing module, etc., but does not contact the organism directly.

In some embodiments, the modular growing unit comprises a machine vision component. In some embodiments, the machine vision component comprises a first camera detecting electromagnetic radiation in the visible range. In some embodiments, the machine vision component comprises a second camera detecting electromagnetic radiation in the infrared range. In some embodiments, the machine vision component comprises a third camera detecting electromagnetic radiation in the ultraviolet range. In some embodiments, the machine vision component may comprises device for detecting radioactive markers in labeled organisms. In some embodiments, the machine vision component is movably disposed on the boom system. In some embodiments, the machine vision component is disposed on the interior walls of the cultivation module.

In some embodiments, the modular growing unit of the present invention comprises a root zone, the root zone may comprise roots or rhizomes from the crops under cultivation. In some cases, a crop under cultivation may not produce roots or rhizomes. As used here in, root zone is used to refer to the zone beneath the growing plane regardless of whether the crop produces roots. In some embodiments, the roots of the crops may be pulled from the portion of the crops to be harvested via slidable removal of the utility module from the cultivation module. In some embodiments, said pulling of the roots of the crops may be further facilitated by the inclusion of a cutting instrument disposed on one or more ends of the cultivation module or the utility module. Examples of cutting instruments include, but are not limited to, baldes, lasers, water streams, air streams, and the like.

In some embodiments, the present invention comprises a roughed troughed growing component. In some embodiments, the troughed growing component is disposed on the grid. In some embodiments, the troughed growing component provides physical support for crop production, such that crops may grow upwardly from the grid through a trough opening towards a cultivation module first end (i.e. towards the "top" of the cultivation module when the cultivation module is disposed in an upright position).

In some embodiments, the present invention includes a retractable cover disposed on the trough opening. In some embodiments, the retractable cover comprises a plurality of shifting segments. In some embodiments, the shifting segments retractably cover the trough opening. In some embodiments, crops may be grown between the shifting segments of the retractable cover. In another embodiment, the present invention comprises a plurality of bristles at least partially covering the trough opening. In some embodiments, the shifting segments and/or bristles provide mechanical support to growing crops, and may prevent moisture loss, prevent algae growth, etc.

In some embodiments, the system (100) comprises a harvesting machine. In some embodiments, the system (100) comprises a seeding machine.

In some embodiments, the modular growing unit of the present invention comprises a liquid circulation component. In some embodiments, the modular growing unit of the present invention comprises a water circulation component. In some embodiments, the water circulation component performs one or more functions selected from the group consisting of continuous water recirculation, intermittent water recirculation, partial water recirculation, linear water circulation, or flow through a reservoir component. The liquid (or water) circulation component may also perform treatment or disposal of liquid (or water).

In some embodiments, the modular growing unit of the present invention comprises a system-based humidity management component. In some embodiments, said system-based humidity management component is effective for increasing, maintaining, or reducing the humidity inside the semi-automated crop production system, and thereby increasing, maintaining, or reducing the humidity inside the modular growing units.

In some embodiments, the modular growing unit of the present invention comprises a system-based cooling system. In some embodiments, said system-based cooling system is a water cooling system. The cooling system provides cooling to the various systems, modules, and components of the semi-automated crop production system. In some embodiments, the system-based water cooling system comprises various components, including but not limited to a pump, piping or tubing, contact heatsinks, etc.

In some embodiments, the present invention comprises a lighting and airflow fixture. In some embodiments, the lighting and airflow fixture of the present invention comprises a light diffuser spectrum altering component, said light diffuser spectrum altering component capable of altering the wavelength of light passing through the light diffuser. In this way, the light diffuser spectrum altering component may alter the wavelength of light passing through it and/or diffuse light to crops disposed in the grid.

In some embodiments, the lighting and airflow fixture further comprises an inner baffle assembly positioned below the fan and above the LED assembly. In some embodiments, the inner baffle assembly comprises one or more airflow apertures.

The following the disclosures of the following U.S. Patents are incorporated in their entirety by reference herein: U.S. Pat. No. 2008/0295400.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the invention.

What is claimed is:

1. A semi-automated crop production system (100) comprising:
   a. at least one modular growing unit (200), said modular growing unit comprising:
      i. a cultivation module (831) comprising a grid (220) comprising a plurality of cells (230) adapted to hold plants or other organisms;
      ii. a plurality of lighting and airflow fixtures (300) positioned above the grid (220), each lighting and airflow fixture (300) comprising a plurality of LEDs or OLEDs (332) and a fan, wherein the fan (320) is positioned above the plurality of LEDs or OLEDs (332) and an adjustable airflow nozzle (350) extending downwardly from the fan and configured to direct airflow toward the plurality of cells (230); and
      iii. a utility module (832); and
   b. a shell comprising:
      i. an interior shell (110);
      ii. an exterior shell (120); and
      iii. a mounting component (140) disposed on a side wall of interior shell (112);
   wherein at least one of said modular growing units (200) slidably engages the mounting component (140) of the interior shell (110) such that the modular growing unit (200) may be slidably removed from the semi-automated crop production system (100).

2. The semi-automated crop production system (100) of claim 1, wherein said semi-automated crop production system (100) further comprises a cloud farming system comprising:
   a. cloud software;
   b. local cloud hardware (1180) disposed on the semi-automated crop production system (100); and
   c. remote cloud hardware;
   wherein the cloud software and local cloud hardware (1180) receive, process, and transmit information to and from the semi-automated crop production system (100) and the remote cloud hardware.

3. The semi-automated crop production system (100) of claim 1, wherein said semi-automated crop production system (100) is moveable by one or more methods selected from the group consisting of a truck, automobile, train, ship, plane, and spacecraft.

4. The semi-automated crop production system (100) of claim 3, wherein during transit, the semi-automated crop production system (100) may be electronically connected to the transporting vehicle in order to provide power to the semi-automated crop production system (100), thereby allowing operation of the semi-automated crop production system (100) during transport.

5. The semi-automated crop production system (100) of claim 3, wherein during transit, the semi-automated crop production system (100) is electronically connected a transportable power source, wherein said transportable power source provides power to the semi-automated crop production system (100), thereby allowing continued operation of the semi-automated crop production system (100) during transport.

6. The semi-automated crop production system (100) of claim 1, further comprising insulation components, said insulation components insulating the interior of the semi-automated crop production system (100) from outside the environment.

7. The semi-automated crop production system (100) of claim 1, further comprising insulation components, said insulation components insulating the exterior of the semi-automated crop production system (100) from inside the environment.

8. The semi-automated crop production system (100) of claim 1, wherein the electrical power required to power the semi-automated crop production system (100) is derived from an alternative energy source.

9. The semi-automated crop production system (100) of claim 8, wherein the alternative energy source used to power the semi-automated crop production system (100) is selected from one of the following energy sources:
   a. a solar power source;
   b. a wind power source;
   c. a geothermal power source; and
   d. a kinetic energy power source.

10. The semi-automated crop production system (100) of claim 1, wherein the semi-automated crop production system (100) further comprises one or more of:
    a. frame system irrigation components selected from the group consisting of connections to the irrigation system (410, 412), sterilizing system (450), injector boards (424), mixing tanks (426), and stock nutrient tanks (428);
    b. frame system electrical components selected from the group consisting of lighting or power connectors (334), sensor arrays (240), lighting sources (270), electrical connections (280), and light bulb adapters (313); and
    c. frame system gas distribution components selected from the group consisting of side air or gas ducts or channels (260), air flow or circulation devices (261), air circulation fans (282, 284), fans (320), air filters (323), adjustable airflow nozzles (350), and air compressors (422).

11. The semi-automated crop production system (100) of claim 10, wherein the frame system is coated with a sterilizing coating.

12. The semi-automated crop production system (100) of claim 1, wherein the semi-automated crop production system (100) further comprises a waste resource utilization system, said waste resource utilization system utilizing waste resources from an exogenous waste source, said waste resources comprising one or more selected from the group consisting of thermal energy, gases, water, and fertilizers.

13. The semi-automated crop production system (100) of claim 1, wherein the semi-automated crop production system further comprises a waste resource utilization system, said waste resource utilization system utilizing waste resources from an endogenous waste source, said waste resources comprising one or more selected from the group consisting of thermal energy, gases, water, fertilizer, chemical, and biological.

14. The semi-automated crop production system (100) of claim 12, wherein the semi-automated crop production system further comprises a filter system.

15. The semi-automated crop production system (100) of claim 13, wherein the semi-automated crop production system further comprises a filter system.

16. The semi-automated crop production system (100) of claim 1, wherein the semi-automated crop production system comprises insulating paint (147).

17. The semi-automated crop production system (100) of claim 1, wherein the semi-automated crop production system further comprises a grid (220) comprising a plurality of cells adapted to grow a crop.

18. The semi-automated crop production system (100) of claim 1, wherein the semi-automated crop production system further comprises a gas saturation system (450).

19. The semi-automated crop production system (100) of claim 1, wherein the semi-automated crop production system further comprises a LED strip (610).

20. The semi-automated crop production system (100) of claim 1, wherein the semi-automated crop production system further comprises: an irrigation system, comprising: an inlet connection (410) an outlet connection (412) and one or more of: a nutrient tank (426), a particulate filter (430), a heat exchanger (436), or a heat pump (438).

* * * * *